(12) United States Patent
Andrews et al.

(10) Patent No.: US 12,607,560 B2
(45) Date of Patent: Apr. 21, 2026

(54) HYBRID SYSTEMS AND METHODS FOR CHARACTERIZING STRESS IN CHEMICALLY STRENGTHENED TRANSPARENT SUBSTRATES

(71) Applicant: CORNING INCORPORATED, Corning, NY (US)

(72) Inventors: Ryan Claude Andrews, Elmira, NY (US); David Matthew Berg, Rochester, NY (US); Pierre Michel Bouzi, Horseheads, NY (US); William John Furnas, Elmira, NY (US); Christopher David Gee, Painted Post, NY (US); Jacob Immerman, Corning, NY (US); Andrew Allen Lindstrand, Big Flats, NY (US); Glenn Abram Newcomer, Pine City, NY (US); Evan Lewis Olson, Elmira, NY (US); Melbourne Thompson Turnbull, IV, Horseheads, NY (US); Nathaniel David Wetmore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 239 days.

(21) Appl. No.: 18/520,807

(22) Filed: Nov. 28, 2023

(65) Prior Publication Data

US 2024/0175812 A1 May 30, 2024

Related U.S. Application Data

(60) Provisional application No. 63/385,475, filed on Nov. 30, 2022.

(51) Int. Cl.
| | |
|---|---|
| *G01N 21/47* | (2006.01) |
| *G01N 21/17* | (2006.01) |
| *G01N 21/25* | (2006.01) |

(52) U.S. Cl.
CPC ........... *G01N 21/47* (2013.01); *G01N 21/255* (2013.01); *G01N 2021/1734* (2013.01); (Continued)

(58) Field of Classification Search
CPC ...... G01N 21/47; G01N 21/255; G01N 21/23; G01N 21/43; G01N 2021/1734; (Continued)

(56) References Cited

U.S. PATENT DOCUMENTS

| | | |
|---|---|---|
| 4,655,589 A | 4/1987 | Cestaro et al. |
| 9,534,981 B2 | 1/2017 | Roussev et al. |

(Continued)

FOREIGN PATENT DOCUMENTS

| | | | |
|---|---|---|---|
| CN | 109870752 A | * | 6/2019 |
| WO | 2020/198016 A1 | | 10/2020 |

OTHER PUBLICATIONS

CN_109870752_A_I_translation_with_page_numbers.pdf (Year: 2019).*

(Continued)

*Primary Examiner* — Tarifur R Chowdhury
*Assistant Examiner* — Carlos Perez-Guzman

(57) ABSTRACT

A scattered light polarimetry (LSP) sub-system of a hybrid system for characterizing stress in a chemically-strengthened (CS) substrate having a top-surface and a near-surface waveguide, includes a LSP light source system, an LSP light source actuator coupled to the LSP light source system, and an optical compensator within an optical path of a LSP laser beam emitted by the LSP light source system. The optical compensator includes a half-wave plate, a half-wave plate actuator, a diffuser, and a diffuser actuator. The LSP sub-system further includes a LSP detector system in optical communication with the optical compensator through an LSP coupling prism having a LSP coupling surface, a (Continued)

focusing lens and a focusing lens actuator, and a support plenum having a surface and a measurement aperture, the support plenum configured to support the CS substrate at a measurement plane at the measurement aperture, and to operably support the LSP coupling prism.

20 Claims, 50 Drawing Sheets

(52) U.S. Cl.
CPC ............... *G01N 2021/1765* (2013.01); *G01N 2021/4792* (2013.01); *G01N 2201/06113* (2013.01); *G01N 2201/0634* (2013.01); *G01N 2201/0668* (2013.01); *G01N 2201/125* (2013.01)

(58) Field of Classification Search
CPC ... G01N 2021/1765; G01N 2021/4792; G01N 2201/06113; G01N 2201/0634; G01N 2201/0668; G01N 2201/125; G01L 1/241
See application file for complete search history.

(56) References Cited

U.S. PATENT DOCUMENTS

| 9,696,207 B2 | 7/2017 | Roussev et al. | |
| 11,035,730 B2 | 6/2021 | Furnas | |
| 11,105,612 B2 | 8/2021 | Andrews et al. | |
| 11,852,549 B2 | 12/2023 | Andrews et al. | |
| 11,860,090 B2 | 1/2024 | Andrews et al. | |
| 2020/0300615 A1* | 9/2020 | Andrews | G01J 4/02 |
| 2021/0009469 A1* | 1/2021 | Marshall | C03C 17/30 |

OTHER PUBLICATIONS

International Search Report and Written Opinion of the International Searching Authority; PCT/US2023/081064; dated Mar. 21, 2024; 14 pages; European Patent Office.

* cited by examiner

200

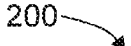
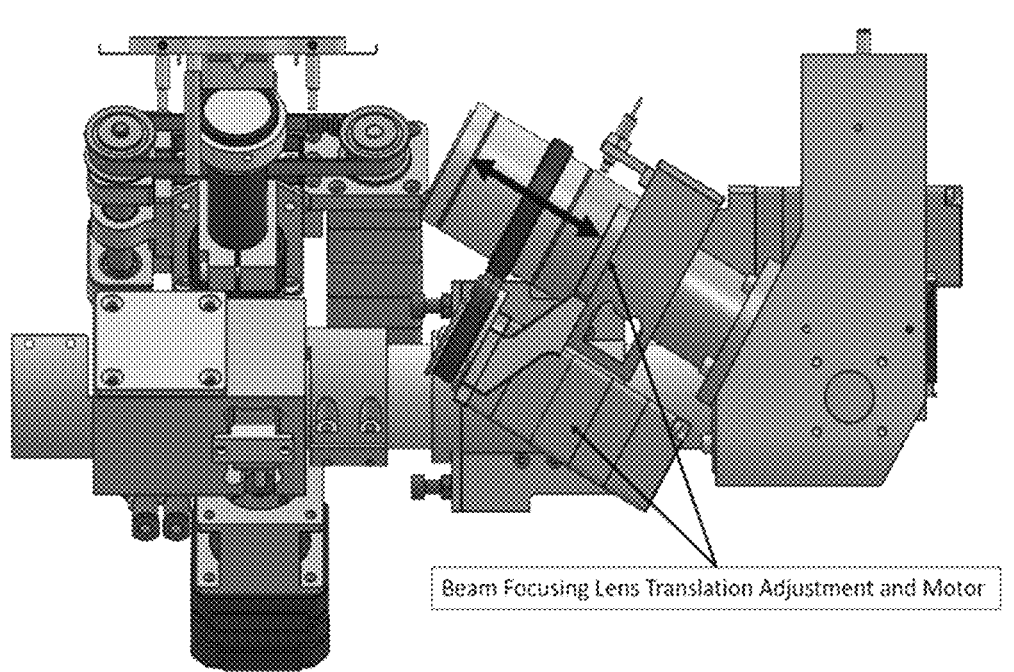
Beam Focusing Lens Translation Adjustment and Motor
FIG. 4J

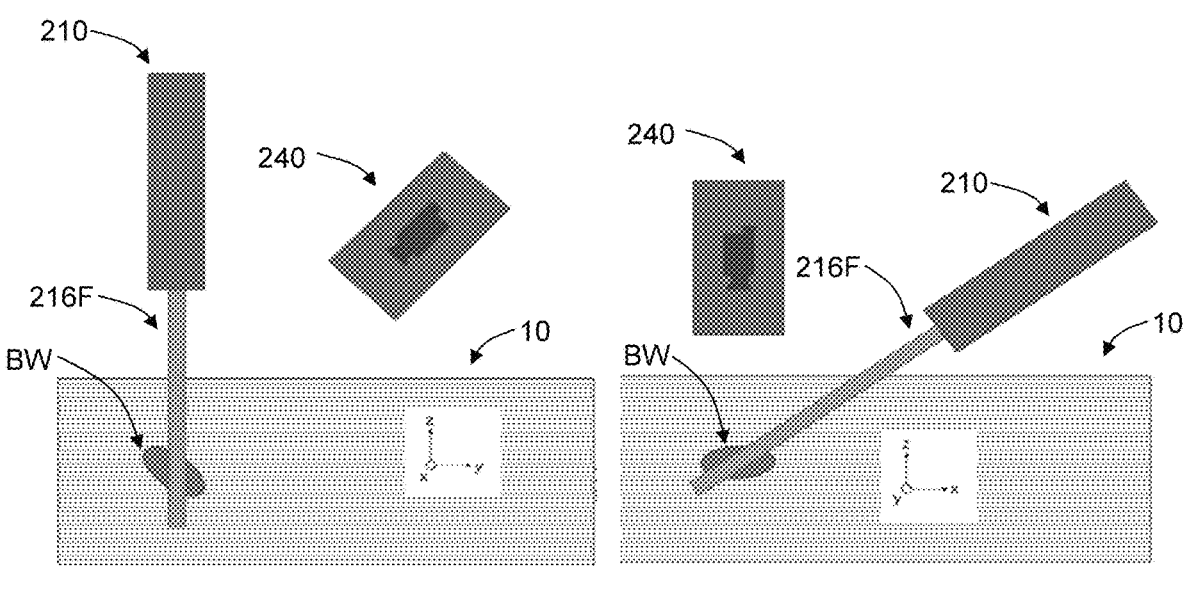
FIG. 4P                    FIG. 4Q
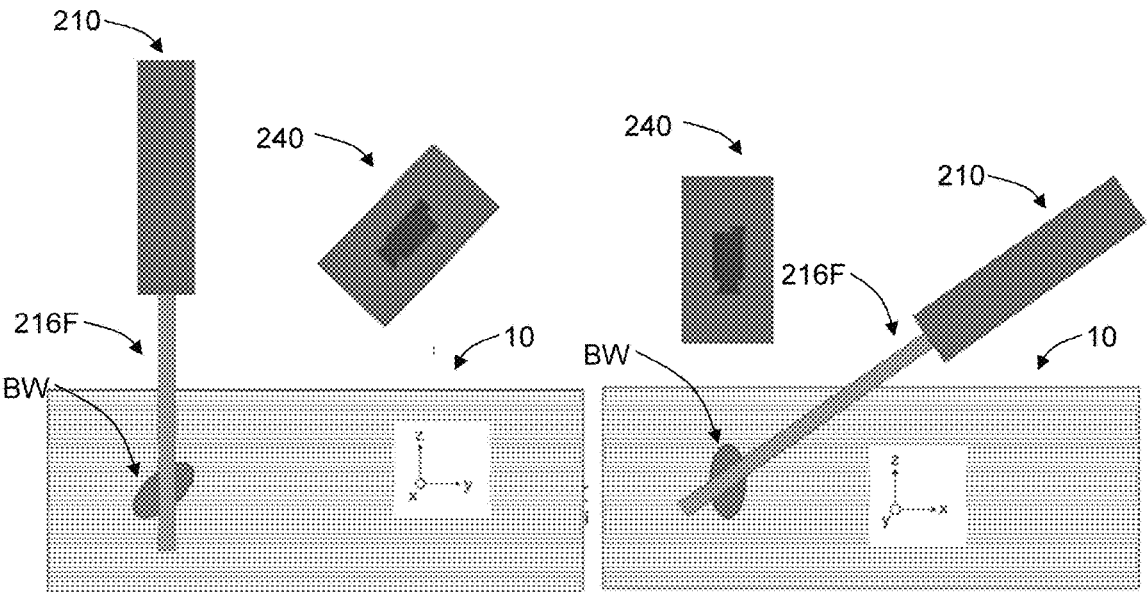
FIG. 4R                    FIG. 4S 410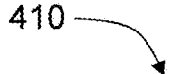
248, 248D 412B
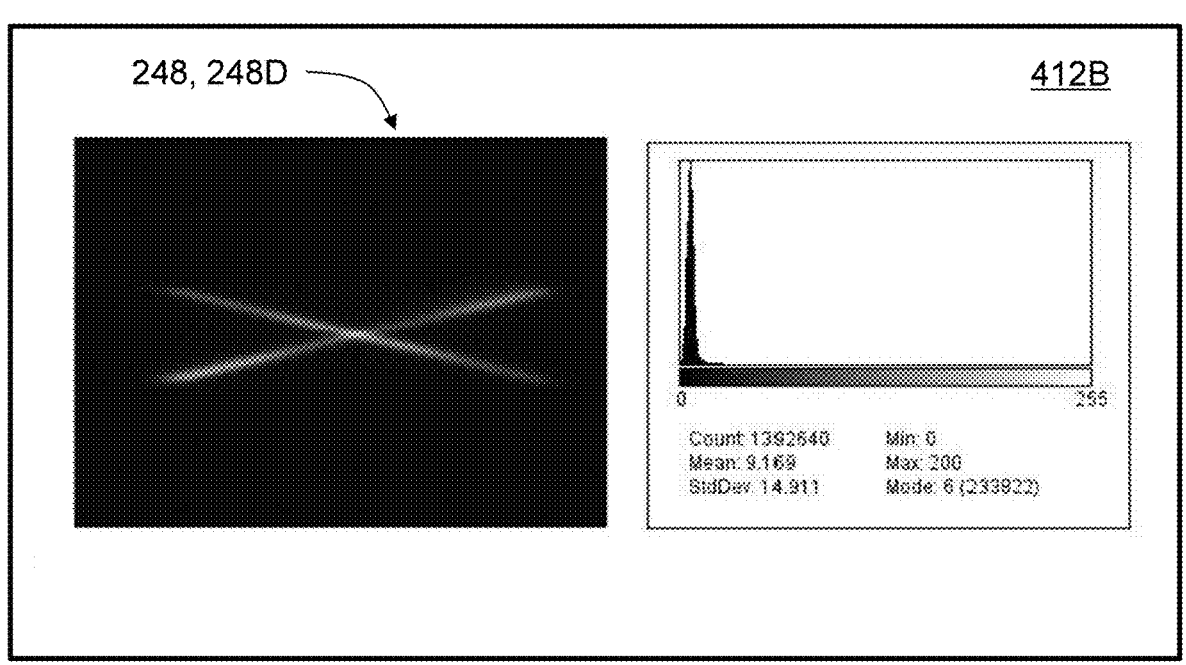
FIG. 10A

248D

248B

248T

—248C

—248C

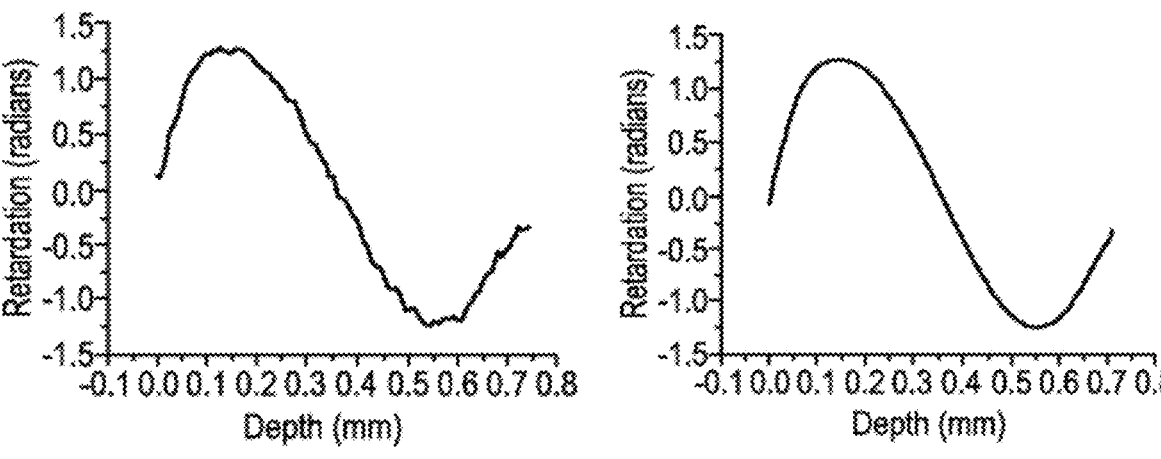
FIG. 13A                    FIG. 13B
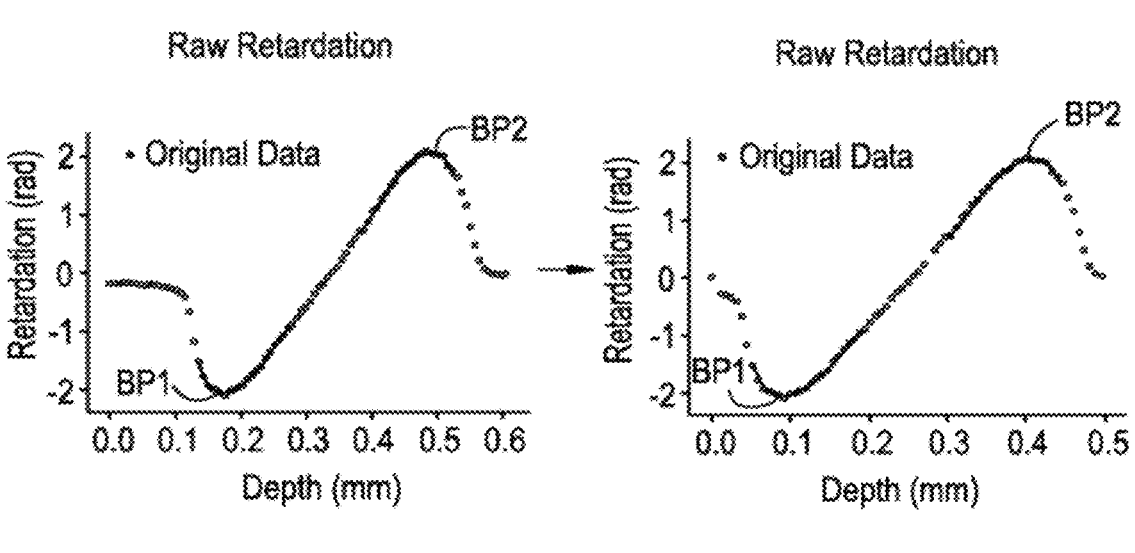
FIG. 14A                    FIG. 14B

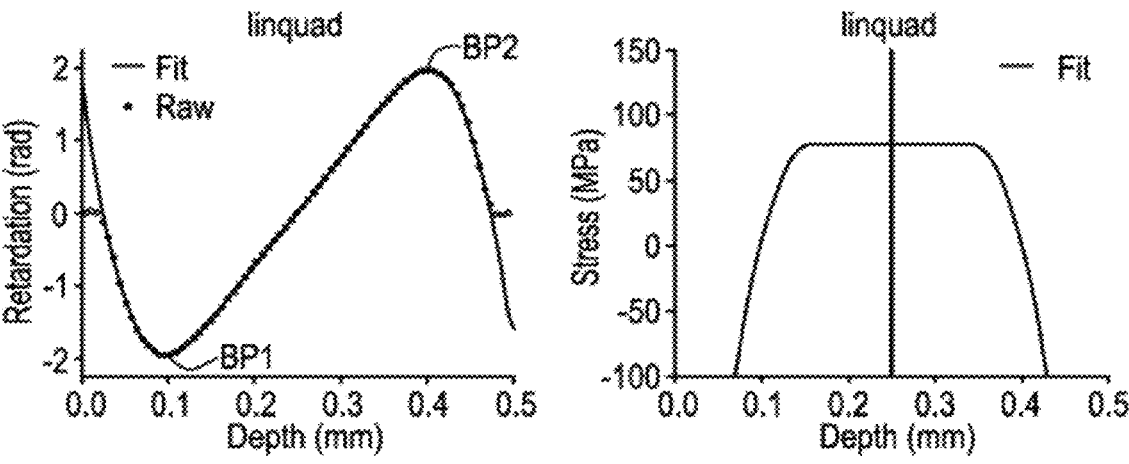
_FIG. 15A_       _FIG. 15B_
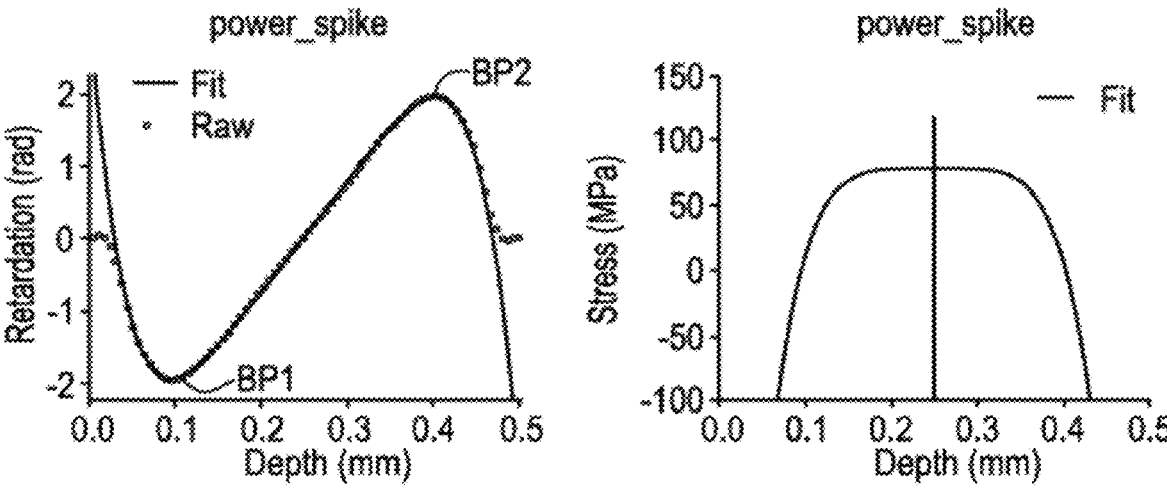
_FIG. 16A_       _FIG. 16B_

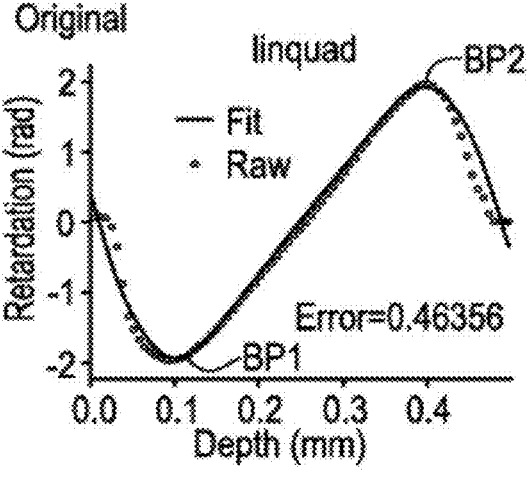
FIG. 17A
FIG. 17B
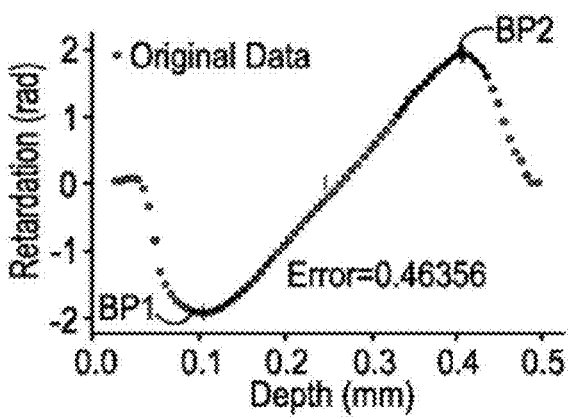
FIG. 18A
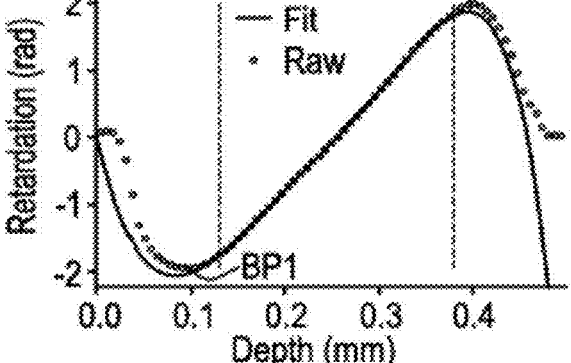
FIG. 18B

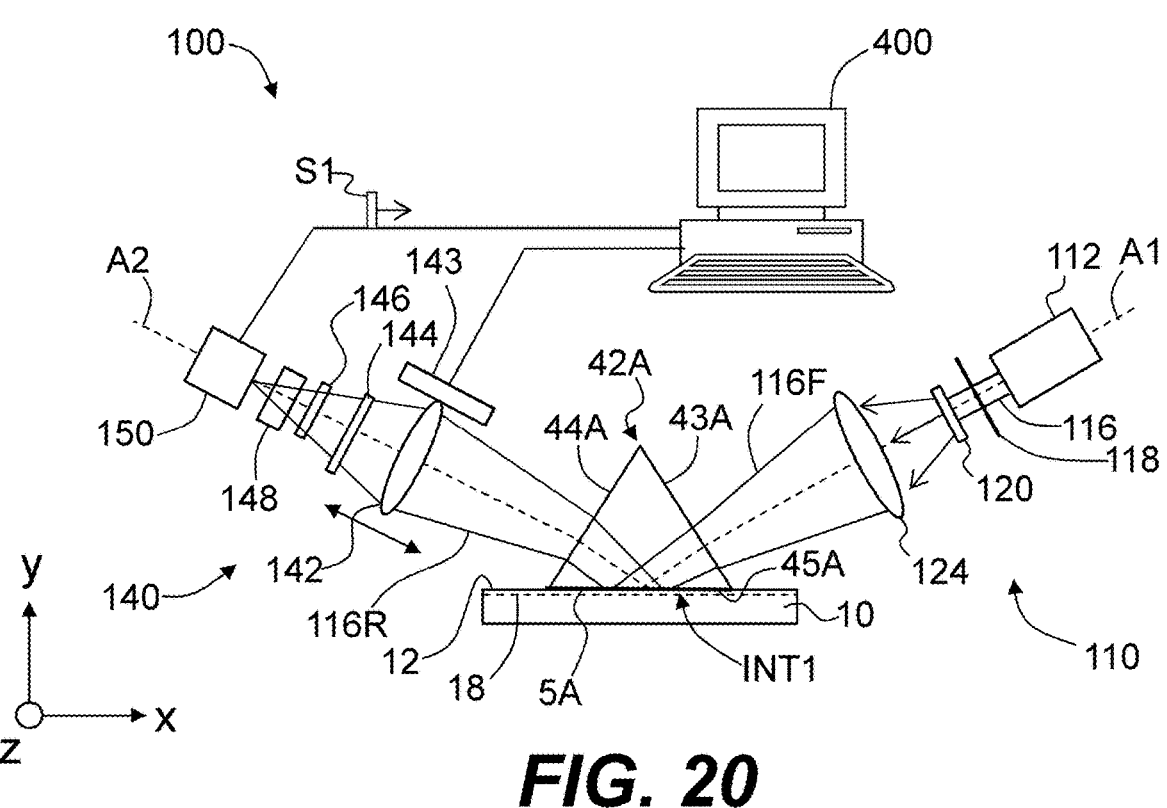
FIG. 20
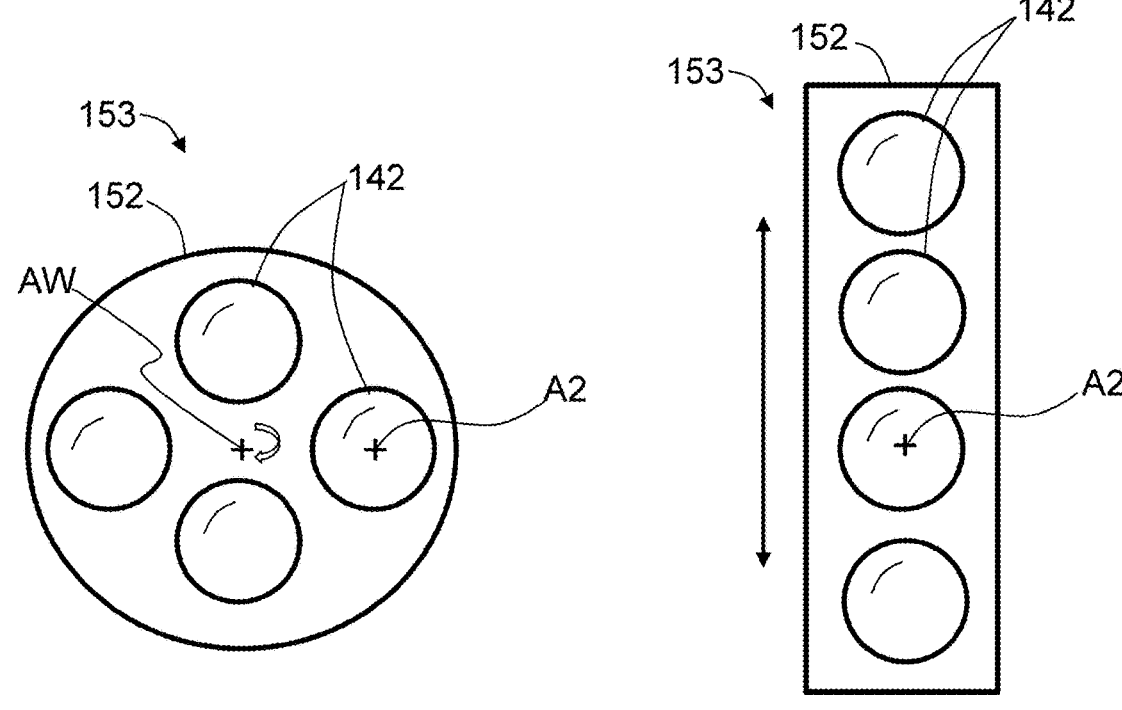
FIG. 21A                           FIG. 21B

HYBRID SYSTEMS AND METHODS FOR CHARACTERIZING STRESS IN CHEMICALLY STRENGTHENED TRANSPARENT SUBSTRATES

This application claims the benefit of priority under 35 U.S.C. § 119 of U.S. Provisional Application Ser. No. 63/385,475 filed on Nov. 30, 2022, the content of which is relied upon and incorporated herein by reference in its entirety.

FIELD

The present disclosure relates to characterizing stress in transparent chemically strengthened substrates, and in particular relates to hybrid systems and methods for characterizing stress chemically strengthened transparent substrates.

BACKGROUND

Transparent substrates that have undergone a chemical strengthening process exhibit increased resistance to scratching and breaking. Such substrates extremely useful for a variety of display applications ranging from television screens to computer screens to mobile hand-held device screens to watches. An example chemical strengthening process is an ion-exchange (IOX) process, whereby ions in a near-surface region of a glass-based substrate are exchanged for external ions, e.g., from a salt bath.

Manufacturing transparent chemically strengthened (CS) substrates requires characterizing their stress characteristics to ensure the CS substrates have the desired levels of chemical strengthening suitable for the given application. The characterization typically requires measuring a stress profile of the CS substrate from the surface to the center, along with related stress parameters, such as the surface compressive stress, the knee stress, the spike depth of layer, the total depth of layer, the depth of compression and the central tension. Other stress-related parameters include the variation in the birefringence with depth into the CS substrate.

There are two main methods used to characterize stress of a transparent CS substrate. The first utilizes evanescent prism coupling spectroscopy (EPCS). The EPCS method using a coupling prism to couple light into guided modes supported by a near-surface waveguide (NSWG) formed in the substrate, e.g., by an IOX process. A coupling prism is also used to couple light out of the NSWG to form a guided mode spectrum. The guide mode spectrum includes a transverse electric (TE) mode spectrum with TE mode lines and a transverse magnetic (TM) spectrum with TM mode lines. The TE and TM modes lines are analyzed to extract stress-related characteristics, including a stress profile. The EPCS method is particularly useful for characterizing stress in the near-surface region of the CS substrate (e.g., surface compressive stress and spike depth of layer) but is not useful for characterizing a central tension (CT) and depth of compression (DOC) that reside deeper within the substrate.

The second main method utilizes light-scattering polarimetry (LSP). In LSP, the CS substrate is irradiated with input laser light at a relatively shallow angle through a coupling prism. The laser light polarization is varied continuously between different polarization states using an optical compensator. The scattered light is detected by an image sensor. Stress in the CS substrate causes optical retardation along the light path, with the amount of stress being proportional to the derivative of the optical retardation. The amount of optical retardation can be determined from the detected scattered light intensity distribution, which varies due to the constructive and destructive interference for the different effective path lengths of the detected light. The LSP method is useful for measuring certain stress-related properties, such as the central tension (CT) and depth of compression (DOC) but is not useful for measuring near-surface stress-related properties.

Presently, to fully characterize the stress profile of a CS substrate from the surface to the center, the CS substrate is first measured using a EPCS measurement system and is them moved to a LSP measurement system and the two measurement stitched together. This is time consuming and introduces the risk of breakage by having to handle the CS substrate when moving the CS substrate between the two measurement systems.

It would therefore be more advantageous to have a single measurement system capable of performing both EPCS and LSP measurements.

SUMMARY

The hybrid measurement systems and methods disclosed herein enable a full stress characterization of a transparent CS substrate, including the surface stress S(0), the near-surface compressive stress profile S(x) including the knee stress $S_k=S(X_k)$, the depth of layer DOL, the central tension CT, and the depth of compression DOC. The full stress characterization is obtained by combining the stress calculations using both EPCS and LSP measurements.

An embodiment of the disclosure is directed to a scattered light polarimetry (LSP) sub-system of a hybrid system for characterizing stress in a chemically strengthened (CS) substrate having a top surface and a near-surface waveguide, including a LSP light source system, an LSP light source actuator coupled to the LSP light source system, wherein the LSP light source actuator is operable to rotate an orientation of the LSP light source system, and an optical compensator within an optical path of a LSP laser beam emitted by the LSP light source system. The optical compensator includes a half-wave plate and a half-wave plate actuator operable to rotate the half-wave plate, and a diffuser and a diffuser actuator operable to translate the diffuser along the optical path. The LSP sub-system further includes a LSP detector system in optical communication with the optical compensator through an LSP coupling prism having a LSP coupling surface, a focusing lens and a focusing lens actuator operable to translate the focusing lens along the optical path, and a support plenum having a surface and a measurement aperture, the support plenum configured to support the CS substrate at a measurement plane at the measurement aperture, and to operably support the LSP coupling prism.

Another embodiment of the disclosure is directed to a method of measuring first and second stress characteristics of a chemically strengthened (CS) substrate having a surface, a near-surface waveguide proximate the surface, and backing surface opposite the surface, that includes applying at least one ink line to the backing surface of the CS substrate, operably disposing the surface of the CS substrate relative to a coupling prism assembly at a measurement location, the coupling prism assembly including an evanescent prism coupling spectroscopy (EPCS) coupling prism and a light-scattering polarimetry (LSP) coupling prism to respectively define adjacent EPCS and LSP coupling interfaces, performing a EPCS measurement of the CS substrate using the EPCS coupling interface to obtain the first stress characteristics and performing a LSP measurement of the CS substrate using the LSP coupling interface to obtain the second stress characteristics without removing either the coupling prism assembly or the CS substrate from the measurement location, and combining the first and second stress characteristics to define a full stress characterization of the CS substrate, wherein the first stress characteristics are selected from the group of first stress characteristics including: a surface compressive stress S(0), a total depth of layer DOLT, a spike depth of layer DOLsp, a knee stress CSk and a birefringence B and the second stress characteristic comprises at least one of a depth of compression DOC and a central tension CT.

Another embodiment of the disclosure is directed to a method of processing a light-scattering polarimetry (LSP) image including forming an LSP image on a digital detector, processing the LSP image to form an optical retardation (OR) versus depth (D) curve of a retardation profile comprising OR data points that define first and second bend points and first and second end regions, and determining a top window and a bottom window of the OR versus D curve by: determining a first derivative curve of the OR versus D curve, selecting a starting edge and an ending edge of the retardation profile corresponding to a first minimum and a second minimum of the first derivative curve, respectively, wherein the first region comprises depths less than or equal to the starting edge and the second region comprises depths greater than or equal to the ending edge, determining a curvature of the OR versus D curve, determining a center of mass of a left side of the curvature defining the first bend point and a right side of the curvature defining the second bend point. The top window is defined by: a maximum line defined by a maximum retardation of the OR versus D curve, a lower line defined by a percentage of the maximum retardation of the OR versus D curve, the starting edge; and the ending edge. The bottom window is defined by a minimum line defined by a minimum retardation of the OR versus D curve, an upper line defined by a percentage of the maximum retardation of the OR versus D curve, the starting edge. and the ending edge.

In a 1$^{st}$ embodiment, a scattered light polarimetry (LSP) sub-system of a hybrid system for characterizing stress in a chemically strengthened (CS) substrate having a top surface and a near-surface waveguide, includes:

a LSP light source system;

an LSP light source actuator coupled to the LSP light source system, wherein the LSP light source actuator is operable to rotate an orientation of the LSP light source system;

an optical compensator within an optical path of a LSP laser beam emitted by the LSP light source system, the optical compensator comprising:

a half-wave plate and a half-wave plate actuator operable to rotate the half-wave plate, and a diffuser and a diffuser actuator operable to translate the diffuser along the optical path;

a LSP detector system in optical communication with the optical compensator through an LSP coupling prism having a LSP coupling surface;

a focusing lens and a focusing lens actuator operable to translate the focusing lens along the optical path; and a support plenum having a surface and a measurement aperture, the support plenum configured to support the CS substrate at a measurement plane at the measurement aperture, and to operably support the LSP coupling prism.

In a 2nd embodiment, for the 1st embodiment, further comprising an evanescent prism coupling spectroscopy (EPCS) sub-system comprising a EPCS light source system and a EPCS detector system in optical communication through an EPCS coupling prism having a EPCS coupling surface.

In a 3rd embodiment, for the 2nd embodiment, wherein the EPCS sub-system further comprises a polarizer positioned within the optical path at a distance from a detector device of the EPCS detector system within a range of XX to XX, including endpoints.

In a 4th embodiment, for any of the 1st through 3rd embodiments, wherein the half-wave plate actuator automatically rotates the half-wave plate such that the LSP laser beam as a predetermined beam intensity.

In a 5th embodiment, for any of the 1st through 4th embodiments, wherein the translatable diffuser actuator comprises a stepper motor.

In a 6th embodiment, for any of the 1st through 5th embodiments, wherein the translatable diffuser actuator automatically adjusts the position of the diffuser.

In a 7th embodiment, for any of the 1st through 6th embodiments, wherein the focusing lens actuator comprises a stepper motor.

In an 8th embodiment, for any of the 1st through 7th embodiments, wherein the focusing lens actuator automatically adjusts the position of the focusing lens.

In a 9th embodiment, a method of measuring first and second stress characteristics of a chemically strengthened (CS) substrate having a surface, a near-surface waveguide proximate the surface, and backing surface opposite the surface, comprising:

applying at least one ink line to the backing surface of the CS substrate;

operably disposing the surface of the CS substrate relative to a coupling prism assembly at a measurement location, the coupling prism assembly comprising an evanescent prism coupling spectroscopy (EPCS) coupling prism and a light-scattering polarimetry (LSP) coupling prism to respectively define adjacent EPCS and LSP coupling interfaces;

performing a EPCS measurement of the CS substrate using the EPCS coupling interface to obtain the first stress characteristics and performing a LSP measurement of the CS substrate using the LSP coupling interface to obtain the second stress characteristics without removing either the coupling prism assembly or the CS substrate from the measurement location; and combining the first and second stress characteristics to define a full stress characterization of the CS substrate, wherein the first stress characteristics are selected from the group of first stress characteristics comprising: a surface compressive stress S(0), a total depth of layer DOLT, a spike depth of layer DOLsp, a knee stress CSk and a birefringence B and the second stress characteristic comprises at least one of a depth of compression DOC and a central tension CT.

In a 10th embodiment, for the 9th embodiment, wherein performing the LSP measurement comprises:

forming an LSP image on a digital detector to define a raw digital LSP image;

performing a Gaussian-blurring of the raw digital LSP image to form a Gaussian-blurred LSP image;

performing an Otsu thresholding process on the Gaussian-blurred image to define a threshold image; and using the threshold image to calculate an optical retardation versus depth into the CS substrate to obtain the second stress characteristics.

In an 11th embodiment, for the 9th embodiment or the 10th embodiment, wherein performing the LSP measurement comprises:

forming an LSP image on a digital detector to define a raw digital LSP image;

performing Gaussian-blurring of the raw digital LSP image to form a Gaussian-blurred LSP image;

performing a binarizing method on the Gaussian-blurred LSP image to define an image contour; and and using the image contour to calculate an optical retardation versus depth into the CS substrate to obtain the second stress characteristics.

In a 12th embodiment, for any of the 9th embodiment through 11th embodiments, wherein performing the LSP measurement comprises:

forming an LSP image on a digital detector;

processing the LSP image to form an optical retardation (OR) versus depth (D) curve comprising OR data points; and employing a combination of linear and quadratic functions to obtain a fitted curve to the OR data points.

In a 13th embodiment, for any of the 9th embodiment through 12th embodiments, wherein performing the LSP measurement comprises:

forming an LSP image on a digital detector;

processing the LSP image to form an optical retardation (OR) versus depth (D) curve of a retardation profile comprising OR data points that include first and second bend points; and carrying at least one of the following acts:

i) employing a power-spike function to obtain a fitted curve to the OR data points; and ii) shifting the OR data points so that the first and second bend points are symmetric about the midplane of the CS substrate, thereby defining shifted OR data points; and employing the shifted OR data points to obtain a depth of compression DOC measurement for the CS substrate.

In a 14th embodiment, for any of the 9th embodiment through 13th embodiments, further comprising:

forming an LSP image on a digital detector;

processing the LSP image to form an optical retardation (OR) versus depth (D) curve of a retardation profile comprising OR data points that define first and second bend points and first and second end regions; and performing at least one of:

i) first and second curve fittings of the OR data points that respectively define the first and second bend points to determine a central tension CT for the CS substrate;

ii) a curve fitting of the OR data points between first and second bend points to determine a depth of compression DOC for the CS substrate; and iii) performing a curve fitting to the OR data points over a span that excludes the first and second end regions to define an OR-fitted curve, and using the OR-fitted curve to determine at least one of a central tension CT and a depth of compression DOC for the CS substrate.

In a 15th embodiment, for the 14th embodiment, wherein the curve fitting comprises performing a polynomial optimization process that determines an optimal polynomial order by applying a cost function.

In a 16th embodiment, for the 14th embodiment, wherein the curve fitting is performed within a top window and a bottom window of the OR versus D curve.

In a 17th embodiment, for the 16th embodiment, wherein the top window and the bottom window are determined by:

determining a first derivative curve of the OR versus D curve;

selecting a starting edge and an ending edge of the retardation profile corresponding to a first minimum and a second minimum of the first derivative curve, respectively, wherein the first region comprises depths less than or equal to the starting edge and the second region comprises depths greater than or equal to the ending edge;

determining a curvature of the OR versus D curve;

determining a center of mass of a left side of the curvature defining the first bend point and a right side of the curvature defining the second bend point; and the top window is defined by:

a maximum line defined by a maximum retardation of the OR versus D curve;

a lower line defined by a percentage of the maximum retardation of the OR versus D curve;

the starting edge; and the ending edge;

the bottom window is defined by:

a minimum line defined by a minimum retardation of the OR versus D curve an upper line defined by a percentage of the maximum retardation of the OR versus D curve the starting edge; and the ending edge.

In a 18th embodiment, for the 17th embodiment, further comprising applying a smoothing filter to the OR versus D curve.

In a 19th embodiment, for the 18th embodiment, wherein the smoothing filter is a LOESS filter.

In a 20th embodiment, for any of the 14th through 19th embodiments, further comprising identifying an entrance point and an exit point of a LSP laser beam on the CS substrate.

In a 21st embodiment, for the 20th embodiment, wherein the LSP image comprises a plurality of bright spots, and the identifying of the entrance point and the exit point comprises:

filtering a sub-set of bright spots of the plurality of bright spots that is outside of 50% above and below a thickness of the CS substrate and ±10 degrees around an angle of laser propagation;

creating a plurality of bright spot combinations of a remaining set of bright spots of the plurality of bright spots;

scoring each bright spot combination of the plurality of bright spot combinations for closeness to the thickness of the CS substrate, closeness to the angle of laser propagation, and a median intensity of light between each bright spot of the bright spot combination;

normalizing scores of the bright spot combinations;

for each bright spot combination, summing normalized scores for closeness to the thickness of the CS substrate, closeness to the angle of laser propagation, and the median intensity of light between each bright spot of the bright spot combination; and selecting a selected bright spot combination having a highest summed score among the bright spot combinations as the entrance point and the exit point.

In a 22nd embodiment, for any of the 14th through 21st embodiments, wherein the ink line applied by a black permanent marker.

In a 23rd embodiment, a method of processing a light-scattering polarimetry (LSP) image comprises:

forming an LSP image on a digital detector;

processing the LSP image to form an optical retardation (OR) versus depth (D) curve of a retardation profile comprising OR data points that define first and second bend points and first and second end regions;

determining a top window and a bottom window of the OR versus D curve by:

determining a first derivative curve of the OR versus D curve;

selecting a starting edge and an ending edge of the retardation profile corresponding to a first minimum and a second minimum of the first derivative curve, respectively, wherein the first region comprises depths less than or equal to the starting edge and the second region comprises depths greater than or equal to the ending edge;

determining a curvature of the OR versus D curve;

determining a center of mass of a left side of the curvature defining the first bend point and a right side of the curvature defining the second bend point; and the top window is defined by:

a maximum line defined by a maximum retardation of the OR versus D curve;

a lower line defined by a percentage of the maximum retardation of the OR versus D curve;

the starting edge; and the ending edge;

the bottom window is defined by:

a minimum line defined by a minimum retardation of the OR versus D curve;

an upper line defined by a percentage of the maximum retardation of the OR versus D curve;

the starting edge; and the ending edge.

In a 24th embodiment, for the 23rd embodiment, further comprising:

performing at least one of:

i) first and second curve fittings of the OR data points that respectively define the first and second bend points to determine a central tension CT for the CS substrate;

ii) a curve fitting of the OR data points between first and second bend points to determine a depth of compression DOC for the CS substrate; and iii) performing a curve fitting to the OR data points over a span that excludes the first and second end regions to define an OR-fitted curve, and using the OR-fitted curve to determine at least one of a central tension CT and a depth of compression DOC for the CS substrate.

In a 25th embodiment, for the 24th embodiment, wherein the curve fitting comprises performing a polynomial optimization process that determines an optimal polynomial order by applying a cost function.

In a 26th embodiment, for the 23rd or 24th embodiment, further comprising applying a smoothing filter to the OR versus D curve.

In a 27th embodiment, for the 26th embodiment, wherein the smoothing filter is a LOESS filter.

In a 28th embodiment, for any of the 23rd through 27th embodiments, further comprising identifying an entrance point and an exit point of a LSP laser beam on the CS substrate.

In a 29th embodiment, for the 28th embodiment, wherein the LSP image comprises a plurality of bright spots, and the identifying of the entrance point and the exit point comprises:

filtering a sub-set of bright spots of the plurality of bright spots that is outside of 50% above and below a thickness of the CS substrate and ±10 degrees around an angle of laser propagation;

creating a plurality of bright spot combinations of a remaining set of bright spots of the plurality of bright spots;

scoring each bright spot combination of the plurality of bright spot combinations for closeness to the thickness of the CS substrate, closeness to the angle of laser propagation, and a median intensity of light between each bright spot of the bright spot combination;

normalizing scores of the bright spot combinations;

for each bright spot combination, summing normalized scores for closeness to the thickness of the CS substrate, closeness to the angle of laser propagation, and the median intensity of light between each bright spot of the bright spot combination; and selecting a selected bright spot combination having a highest summed score among the bright spot combinations as the entrance point and the exit point.

The embodiments described may be combined in any suitable combination. Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description explain principles and operation of the various embodiments. As such, the disclosure will become more fully understood from the following Detailed Description, taken in conjunction with the accompanying Figures, in which:

FIGS. 4H-4J are schematic diagrams of an example LSP sub-system having adjustable components.

FIGS. 4P-4S are diagrams illustrating various LSP light source and LSP detector system orientations.

FIG. 10A is an example of an LSP section of the user interface showing an example digital LSP image and an intensity histogram of the digital LSP image.

FIGS. 13A and 13B are plots of the optical retardation OR (radians) versus the depth D (mm) into the CS substrate ("OR vs. D plots"), with FIG. 13A showing OR data collected by the LSP sub-system without using speckle reduction and FIG. 13 showing OR data collected by the LSP sub-system using speckle reduction.

FIGS. 14A and 14B are OR vs. D plots illustrating an example method of shifting the OR data to make the bend points BP1 and BP2 be symmetric around the mid-plane of the CS substrate.

FIG. 15A is an example OR vs. D plot that includes discrete data points (circles) and a fitted line to the OR vs. D data points, wherein the fitted line is formed using the "LinQuad" method disclosed herein.

FIG. 15B is a plot of the stress S (MPa) versus depth D (mm) based on the LinQuad fit to the OR vs. D data points of FIG. 15A.

FIG. 16A is an example OR vs. D plot that includes discrete data points (circles) and a fitted line to the OR vs. D data points, wherein the fitted line is formed using the power-spike method disclosed herein.

FIG. 16B is a plot of the stress S (MPa) versus depth D (mm) ("S vs. D plot") based on the power-spike fit to the OR vs. D data points of FIG. 16A.

FIGS. 17A and 17B are OR vs. D plots that show LinQuad curve fits to the original (raw) OR vs. D data points (FIG. 17A) and to the OR vs. D data with the symmetric component removed (FIG. 17B).

FIGS. 18A and 18B are OR vs. D plots that illustrate using reduced area fitting regions when calculating a select stress parameter, with FIG. 18A showing reduced-area fitting regions at the bend points BP1 and BP2 to calculate the depth of compression DOC and FIG. 18B showing a reduced-area fitting region between the bend points BP1 and BP2 to calculate the central tension CT.

FIG. 20 is similar to FIG. 3A and illustrates an embodiment of the EPCS sub-system wherein the detector system includes an adjustable focusing lens, wherein the adjustability includes at least one of axial movement and changing the focal length.

FIGS. 21A and 21B are schematic illustrations of example support members use to form a focusing lens assembly for the EPCS sub-system to provide a means for adjusting the contrast of the captured mode spectrum.

DETAILED DESCRIPTION

Figure 1A:
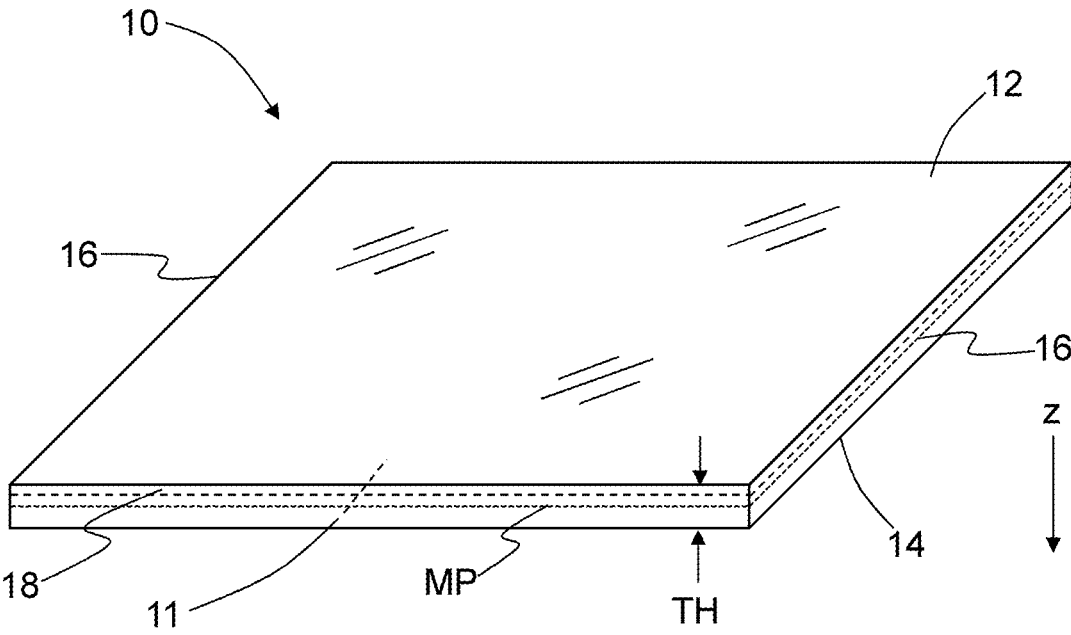
FIG. 1A is an elevated view of an example transparent CS substrate in the form of a planar sheet.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

In some parts of the discussion, the z coordinate is used for the depth direction into the substrate, while in other parts of the discussion a different coordinate is used.

The acronym "IOX" stands for "ion exchange" or "ion exchanged," depending on the context of the discussion.

The acronym "CS" when used to describe a type of substrate (as in "CS substrate") means "chemically strengthened." The acronym CS can also mean "compressive stress," and which meaning is being used for this acronym will be apparent by the context of the discussion.

The term "strengthened" for the CS substrates considered herein means that the original CS substrates have undergone a process to create some stress profiles that could have a variety of shapes, typically intended to make the CS substrates stronger and thus harder to break. Example strengthening processes include ion exchange, tempering, annealing and like thermal processes.

The term "transparent" as used in reference to the CS substrate means a CS substrate that has sufficient optical transmission at the give measurement wavelength (i.e., the EPCS wavelength $\lambda_A$ or the LSP wavelength $\lambda_B$) to make the satisfactory measurement (i.e., an EPCS measurement or a LSP measurement) of the CS substrate that yields a sufficiently accurate measurement of the stress characteristics associated with the given measurement.

The abbreviation "ms" stands for "millisecond."

The abbreviation "nm" stands for "nanometer."

The term "near-surface" such as when referring to a near-surface waveguide or a near-surface spike region of the CS substrate, refers to the portion of the substrate body that resides immediately adjacent a given surface (e.g., the top or measurement surface) of the CS substrate.

In an example, a glass-based substrate is used to form the CS substrate. The term "glass-based substrate" as used herein includes any object made wholly or partly of glass, such as laminates of glass and non-glass materials, laminates of glass and crystalline materials, and glass-ceramics (including an amorphous phase and a crystalline phase). Thus, in an example, the glass-based CS substrate" can consist entirely of a glass material while in another example can consist entirely of a glass-ceramic material.

The terms "image" and "line image" are used herein to describe a distribution of light (i.e., intensity distribution) of a portion of the X-shaped LSP image as formed by scattered light at digital detector (CCD camera or CMOS sensor, etc.) by the LSP sub-system, and an imaging system is not necessary to form the LSP image as considered herein.

In the discussion below, the LSP sub-system is configured to cycle between two or more polarization states (or just "polarizations" for short). In an example, there can be up to eight different polarization states per cycle that combine the linear, elliptical and circular polarizations as is known in the art. More polarizations may be used, for example up to one hundred or more.

The term "stress" as used herein can generally mean compressive stress or tensile stress. In the plots of FIGS. 15B, 16B, 19B and 19D, the compressive stress is negative while the tensile strength is positive. Whether the stress is compressive or tensile depends on the location or depth region of the CS substrate under consideration. A positive value for the compressive stress is understood to mean the magnitude of the compressive stress. The stress is denoted by S or by σ and is taken to refer to the compressive stress unless otherwise noted or as otherwise understood by the context of the discussion. In some instances, the compressive stress is denoted CS, such as for the knee stress $CS_k$. The stress profile is the stress S as a function of depth into the CS substrate, and the depth coordinate can be any local coordinate, and in the discussion below both z and x are used as the local coordinate.

In an example, the "characterizing" of a CS substrate includes determining one or more stress-based properties of the CS substrate, such as a stress profile S(z), a depth of layer DOL, a surface stress S(0), a depth of compression DOC, a central tension CT, and a birefringence profile B(z). In an example, the characterizing utilizes both EPCS and LSP measurements that respectively provide first and second stress characteristics that when combined provide a "full characterization" of the stress characteristics of the CS substrate, wherein the term "full characterization" means a more complete characterization of the stress and stress-related properties than is possible with just the first stress characteristics of the EPCS measurements or just the second stress characteristics of the LSP measurements.

The acronym "OR" stands for "optical retardation" and is measured in radians ("rads") unless otherwise stated. Plots of the optical retardation versus depth into the CS substrate are referred to below as "OR vs. D" curves or plots, where D is understood as being the depth into the CS substrate body from the top (measurement) surface.

The term "index-matching fluid" means a fluid with a refractive index substantially the same as another material to facilitate optical coupling. In an example, the index-matching fluid comprises an oil or a mixture of oils. The refractive index of the index-matching fluid is denoted by either of or $n_f$ or $n_{oil}$, i.e., these two expressions are used interchangeably below.

The CS Substrate

FIG. 1A is an elevated view of an example type of CS substrate 10 in the form of a planar sheet. The CS substrate 10 has a body 11, a top surface 12, a bottom surface 14 and sides 16. The CS substrate 10 has a thickness TH and a mid-plane MP halfway between the top surface 12 and bottom surface 14 and parallel thereto.

In some cases, the thickness TH can be in the range from 0.020 mm≤TH≤2 mm, such as 0.050 mm≤TH≤2 mm, 0.20 mm≤TH≤2 mm, 0.25 mm≤TH≤2 mm, 0.3 mm≤TH≤2 mm, or 0.3 mm≤TH≤1 mm, and any and all sub-ranges formed between these endpoints.

Example types of CS substrates 10 are glass-based and are used as protective covers for displays and/or housings for mobile devices such as smart phones, tablets, laptop computers, GPS devices, etc. Such CS substrates 10 tend to be thin and planar, such as shown in FIG. 1A.

The CS substrate 10 includes a near-surface waveguide (NSWG) 18 that resides in the body 11 proximate the top surface 12. In an example, the NSWG 18 is formed using an IOX process and is defined by at least one IOX region of varying refractive index.

Figure 1B:
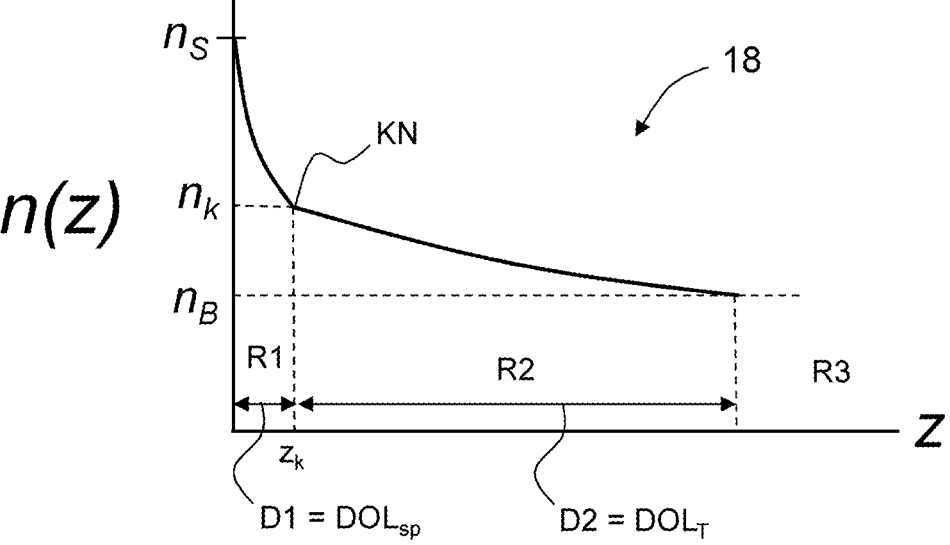
FIG. 1B is an example refractive index profile n(z) versus z of an example transparent CS substrate showing a near-surface spike region (R1), a deeper region (R2) and a bulk region (R3), with a knee (KN) at the transition between the regions R1 and R2.

FIG. 1B is a plot of the refractive index n versus the depth z into the CS substrate for an example NSWG 18. The surface refractive index is denoted $n_S$ while the bulk refractive index, i.e., the refractive index of the substrate material that has not been affected by the chemical strengthening process is denoted $n_B$.

The plot of FIG. 1B shows an example refractive index profile n(z) that defines two (IOX) regions, namely a first near-surface spike region R1 and a second deep region R2. There is also a third region R3 deeper than the second deep region and it is referred to herein as the "bulk" region having the refractive index $n_B$. The near-surface spike region R1 has a maximum refractive index $n_S$ at the surface and a rapid decrease in the refractive index with depth (z) to a value $n_k$ over a relatively shallow depth z=D1 that defines a first "spike" depth of layer $DOL_{sp}$. The deep region R2 has a slower decrease in the refractive index from $n_k$ down to a depth D2 that defines a total depth of layer $DOL_T$ where the third bulk region R3 starts. The first and second regions R1 and R2 meet at (and thus define) a knee KN at z=$z_k$ where as noted above the refractive index n=$n_k$ and which is associated with a knee (compressive) stress $CS_k$.

Because of the two distinct refractive-index regions R1 and R2 in the NSWG 18, certain guided modes propagate only in the uppermost spike region R1 while other guided modes travel in both regions R1 and R2, while still other guided modes travel only in the deep region R2. Other refractive index profiles n(z) include more uniform changes in the refractive index. Some of the deep guided modes can extend into the bulk region R3.

The refractive index profile n(z) of FIG. 1B can be formed by a dual IOX (DIOX) process where one IOX process forms the deep region R2 and another IOX process different from the first IOX process forms the spike region R1. The plot of FIG. 1B is representative of a DIOX process carried out in Li-containing glass substrate 10 wherein Li ions are exchanged with potassium and sodium ions in two distinct IOX processes, with the potassium IOX process generating the spike region R1.

The Hybrid EPCS-LSP System

Figure 2A:
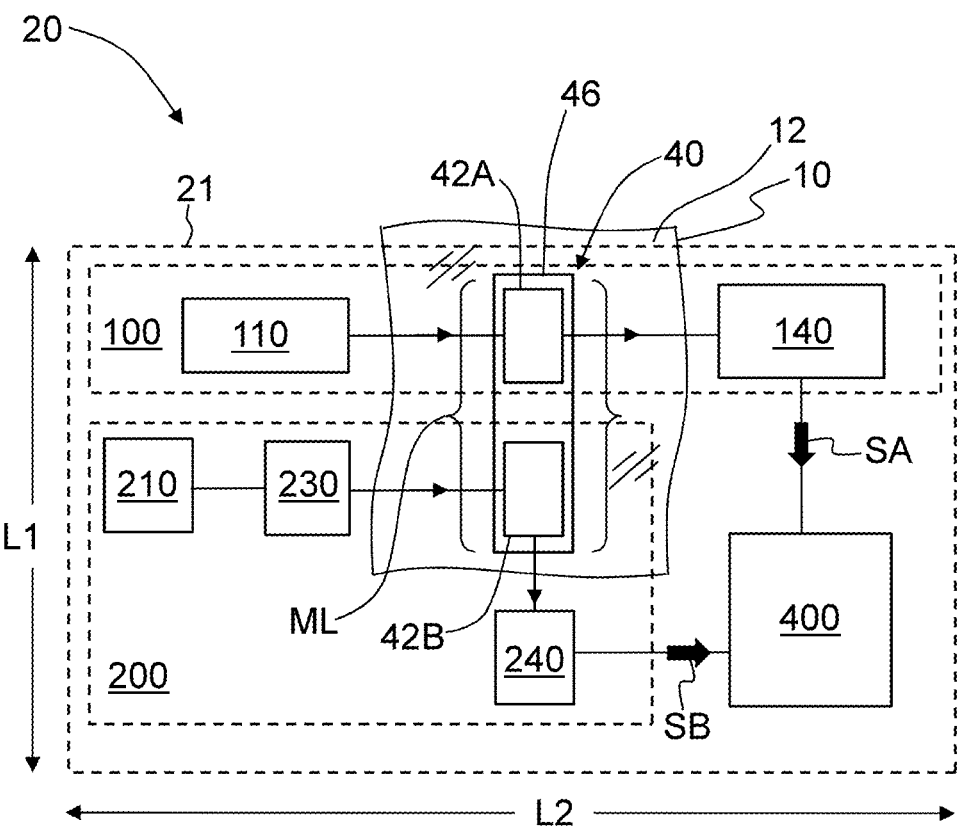
FIG. 2A is a schematic diagram of the hybrid EPCS-LSP measurement system as disclosed herein for fully characterizing the stress of a transparent CS substrate.

FIG. 2A is a schematic diagram of the hybrid EPCS-LSP measurement system ("hybrid system") 20 as disclosed herein shown along with an example CS substrate 10. The hybrid system 20 includes a coupling prism assembly 40, a EPCS measurement sub-system ("EPCS sub-system") 100, a LSP measurement sub-system ("LSP sub-system") 200, and a system controller 400. The coupling prism assembly 40 defines a measurement location ML on the CS substrate 10.

The EPCS sub-system 100 generates an EPCS measurement signal SA representative of first stress characteristics of the CS substrate at the measurement location ML as embodied in a mode spectrum of the guided modes of the NSWG 18. The first stress characteristics can include one or more of the following: a surface compressive stress S(0), a total depth of layer $DOL_T$, a spike depth of layer $DOL_{sp}$, a knee stress $CS_k$ and a birefringence B.

The LSP sub-system 100 generates a LSP measurement signal SB representative of second stress characteristics of the CS substrate at the measurement location ML as embodied in optical retardation (OR) information as a function of depth into the CS substrate, including the deep region R2. The second stress characteristics can include one or more of the following: a stress profile, a depth of compression DOC and a central tension CT.

In an example, EPCS and LSP measurements of the first and second stress characteristics are made without moving the measurement location ML. In another example, the EPCS and LSP measurements of the first and second stress characteristics are made by translating the coupling prism assembly 40 such that the EPCS and LSP measurements are made at the same position on the substrate rather than at slightly spaced part positions at the measurement location as defined by the configuration of the coupling prism assembly.

In an example, the EPCS and LSP measurements of the first and second stress characteristics are made without removing either the coupling prism assembly 40 or the CS substrate 10 from the measurement location ML. This represents an advantage over the prior art in that both EPCS and LSP measurements can be made in a single system without having to remove or otherwise handle the CS substrate to bring it to a different measurement system.

The EPCS and LSP measurement signals SA and SB are sent to the system controller 400 for processing. The system controller 400 can comprise for example a micro-controller, computer, programmable logic controller (PLC), etc. In an example, the system controller 400 is configured with instructions embodied in a non-transitory computer-readable medium (e.g., software) to control the operation of the hybrid system 20 and perform the calculations for determining the first and second stress characteristic of the CS substrate 10 based on the EPCS and LSP measurement signals SA and SB.

In an example, the system controller 400 processes the EPCS and LSP measurement signals SA and SB to define a stress profile and related stress characteristics from the top surface 12 of the CS substrate 10 down to at least the bottom of the deep region R2. In other words, the system controller combines the first and second stress characteristics obtained from EPCS sub-system 100 and the LSP sub-system 200 to generate a more complete or "full" stress profile of the CS substrate than is possible with just one of the measurement sub-systems.

The coupling prism assembly 40 includes a EPCS coupling prism 42A and a LSP coupling prism 42B operably supported by a prism support structure 46. The coupling prism assembly 40 is operably disposed on or proximate the top surface 12 of the CS substrate 10. In examples discussed below, the EPCS coupling prism 42A and the LSP coupling prism 42B can be separate coupling prisms or different sections of a single (common) coupling prism.

With continuing reference to FIG. 2A, the hybrid system 20 includes an example housing 21 having dimensions L1 and L2. Example dimensions for L1 and L2 are in the range from 8 inches to 12 inches for a relatively compact embodiment of the hybrid system 20.

The EPCS sub-system 100 includes a EPCS light source system 110 and a EPCS detector system 140 optically coupled via the EPCS coupling prism 42A. The LSP sub-system 200 includes a LSP light source system 210, an optical compensator 230 and a LSP detector system 240 optically coupled to the optical compensator via the LSP coupling prism 42B. The detector systems 140 and 240 are operably connected to the system controller 400. Examples of the EPCS sub-system 100 is described in U.S. Pat. Nos. 9,534,981 and 9,696,207, which are incorporated by reference herein. Examples of the LSP sub-system 100 are described in U.S. Pat. No. 4,655,589, and in U.S. Provisional Patent Application Ser. No. 62/753,388, which are incorporated by reference herein.

Figure 2B:
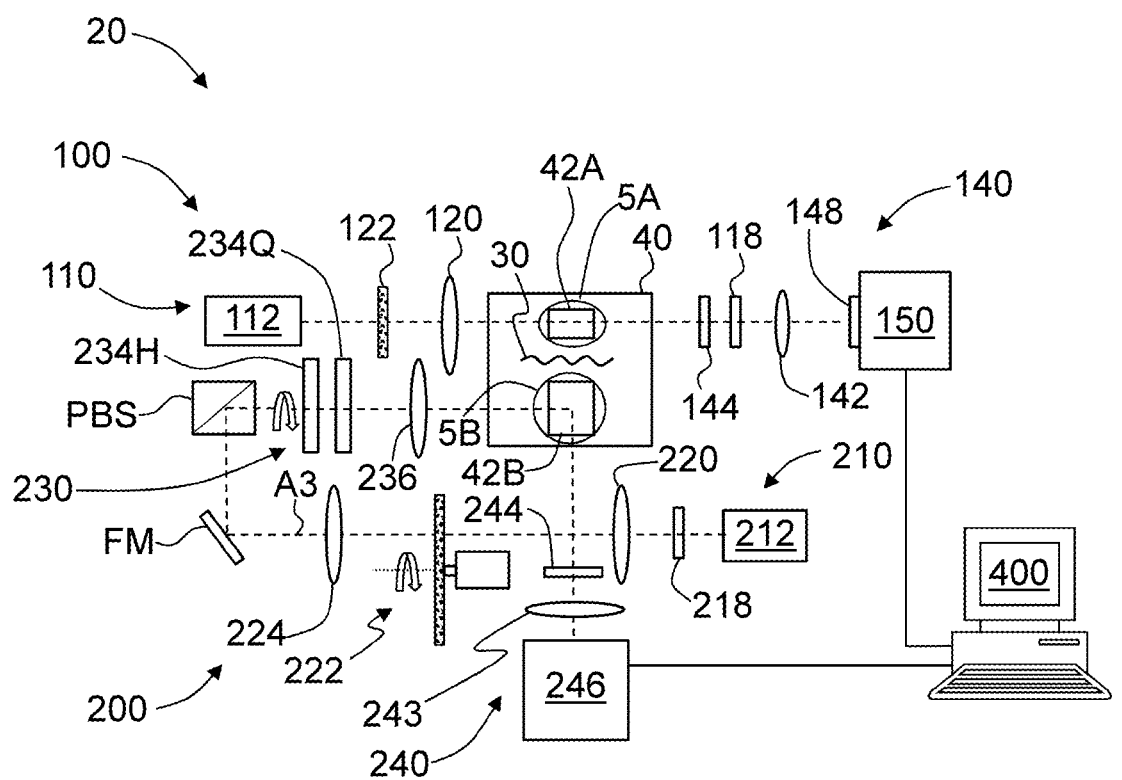
FIG. 2B is a more detailed schematic diagram of the hybrid EPCS-LSP system of FIG. 2A, showing example configurations for the EPCS measurement sub-system and the LSP measurement sub-system.
Figure 3A:
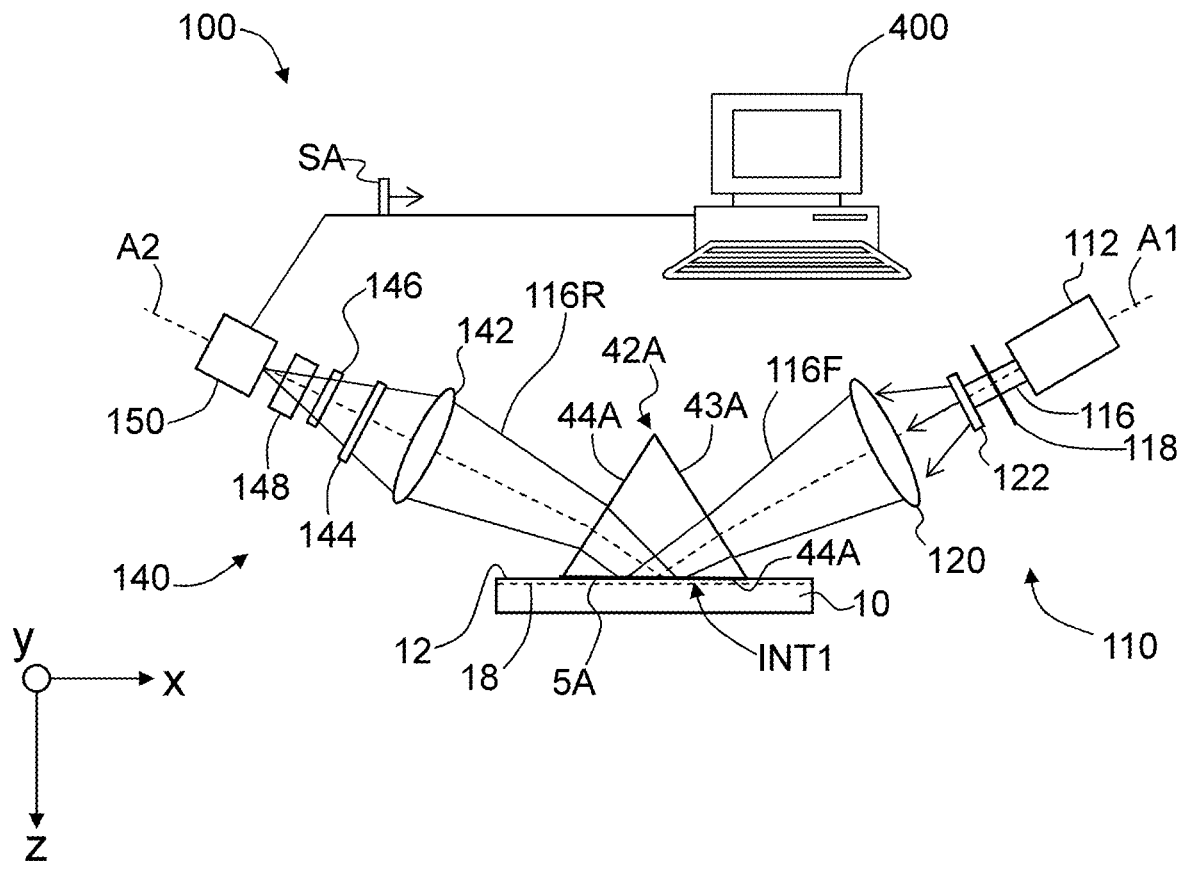
FIG. 3A is a schematic diagram of an example EPCS sub-system of the hybrid EPCS-LSP system of FIG. 2A.
Figure 4A:
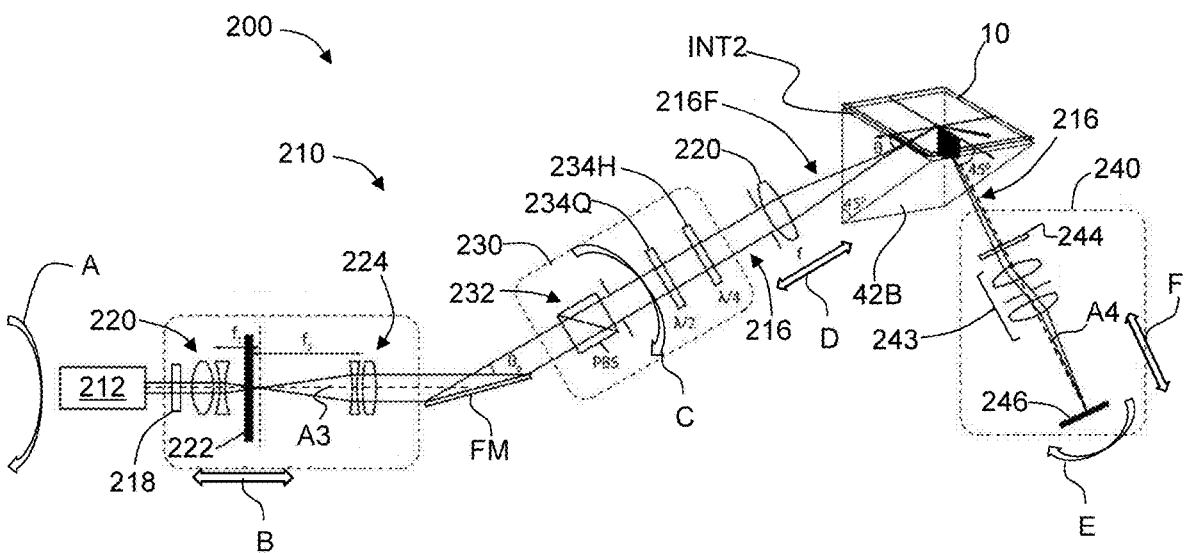
FIGS. 4A through 4C are schematic diagrams of example LSP sub-systems of the hybrid EPCS-LSP system of FIG. 2A.
Figure 4B:
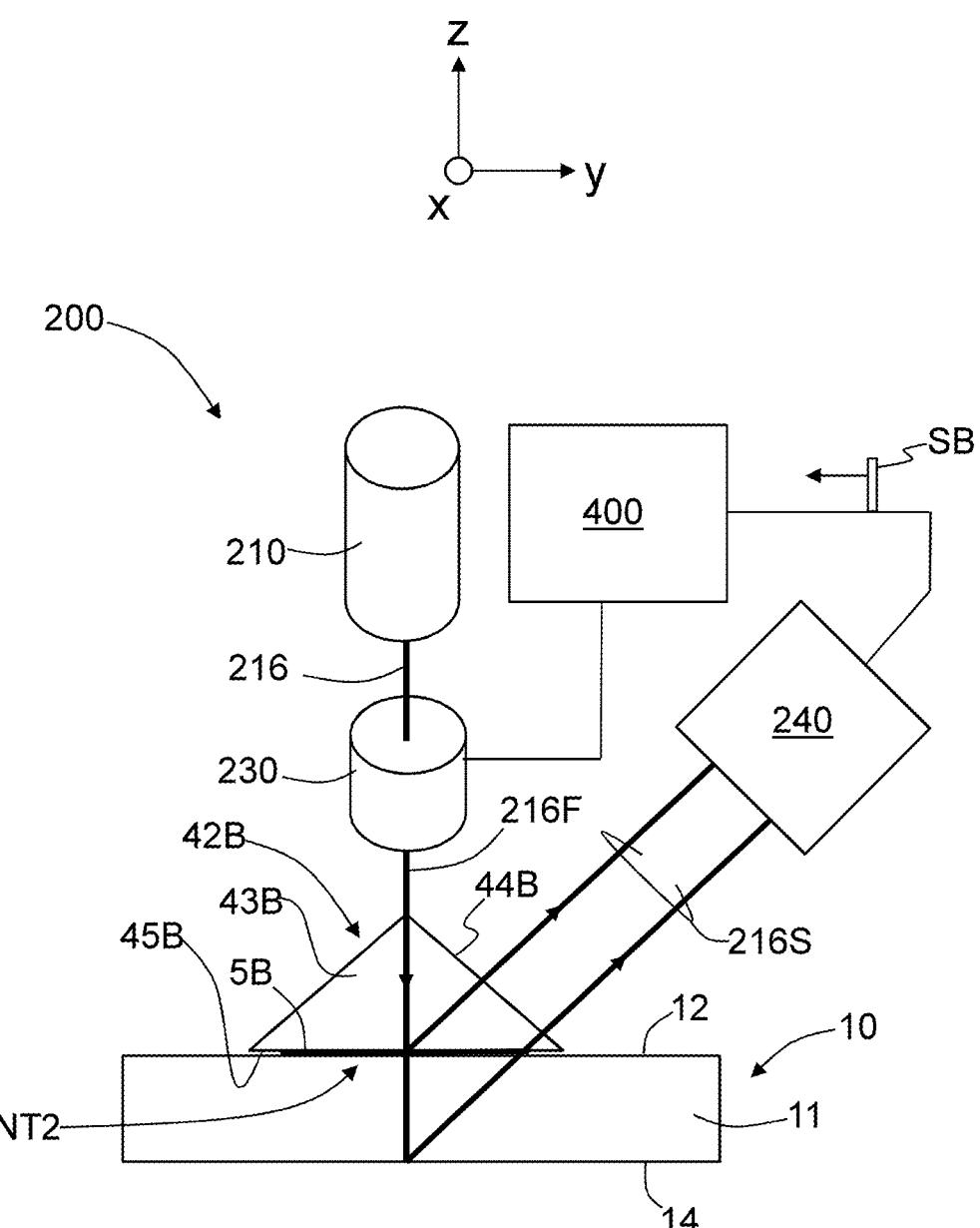
Figure 4C:
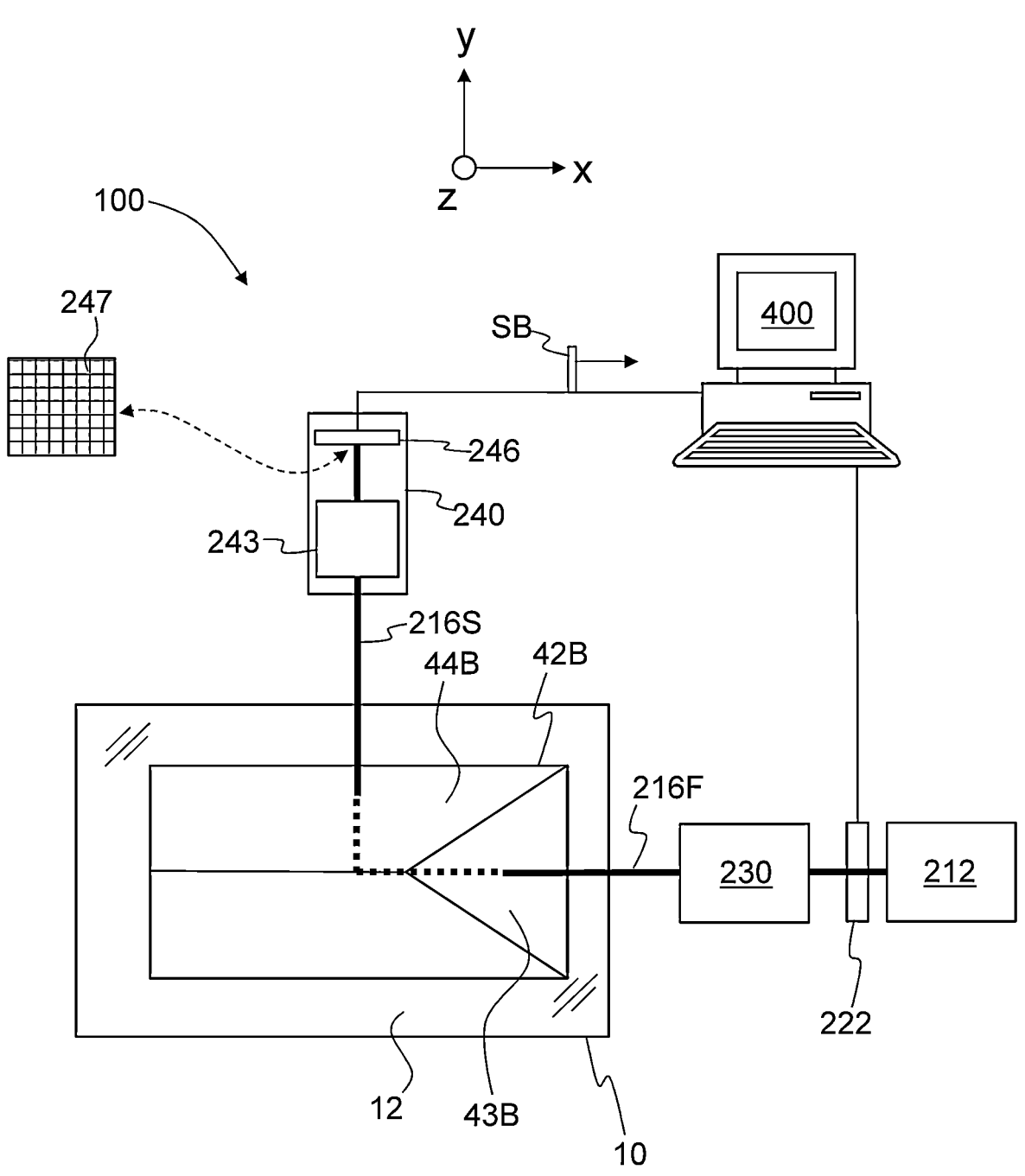

FIG. 2B is a more detailed schematic diagram of the hybrid EPCS-LSP system of FIG. 2A, showing example configurations for the EPCS measurement sub-system 100 and the LSP measurement sub-system 200. FIG. 3A is a schematic diagram of example EPCS sub-system 100. FIGS. 4A through 4C are schematic diagrams of example LSP sub-systems 200.

The EPCS Sub-System

With reference to FIG. 2B and FIG. 3A, the EPCS light source system 110 of the EPCS sub-system 100 includes a EPCS light source 112 that generates a EPCS light beam 116 at a first wavelength $\lambda_A$ along a first axis A1. The first wavelength $\lambda_A$ can also be referred to as the EPCS wavelength.

The EPCS light source system 110 also includes along the first optical axis A1: an optional polarizer 118, a light diffuser 122 that resides downstream of the EPCS light source 112, and a focusing lens 120 that resides downstream of the light diffuser. In an example, the light source comprises a light-emitting diode (LED), and further in an example the LED operates at an EPCS measurement wavelength $\lambda_A$ of 365 nm. The EPCS detector system 140 resides along a second axis A2 and includes in order along the second axis: a focusing lens 142, a band-pass filter 144 centered on the wavelength $\lambda_A$, an attenuator 146, a TM-TE polarizer 148 (which has TM and TE sections, not shown) and a digital detector (e.g., a digital camera, image sensor, CCD array, etc.) 150 that has TM and TE sections (not shown) as defined by the TM-TE polarizer 148.

The EPCS light beam 116 from the EPCS light source 112 is diffused by the light diffuser 120 and is focused by the focusing lens 120 to form a focused EPCS light beam 116F. The focused EPCS light beam 116F is incident upon the EPCS coupling prism 42A at an input surface 43A. This couples the EPCS focused light beam into the NSWG 18 at a first (EPCS) coupling interface INT1 defined by the top surface 12 of the CS substrate and a bottom or "coupling" surface 45A of the EPCS coupling prism 42A. The first coupling interface INT1 can include an index-matching fluid 5A, as discussed in greater detail below.

A reflected EPCS light beam 116R is formed from the focused EPCS light beam 116F at the first EPCS coupling interface INT1 and exits the output surface 44A of the EPCS coupling prism 42A to travel along a second axis A2. The first and second axes A1 and A2 residing in a common plane (e.g., x-z plane of FIG. 3A). The reflected EPCS light beam 116R includes information about the mode spectrum of the guided modes of the NSWG 18. The reflected EPCS light beam 116R is focused by the focusing lens 142 in the EPCS detector system 140 to form an image of the mode spectrum of the guided light at the EPCS digital detector 150.

The band-pass filter 144 assures that only the reflected EPCS light beam 116R makes it through to the digital detector 150. The attenuator 146 assures that the detected reflected EPSC light beam 116R has the appropriate intensity distribution for efficient digital detection. The TM-TE polarizer 148 defines TM and TE sections for the digital detector so that TM and TE mode spectra can be captured by the digital detector 150. The TM and TE mode spectra are embodied in the first detector signal SA sent to the system controller 400 for processing. It is noted that the order of the band-pass filter 144, the attenuator 146 and the focusing lens 142 is not critical and is intentionally shown as being different between FIGS. 2B and 3A to illustrate this point.

Figure 3B:
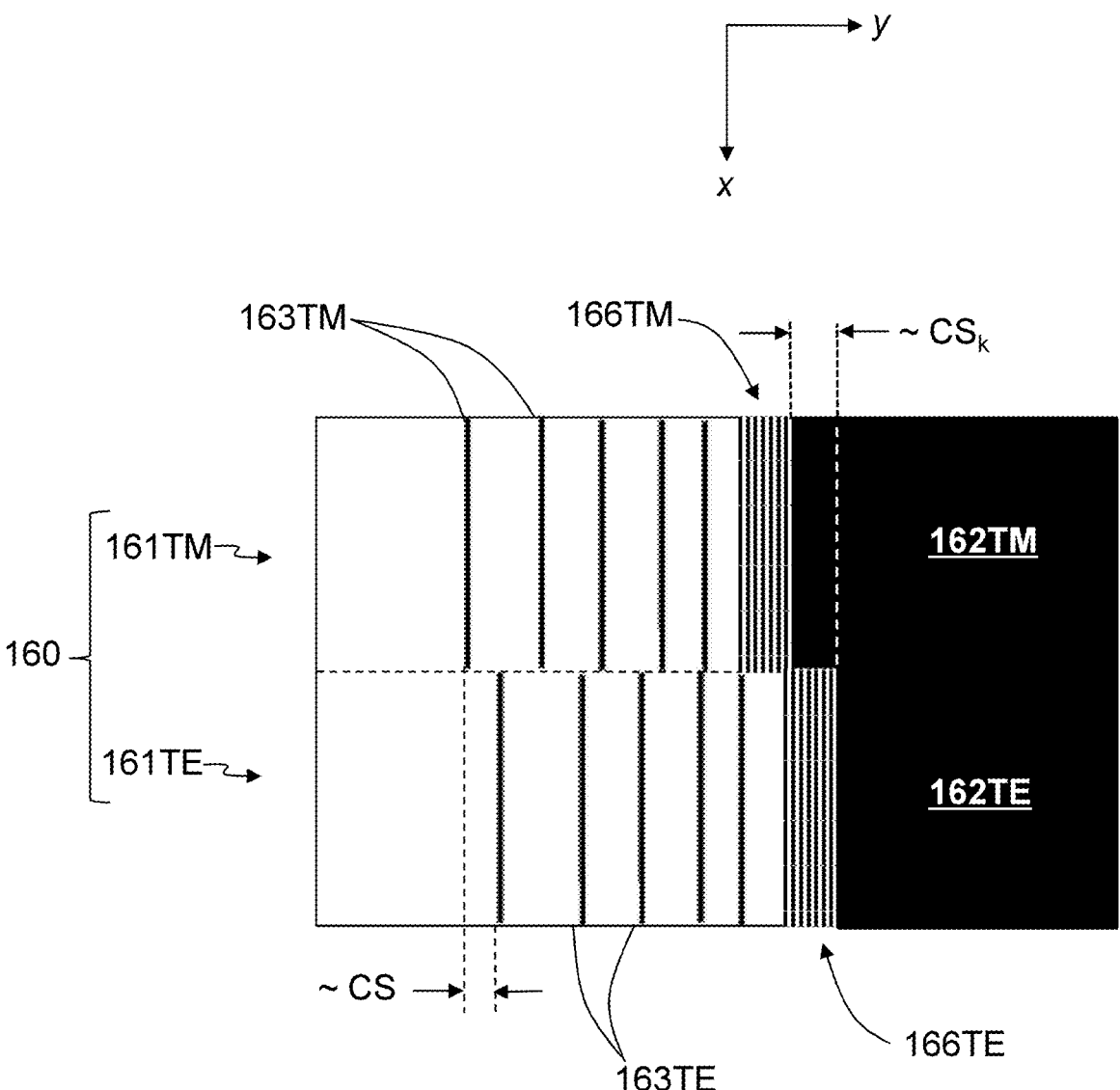
FIG. 3B is a schematic diagram of an example EPCS mode spectrum obtained by the EPCS sub-system, wherein the EPCS mode spectrum includes a TM mode spectrum with TM mode lines (fringes) and a TE mode spectrum with TE mode lines (fringes).

FIG. 3B is a schematic representation of an idealized mode spectrum 160 as captured by the digital detector 150. Local (x,y) Cartesian coordinates are shown for reference. The mode spectrum 160 has TM and TE total-internal-reflection (TIR) sections 161TM and 161TE respectively associated with TM and TE guided modes, and non-TIR sections 162TM and TE respectively associated with TM and TE radiation modes and leaky modes. The TIR section 161TM includes one or more TM mode lines or TM "fringe" 163TM while the TIR section 161TE includes one or more TE mode lines or TE "fringes" 163TE. The TM and TE mode lines 163TM and 163TE are generally aligned in the x direction and are spaced apart in the y direction.

Transition regions ("transitions") 166TM and 166TE between the TIR section 161TM, 161TE and the non-TIR sections 162TM, 162TE define a critical angle for the optical coupling into and out of the NSWG 18 of the CS substrate 10 for TM and TE polarized light, and are referred to as the critical angle transitions. The difference in locations of the start of the critical angle transitions 166TM and 166TE is proportional to the knee stress $CS_k$ and this is proportionality is indicated by "~$CS_k$" in FIG. 3B.

The TM and TE mode lines 163TM and 163TE can either be bright lines or dark lines, depending on the configuration of the EPCS sub-system 100. In FIG. 3B, the TM and TE mode lines 163TM and 163TE are shown as dark lines for ease of illustration.

The stress characteristics for the EPCS measurement are calculated based on the difference in they positions of the TM and TE mode lines 163TM and 163TE in the mode spectrum 160. The birefringence B is the difference between the effective indices of the TM and TE polarizations, wherein the effective indices are represented by the y positions of the mode lines. The surface compressive stress S(0)=CS is computed by the y distances between the mode lines (effective indices) and the ratio B/SOC, where SOC is the stress optic coefficient. At least two TM and TE mode lines 163TM and 163TE are needed to calculate the surface stress S(0). Additional mode lines are needed to calculate the compressive stress profile S(z). The depth of layer $DOL_T$ is a measure of stress penetration or ion penetration length into the body 11 of the CS substrate 10, and in the case of an IOX process, can also be calculated by the y-locations and number of mode lines 163TM and 163TE. The TM and TE mode line locations along the y axis are thus the most basic measurement for inferring stress-related characteristics of the CS substrate 10. The calculations for determining the stress characteristics of the CS substrate 10 based on the EPCS measurements using the EPCS sub-system 100 are carried out in the system controller 400.

Figure 3C:
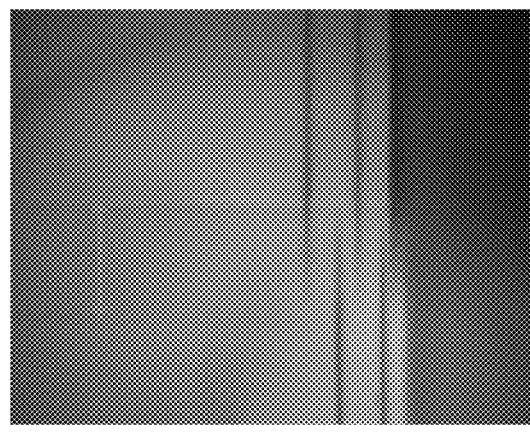
FIG. 3C is an EPCS image with a polarizer positioned relatively far from a digital detector.
Figure 3D:
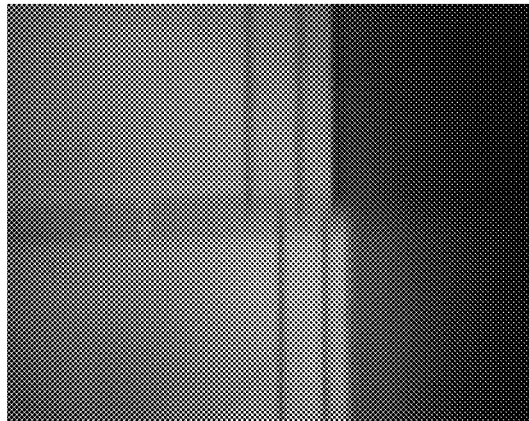
FIG. 3D is an EPCS image with a polarizer positioned closer to a digital detector than the polarizer placement of FIG. 3C.

In some cases, a defect in the form of a horizontal band across the image is present as an image of the split polarizer line of the TE-TM polarizer 148 placed in the optical path of the reflected EPCS light beam 116R. By moving the TE-TM polarizer 148 closer to the digital detector 150, the size of the horizontal band may be reduced, which in turn helps reduce the noise in the fringe detection. FIG. 3C illustrates a horizontal band having a width as indicated by the arrow resulting from the TE-TM polarizer 148 being positioned a distance from the digital detector 150. FIG. 3D illustrates a horizontal band having a width as indicated by the arrow resulting from the TE-TM polarizer 148 being positioned a closer distance from the digital detector 150. Thus, closer placement of the TE-TM polarizer 148 to the digital detector 150 results in a smaller horizontal band.

The LSP Sub-System

With reference now to FIG. 2B and FIGS. 4A through 4C, the LSP light source system 210 of the LSP sub-system 200 includes a LSP light source 212 that generates a LSP light beam 216 of wavelength $\lambda_B$ along a third axis A3. In an example, the LSP light source 212 is configured as a laser diode that operates at a second wavelength $\lambda_B$=415 nm. The second wavelength $\lambda_B$ can also be referred to as the LSP wavelength.

The LSP light source system 210 includes in order along the third axis A3: an optional neutral density filter 218 (shown in FIGS. 2B and 4A), a first focusing lens 220, a movable light diffuser 222, and a second focusing lens 224. The movable light diffuser 222 can comprise a holographic element configured to perform light diffusion at the wavelength $\lambda_B$. In an example, the movable light diffuser can comprise rotating light diffuser or oscillating light diffuser. One or more fold mirrors FM can be used to fold the LSP sub-system 200 to make it more compact. In some embodiments, neutral density filter 218 can be replaced by a half-wave plate which will control the dominant axis of polarization such that at the PBS, there will be more or less turning.

The optical compensator 230 resides along the (folded) third axis A3 and includes a polarizer 232, which can be in the form of a polarizing beam splitter PBS. The optical compensator 230 also includes a half-wave plate 234H and a quarter-wave plate 234Q with one of the wave plates being rotatable relative to the other to change the state of polarization of the LSP light beam 216. In an example, the optical compensator 230 can comprise an electronically controlled polarization modulator, such as a liquid-crystal-based modulator or a ferroelectric liquid-crystal-based modulator or like modulator.

In an example, the optical compensator 230 is operably connected to or otherwise includes a controller (not shown) that controls the polarization switching operation performed by the optical compensator. In an example, the optical compensator 230 can comprise a single liquid crystal device. In another example, the optical compensator 230 can comprise multiple elements such as polarizers, wave plates, filters, prisms (e.g., wedge prisms), etc. In an example, the optical compensator 230 causes the LSP light beam 216 to go through a full polarization cycle (i.e., change between two or more select polarizations) in anywhere from less than 1 second to 10 seconds. In an example, the optical compensator 240 can be operably connected to and controlled by the system controller 400.

A third focusing lens 236 resides downstream of the optical compensator 230 and is used to form a focused LSP light beam 216F, which is directed to the LSP coupling prism 42B. The LSP coupling prism has respective input and output surfaces 43B and 44B and a bottom or "coupling" surface 45B. The coupling surface 45B and the top surface 12 of the CS substrate 10 defines a second (LSP) coupling interface IF2. In an example, the second coupling interface INT2 includes an index matching fluid 5B, as discussed below.

The LSP detector system 240 resides along a fourth axis A4 that is orthogonal to the third axis A3, i.e., the fourth axis A4 resides in the Y-Z plane.

In an example, the LSP detector system 240 includes a collection optical system 243 and a digital detector (e.g., a CCD camera) 246. In an example, the collection optical system 243 is telecentric and has unit magnification. The LSP detector system 240 can also include a bandpass filter 344 centered on the second wavelength $\lambda_B$. In the example shown in FIG. 4C, the digital detector 246 comprises array of imaging pixels 247, which in an example can have a dimension of between 1.1 microns and 10 microns, or 1.8 microns and 10 microns.

In the operation of the LSP sub-system 200, the focused LSP light beam 216F is incident upon the input surface 43B of the LSP coupling prism 42B and travels to the coupling surface 45B and then through the index-matching fluid 5B and to the top surface 12 of the CS substrate 10 to enter the body 11 of the CS substrate. The focused LSP light beam 216F has a select polarization at any given time as defined by the optical compensator 230. The (polarized) input LSP light beam 216F is scattered by features in the body 11 of the CS substrate 10 to form a scattered LSP light beam 216S. The scattered LSP light beam 216S exits the CS substrate 10 at the top surface 12, passes back through the second coupling interface INT2 and then exits the LSP coupling prism 42B at the output surface 44B. The scattered LSP light beam 216S travels to the LSP detector system 240 and is directed to the digital detector 246 by the collection optical system 243. The scattered LSP light beam 216S forms a LSP image 248 on the digital detector 246, as shown in the close-up view of FIG. 4D. This defines a digital LSP image. The LSP image 248 as discussed below is taken to be the digital LSP image unless otherwise noted. The characteristic "X" shape of the LSP image 248 is known in the art of LSP and is due to reflections of the scattered light beam 216S from the different interfaces associated with the LSP interface INT2 as defined by CS substrate 10, LSP coupling prism 242B and the index-matching fluid 5B.

Figure 4D:
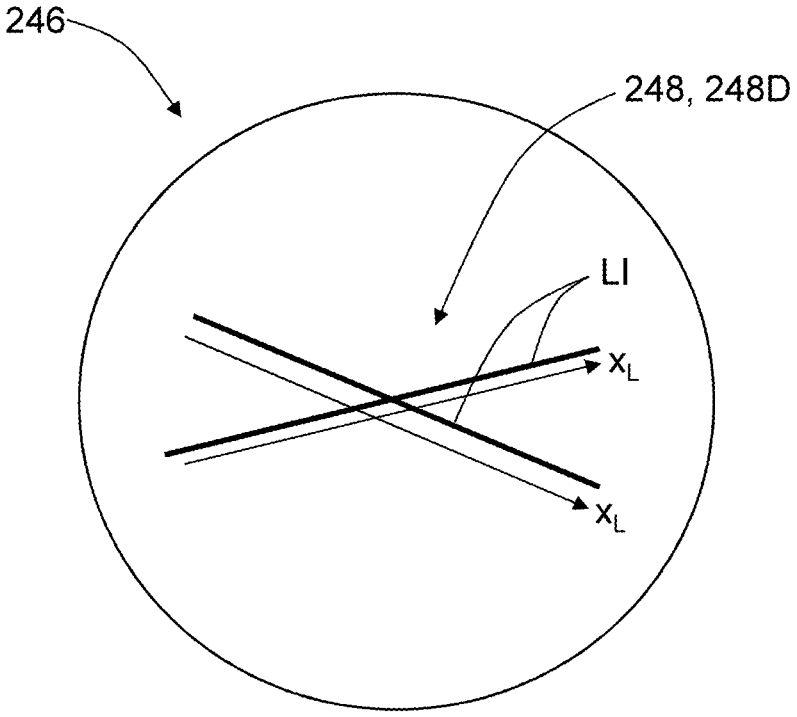
FIG. 4D is a close-up view of an LSP image formed on the digital detector of the LSP sub-system, wherein the LSP image includes two-line images that form a cross or an "X" pattern, and wherein the LSP image and digital detector form a digital LSP image.

As shown in FIG. 4D, the X shape of the LSP image 248 is defined by two crossed line images LI each having a local length coordinate $x_L$ along its length. Each line image LI has an intensity distribution $I(x_L)$ that is measured by the pixels 247 that coincide with the line image. The digital detector converts the intensity distributions $I(x_L)$ to a second detector signal SB, which is sent to the system controller 400. Only one of the line images LI is needed for performing a measurement. In an example, image processing is used to identify a portion of the LSP image 248 for use subsequent processing to extract the optical retardation information, as explained below.

In an example, a given measurement of the CS substrate 10 using the LSP sub-system 200 includes making measurements for a measurement time $t_M$ of between 1 second and 10 seconds. During the measurement time $t_M$, the polarization state of the LSP light beam 216 varies between the different polarization states, preferably making one or more cycles through the polarization states. Meantime, for each polarization state, the digital detector 246 captures the LSP image 248 during exposure times $t_E$. In an example, the exposure times $t_E$ are about the same as the frame rate FR of the digital detector 246. An example exposure time $t_E=50$ ms, which corresponds to a frame rate FR=20 frames per second. The exposure time $t_E$ can also be less than the frame rate.

The electronically captured LSP images 248 differ in their intensity distributions $I(x_L)$ depending on the polarization state of the input LSP light beam 216R and the stress-induced optical retardation incurred along the beam path. The difference is due to the difference in the destructive and constructive interference along the length of the scattered LSP light beam 216S as a function of depth D into the CS substrate 10 between the different polarization states. The differences between the multiple intensity distributions $I(x_L)$ for the different polarization states is used by the system controller 400 to calculate an optical retardance OR as a function of depth D into the CS substrate body 11 using relationships well known in the art. Likewise, multiple optical retardance curves OR vs the depth D ("OR vs. D plots") are calculated using the differences in the intensity distributions $I(x_L)$. For example, for a 3 second measurement time $T_M$ with an image sensor frame rate FR of 20 frames/second, a total of 60 plots of $I(x_L)$ vs. D can be generated to compute OR vs. D and used to calculate one or more stress-related characteristics of the CS substrate 10.

While the intensity distributions $I(x_L)$ for the LSP image 248 necessarily differ between polarization states of the input light beam 112 when there is stress present in the CS substrate 10, the different OR vs. D curves (plots) as calculated from the measured intensity distributions should ideally be the same for a given CS substrate at the given measurement location for CS substrates where the stress profile is (ideally) constant.

While LSP measurement technique can generate a stress profile S(z), it does not generally produce an accurate representation of the stress profile in the near-surface region of the CS substrate 10. There are least two problematic effects that present challenges for extracting an accurate characterization of the near-surface stress profile for a CS substrate 10 using an LSP measurement from the LSP sub-system 200. One problematic effect is referred to as a "fireball" effect, which is caused by excessive light scattering at the LSP interface INT2. The excessive light scattering generates noise, which corrupts the LSP measurement data for near-surface region, which in an example is the first 60 microns to 100 micrometers below the top surface 12 of the CS substrate 10.

The other problematic effect is caused by the convolution of photons scattered from different depths into the signal corresponding to a particular depth. This convolution significantly changes the signal in the region where stress changes fast, which is usually in the near-surface compression region, most often in the first 80 microns, 100 microns, or 150 microns, but sometimes as high as 200 microns. The region of fast change is thicker for larger thicknesses of Li-based glass.

Some prior-art LSP systems attempt to decrease these convolution effects by using a very focused beam near the CS substrate surface, with beam diameter as small as 10 microns. Unfortunately, this leads to other problems—such as increased laser noise (e.g., speckle) in the same depth region of interest, making the extracted stress profiles in the near-surface region even less reliable.

LSP Light Source Testing

The quality of reliability of the LSP light source 212 affect the overall performance of the hybrid systems 20 described herein. Thus, LSP light sources 212 should be thoroughly evaluated before inclusion in a hybrid system 20. Embodiments of the present disclosure also include a test fixture 300 along with tight laser specifications to quantify and qualify each laser being use in a hybrid system 20.

Figure 4E:
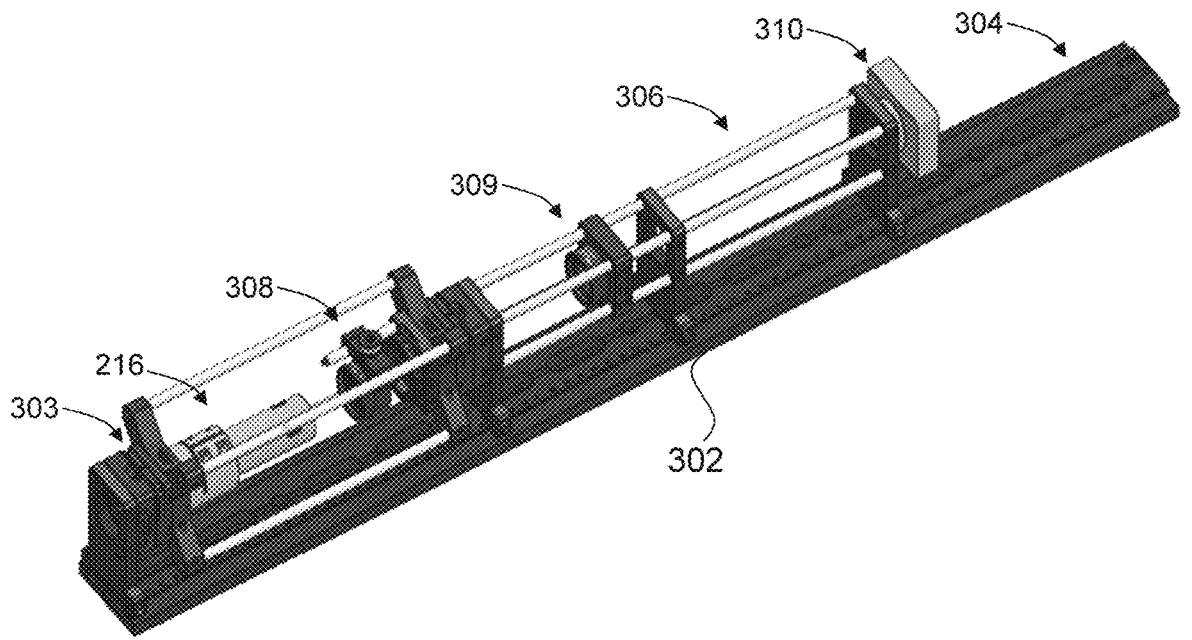
FIG. 4E is a schematic diagram of an example LSP light source test fixture.

Referring to FIG. 4E, an example test fixture 300 is illustrated. The test fixture 300 may include a base 302 along which a plurality of optical components may be mounted. The test fixture 300 further includes a laser mount 303 constructed to hold the LSP light source 212 against the same fiducial surface as when installed in the LSP sub-system 200. The laser mount 303 may be mounted on a rotary bearing such that the bearing axis of rotation is colinear with the laser axis. The test fixture 300 further includes a collimating lens 308 for collimating a laser beam produced by the LSP light source 2121, a focusing lens 309 mounted so that its optical axis is also colinear to the laser axis, and a sensor 310 mounted perpendicular to the laser axis. This sensor 310 is precisely positioned to be at the focal point of the focusing lens 309 when the focusing lens is illuminated by a collimated beam at the precise LSP light source 212 operating wavelength centered on the focusing lens 309 lens and aimed along its optical axis. The various optical components may be mounted on rails 306 such that their positions may be adjusted along the base 302.

The LSP light source 212 may be evaluated using the test fixture 300 prior to being installed in a LSP sub-system of a hybrid system 20. If the LSP light source 212 is properly collimated, then the laser beam will be focused to a nearly diffraction limited spot on the sensor 310. By prescribing a maximum allowable spot size, the collimation quality of the LSP light source 212 can be controlled. As the rotary bearing is rotated, the focused spot describes a circle on the sensor 310. The radius of this circle measures the boresight error of the LSP light source 212 with respect to its fiducial surface. By prescribing a maximum circle rotation, the boresight quality of the laser can be controlled.

High Effective Laser Power

It will be appreciated that in the precise measurement of materials which produce less scattering, e.g. glass, lasers having either larger effective laser power, lower measurement noise or both, may be desired for sufficient signal-to-noise ratios. In some embodiments, referring to FIG. 4F depicting an example LSP light source system 210, higher laser power is achieved by using a semi-conductor laser die for the LSP light source 212 that provides higher power and a collimator lens 231 that collects that power from the LSP light source 212 into a clean Gaussian beam that can be focused to a small beam spot within the sample 10 by a focusing lens 236.

Figure 4F:
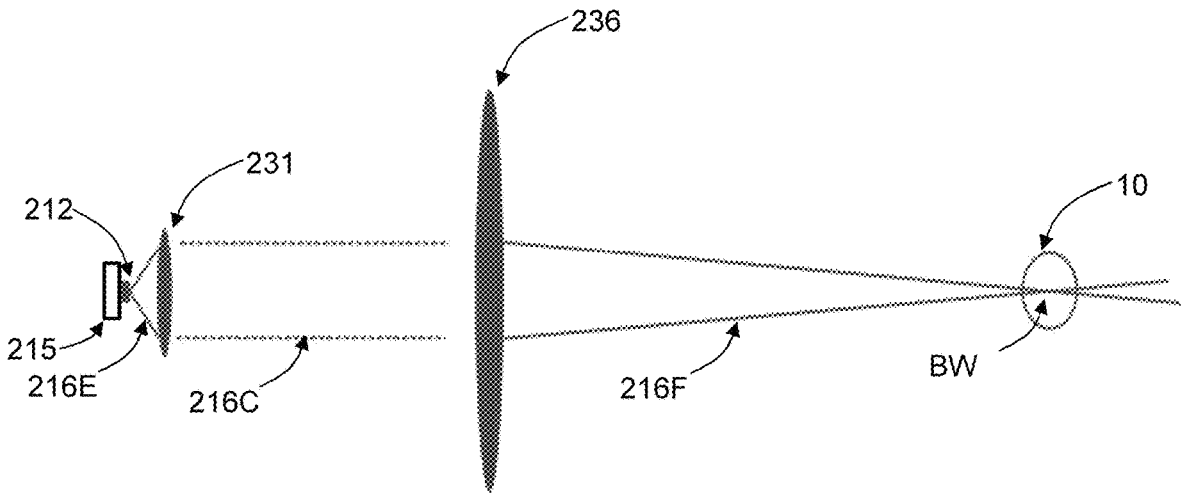
FIG. 4F is a schematic diagram of an example optical model for generating optimal optical power at an optimal wavelength from an LSP light source.

As shown in FIG. 4F, this can be achieved, for example, by using a laser die that produces a single mode astigmatic Gaussian beam with semi-angle of approximately 15 degrees and 5 degrees, respectively, and waist at the diode of approximately 0.4 um×1.4 um, respectively. The light from this laser can be collected for example by a 7 mm focal length, 0.5 NA molded aspheric collimator lens 231. If the collimator lens 231 and subsequent optics maintain the beam quality and given a 100 mm focusing lens 236, this provides a beam waist BW of approximately 6 um×21 um at the object location in the sample 10. This small beam size provides high spatial measurement resolution.

Active Laser Temperature Control for Wavelength Tuning

To reduce measurement noise, all extraneous light that is not part of the measurement laser beam should be eliminated. One example approach to accomplish this is to use a spectral filter in front of the camera to block light of wavelengths different from that of the illuminating laser. This filter will block both ambient light and any fluorescent light excited by the laser. To be most effective, this filter should have a spectral width comparable to the spectral width of the laser.

Figure 4G:
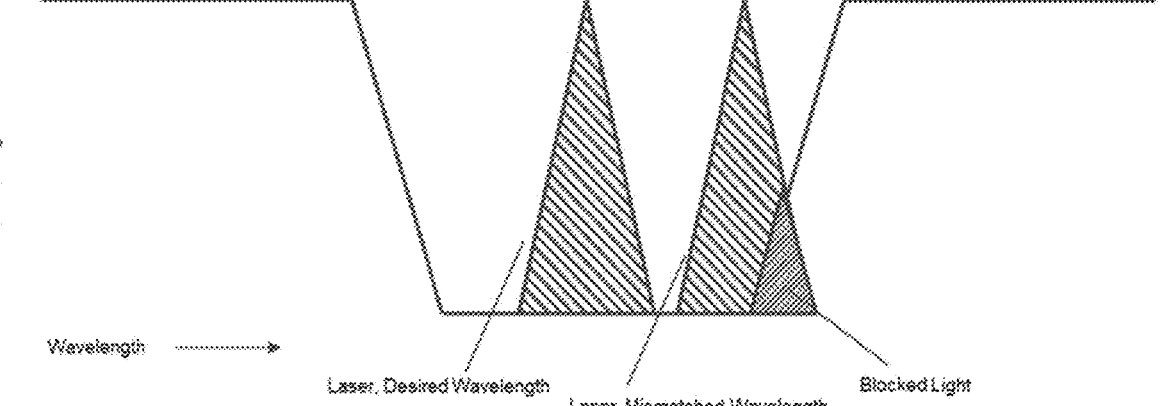
FIG. 4G is a plot showing blocked light from a filter due to laser wavelength mismatch.

However, the wavelength of diode lasers can vary from their nominal wavelength from die to die, and also as the temperature of the die changes. This can lead to a mismatch between the laser and the filter as shown in FIG. 4G, such that some of the light from the laser is blocked by the filter. This reduces the effective power of the laser. In some embodiments, this problem is mitigated by selecting lasers and actively tuning the wavelength by setting the temperature of die. As a non-limiting example, this can be accomplished by using a Peltier cooler and an active control system such that the die is tuned to the precise temperature to radiate at the desired wavelength and maintained at that temperature regardless of the ambient temperature and the power dissipated by the laser die. FIG. 4F illustrates an example cooler and active control system 215 for optimally setting the temperature of the die of the LSP light source 212 to ensure the power of the laser passes through the filter.

LSP Sub-System Calibration

Calibration of the LSP sub-system 200 should be employed to ensure proper hybrid system 20 operation. However, manual calibration of the LSP sub-system 200 leads to user error in setup as well as potential damage to components within the LSP sub-system 200. In manual calibration, system adjustments are performed by an operator manually adjusting a component, analyzing the image or gauge provided via software, and then readjusting as necessary. The user-based feedback loop can cause issues due to sensitivity of the system gauges as well as user error derived from perceived image quality and visualization.

Additionally, current scattered light polarimetry devices use rudimentary manually adjusted slides, knobs, and set screws to control the placement of the LSP sub-system 200 components for system calibration. These manual adjustments and locking devices can cause damage to the components, such as flat spots created by set screws, which will in turn lead to future errors when calibrating the system.

Thus, in some embodiments, the LSP sub-system 200 includes actuators that enable automatic calibration with minimal manual intervention. The actuators provide for the adjustment of at least five SLP sub-system 200 components: rotatable laser orientation, rotatable half-wave plate, translatable diffuser, translatable focusing lens, and translatable/rotatable camera. System calibration involves adjusting each of these components to set various parameters, such as, without limitation, speckle percentage, beam width, intensity, beam focus, camera focus, and camera tilt.

Figure 4H:
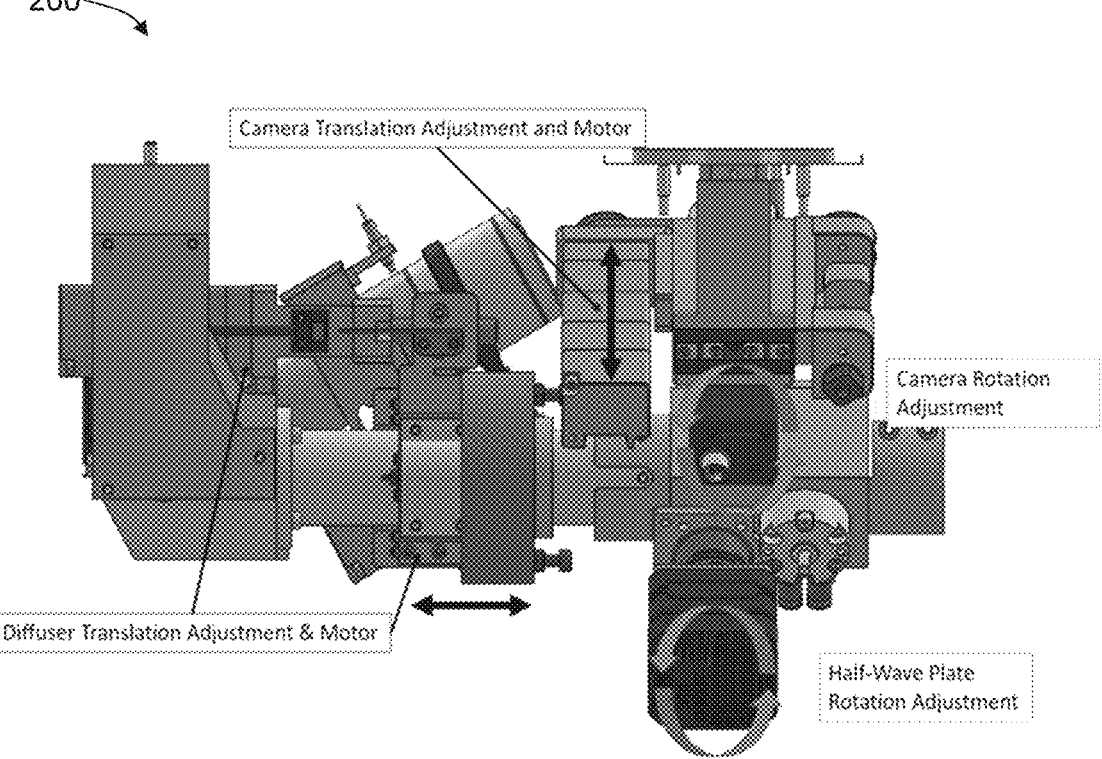
Figure 4I:
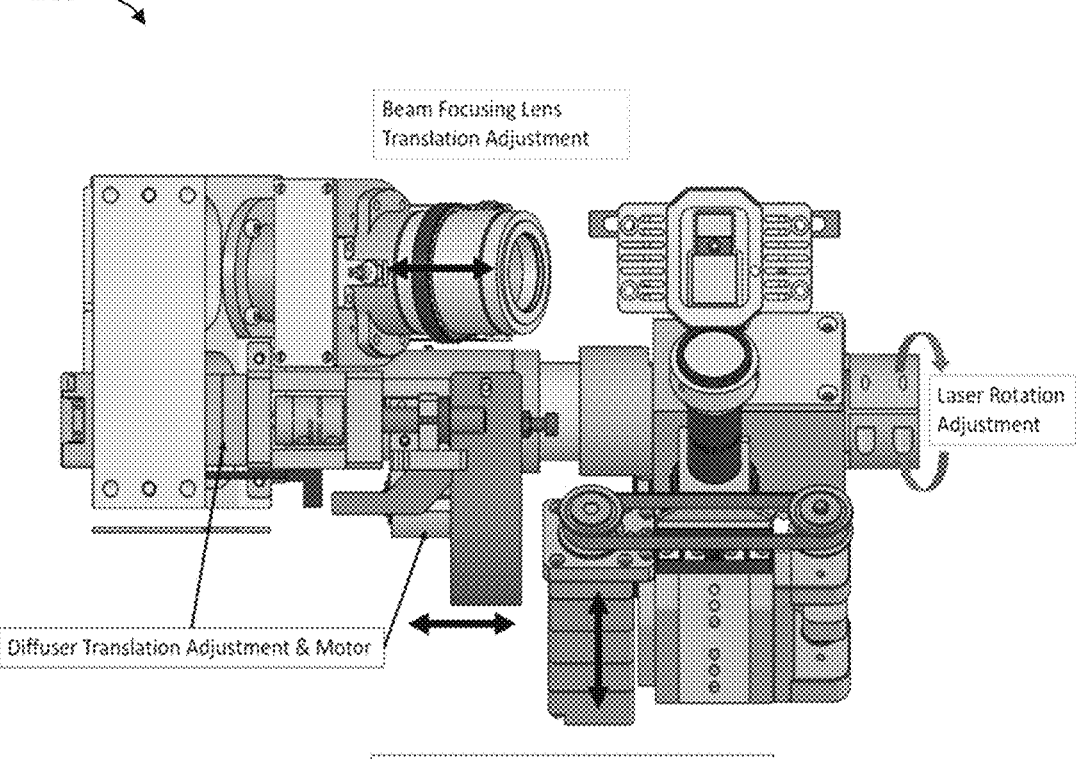

Referring once again to FIG. 4A, the LSP light source 212 may be rotated within its mount by an actuator (e.g., a motor) as shown by arrow A. This changes the orientation of its elliptically shaped laser beam. FIG. 4I illustrates an example LSP sub-system 200 having a rotatable SLP light source 212. The LSP light source 212 is rotated such that its smallest waist is oriented toward the digital detector 246 to minimize beam width. LSP light source 212 is rotated to a repeatable stable condition during initial system set up and is generally not adjusted during system calibration.

In addition to the LSP light source 212, the diffuser 222 is mounted on an actuator (e.g., a stepper motor) that enables the position of the diffuser 222 to be controlled +/−5 mm relative to the focus spot of a fixed lens, as illustrated by arrow B. The positioning apparatus may have sensors to reduce the risk of over adjustment and harm to the components of the LSP sub-system 200. Adjusting this position affects the beam width and the speckle percentage of the beam within a sample. FIG. 4H illustrates the example LSP sub-system 200 of FIG. 4I having a translatable diffuser 222.

The half-wave plate 234H may also be coupled to an actuator (e.g., a motor) that enables it to be rotated, as illustrated by arrow C. Rotation of the half-wave plate 234H changes the intensity of the laser beam across the thickness of the sample. The user can manually input a "forward" or "backward" command to adjust the beam intensity, or software can automatically position the half-wave plate to the correct position for optimal beam intensity during an automated calibration process. FIG. 4H illustrates how the half-wave plate may be rotated.

Further, the focusing lens 236 is mounted on an actuator (e.g., a stepper motor) that enables the position of the focusing lens 236 to be translated as indicated by arrow D. The beam focus of the LSP laser light source 212 may be controlled by translating the fixed focal distance focusing lens 236 relative to the position of the sample on the prism, which affects the beam focus parameter. FIGS. 4I and 4J illustrate how the focusing lens may be rotated.

The detector device 150 may also be fixed to one or more actuators that enable it to be translated and/or rotated, as indicated by arrows E and F. The detector device 150 may be mounted to a translation stage that is used to move the detector device 150 relative to the position of the sample on the prism, thereby changing the camera focus parameter. Movement of the detector device 150 accounts for the fixed focal distance on the telecentric lens used on the detector device 150. The motor can be controlled by way of software inputs to adjust the position of the detector device 150 for the best image focus. The detector device 150 may also be rotated in its mount, which affects camera tilt. The detector device 150 may be rotated in an initial system setup that can be accurately adjusted using software gauges and is generally not adjusted during normal system calibration. FIGS. 4H and 4I illustrate how the detector device 150 (i.e., camera) may be rotated and translated.

The motorized components described above enable the automation of calibration. Embodiments provide for a single step calibration method where a single software action can automatically set all component positions for best performance.

Selection of Entrance/Exit Locations of the Beam

For the measurement of a glass sample, the LSP analysis selects the entrance and exit points of the laser traveling through the sample in the image. These points are typically seen as bright "fireballs" and may be selected using an image contour detection algorithm. However, if there are specks of dirt, bubbles, or fingerprints on the sample, it may be difficult for the image contour algorithm to choose which bright spots are the true fireballs and thus the true entrance and exit locations. Embodiments of the present disclosure may employ a scoring system to choose which combination of points are the most likely candidate for being the entrance and exit fireballs.

Firstly, point combinations are excluded from the selection process if they are not within a certain threshold of known restrictions on the system. Because the general thickness of the sample and angle by which the laser is propagating can be estimated, all point combinations that fall outside of 50% above and below the thickness and ±10 deg around the angle of laser propagation are excluded from the selection process. For the remaining point combinations, each combination is scored on (1) their closeness to the sample thickness, (2) their closeness to the angle of laser propagation, and (3) on their median intensity of light between the two points. Because the laser is propagating between the entrance and exit points, it is presumed that the median intensity will be larger than that between any two random points on the image.

The scoring is calculated by taking the full spread of values and normalizing them to a range of 0 to 1 (with 1 being the best score). For example, the point combination that has the brightest inter-point intensity will be scored at 1, whereas the combination with the dimmest intensity will be scored at 0. Once the scoring is finished, the combination with the best overall score across all three requirements will be reported as the entrance and exits points of the laser.

Figure 4K:
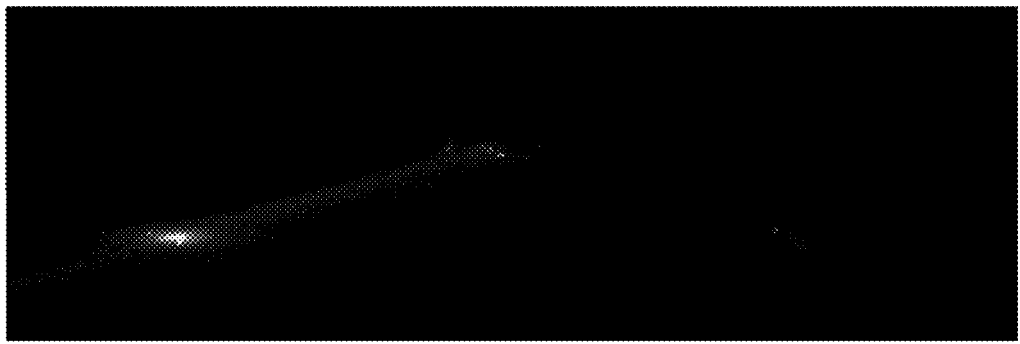
FIG. 4K is an example LSP image showing entrance and exit points.
Figure 4L:
FIG. 4L is the example LSP image of FIG. 4K showing an indication of the algorithmically determined entrance and exit points.

FIG. 4K illustrates a digital image of a sample taken by the system from which the entrance and exit points are selected. FIG. 4L illustrates the digital image with the final point combination chosen as crosses, and the yellow contours represent all of the points initially detected by the image processing algorithm and then were rejected.

LSP Laser Orientation Optimization

The LSP light beam 216 orientation has an impact on the accuracy of the central tension measurement of a part. There is an optimum orientation whereby the beam width BW is smallest in the middle of the sample 10. With the optimum orientation identified, all of the hybrid system 20 instruments can be assembled in a similar manner to reduce device-to-device measurement variations.

Figure 4M:
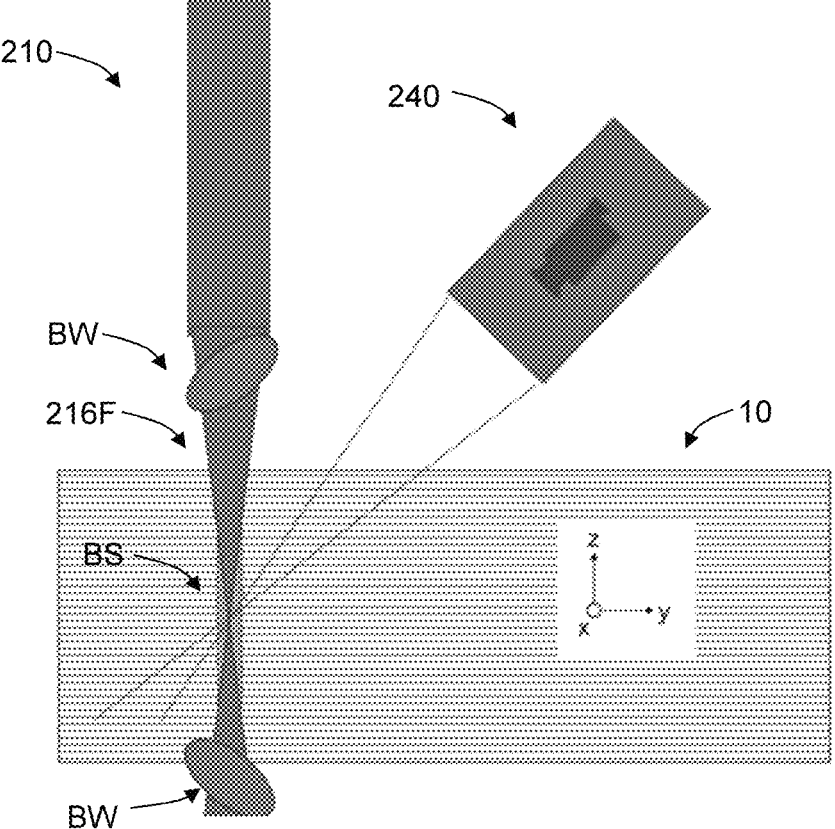
FIG. 4M is a simplified diagram of the LSP sub-system of FIG. 4B.

FIG. 4M is a simplified diagram of the sub-system 200 illustrated by FIG. 4B. The focused LSP light beam 216F is orientated such that the beam width BW is minimized from both the focused laser minimum waist at the specimen center of thickness (BS) as well as from the best focus of the LSP detector system 240.

Because the focused LSP light beam 216F and LSP detector system 240 views of the focused LSP light beam 216F are at angles relative to the stress profile (illustrated by the horizontal lines in the sample 10), it is a three-dimensional analysis to determine the proper orientation of the LSP light beam 216. The analysis incorporates the intersection of four three-dimensional features:

1. The stress profile of the sample (i.e., the "layers" or gradient through the sample thickness).
2. The cross-section of the LSP light beam 216F relative to the layers of the sample.
3. The view of the LSP detector system 240 that is perpendicular to the LSP light beam 216F relative to the layers of the sample.
4. In the view of the LSP detector system 240, the pixels that are chosen to be grouped (by averaging, or various fitting methods) to reduce the noise in the data associated with some point in the thickness.

Ideally, the values grouped all represent light integrated from the same depth in the thickness. Minimizing the dimensions of the LSP light beam 216F and the illumination collection depth of the LSP detector system 240 is one way to optimize the measurement. Were the illumination sufficient to still observe the scattered light with the LSP detector system 240, instead of a beam, a thin sheet of illumination could be used. Light sheets have been applied to microscopy, primarily for fluorescence, this would be for scattered light polarization analysis.

Figure 4N:
FIG. 4N is a diagram illustrating an LSP light beam appearing fat to a LSP detector system.
Figure 4O:
FIG. 4O is a diagram illustrating an LSP light beam appearing thin to a LSP detector system.

The cross-section profile of the LSP light beam 216F has an ellipse power distribution. The orientation of the ellipse (and the beam shape) can be chosen to improve the quality of the retardation data for the measurement in embodiments of the present disclosure. The LSP detector system 240 view of the ellipse changes the integrated light to the sensor. In FIG. 4N, the LSP light beam 216F appears "fat" to the LSP detector system 240 but the light on a sensor pixel is from a specific region. On the other hand, in FIG. 4O, the LSP light beam 216F appears thin to the LSP detector system 240 but the light on a sensor pixel is from a larger region along the LSP detector system 240 axis. FIGS. 4P-4S illustrate various arrangements to orient the LSP light beam 216F with respect to the LSP detector system 240.

Focus helps improve the quality of the retardation data for the measurement, and beam width minimization also helps as described above, particularly when control of beam axis, and focus astigmatism (among other) artifacts also affect the depth in the sample sources of the light integrated into the LSP detector system 240.

Orientation optimization can be evaluated with several analysis tools. The simple analysis of the beam width in the center of the sample can be optimized both through laser beam focus and detector focus.

Begin with a more detailed analysis in the camera view of the per pixel retardation (phase of the sine fitted modulated retardation) and Peak to Peak intensity (amplitude of the sine fitted modulated retardation). For a known specimen, the retardation values grouped for noise reduction would ideally be the same. The delta retardation values from adjacent groups (related to the magnitude of the stress in the "layer") would be expected to be the same as from similarly adjacent individual values.

Coupling Prism Assembly

The hybrid system 20 utilizes the aforementioned coupling prism assembly 40, which operably supports the EPCS coupling prism 42A and the LSP coupling prism 42B to provide the prism coupling for the EPCS sub-system 100 and the LSP sub-system 200 when making the EPCS measurement and the LSP measurement of the CS substrate 10.

Figure 5A:
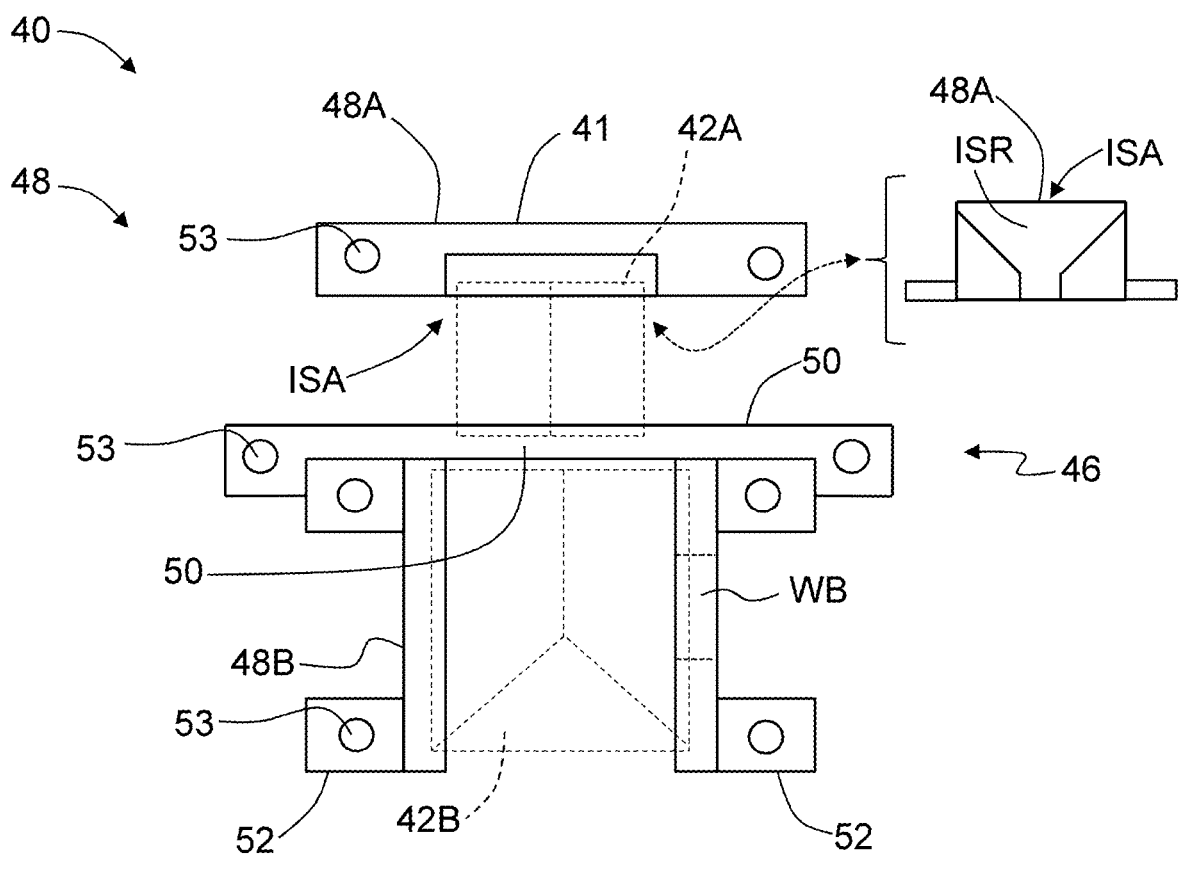
FIG. 5A is an elevated view of an example prism support structure for supporting the EPCS and LSP coupling prisms.
Figure 5B:
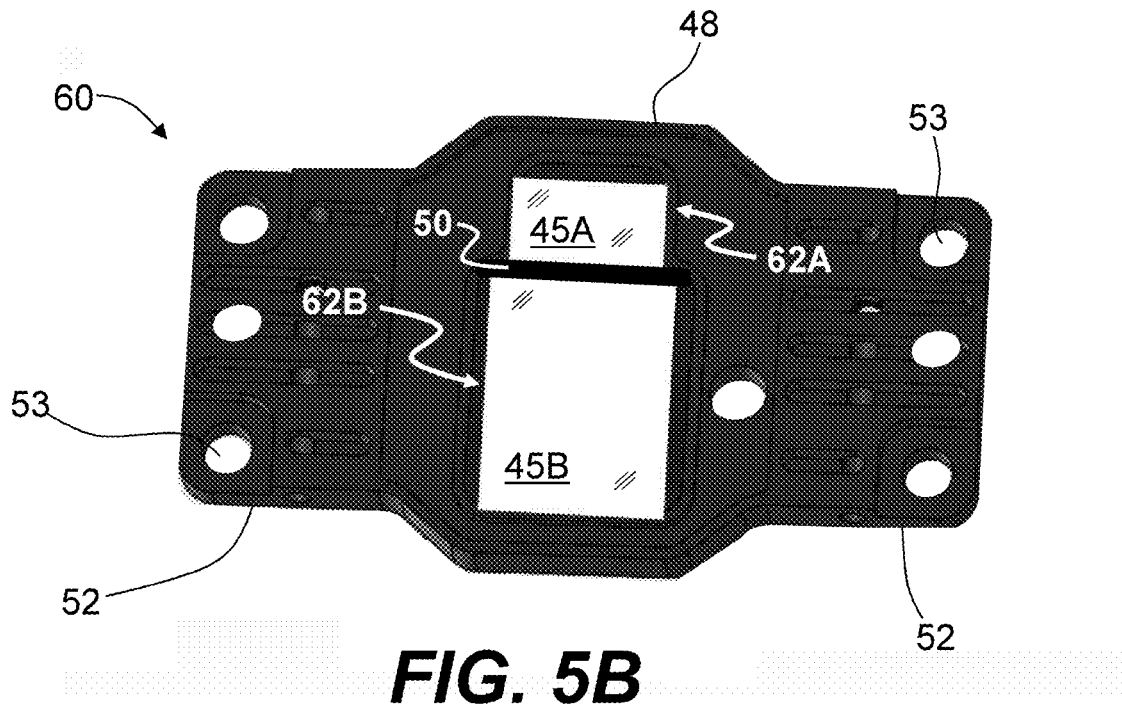
FIG. 5B is an elevated view of a cover plate mounted on the prism support structure of FIG. 5A.

FIG. 5A is an elevated view of a top portion of an example coupling prism assembly 40 showing an example support frame 48. FIG. 5B is an elevated view similar to FIG. 5A and that additionally includes a cover plate 60. The example support frame 48 includes a EPCS frame section 48A that supports the EPCS coupling prism 42A and a LSP frame section 48B that supports the LSP coupling prism 42B. The support frame 48 also includes an isolation member 50 disposed between the EPCS frame section 48A and the LSP frame section 48B that is configured to optically isolate the EPCS and LSP coupling prisms 42A and 42B. In an example, the isolation member 50 also prevents the mixing of index-matching fluids 5A and 5B respectively used with the EPCS and LSP coupling prisms 42A and 42B. In another example, the isolation member 50 allows for a single index-matching fluid to be used with both the EPCS and LSP coupling prisms 42A and 42B, i.e., the single index-matching fluid can flow between the first and second interfaces INT1 and INT2 defined by the two different prisms. In one example, the isolation member 50 is a separate part from the support frame 48 and is attached thereto. In another example, the isolation member 50 is part of the support frame 48, i.e., is formed integral therewith during the formation of the support frame.

In an example, the EPCS and LSP frame sections 48B and the isolation member 50 including securing tabs 52 that includes mounting holes 53 that allow for securing the cover plate 60 to the frame sections using securing members (not shown). The cover plate 60 includes a first aperture 62A sized to accommodate the coupling surface 45A of the EPCS coupling prism 42A and a second aperture 62B sized to accommodate the coupling surface 45B of the LSP coupling prism 42B.

Figure 6A:
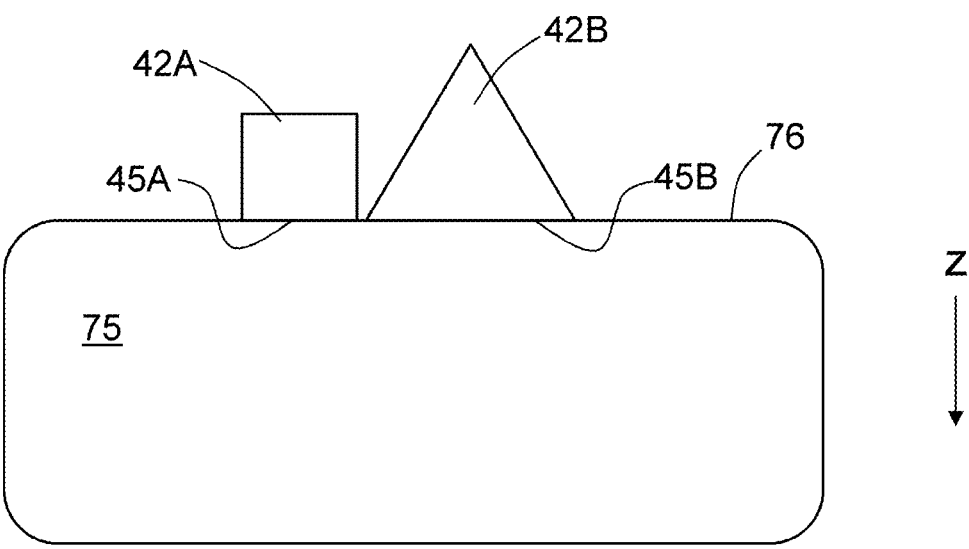
FIGS. 6A and 6B are side views of the EPCS and LSP coupling prisms supported on a stable platform and illustrating an example method of forming a unitary molded prism support structure for the coupling prism assembly.
Figure 6B:
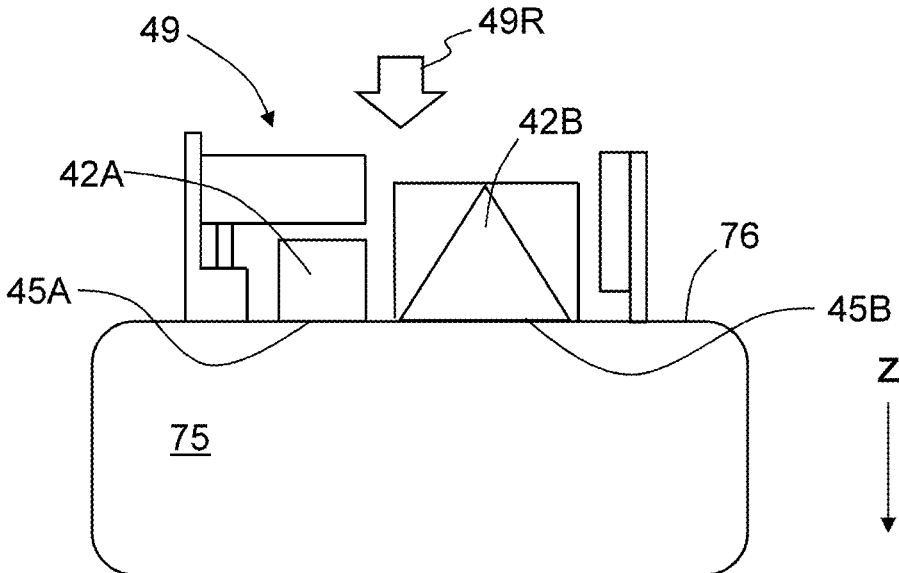

FIGS. 6A and 6B illustrate an example method wherein the EPCS and LSP frame sections 48A and 48B are formed using a resin mold process. The process provides for precision alignment of the EPCS and LSP coupling prisms 42A and 42B. In an example, the molding process is carried out with example EPCS and LSP prisms 42A and 42B in place on a stable platform 75. This process is discussed in greater detail below.

Figure 7:
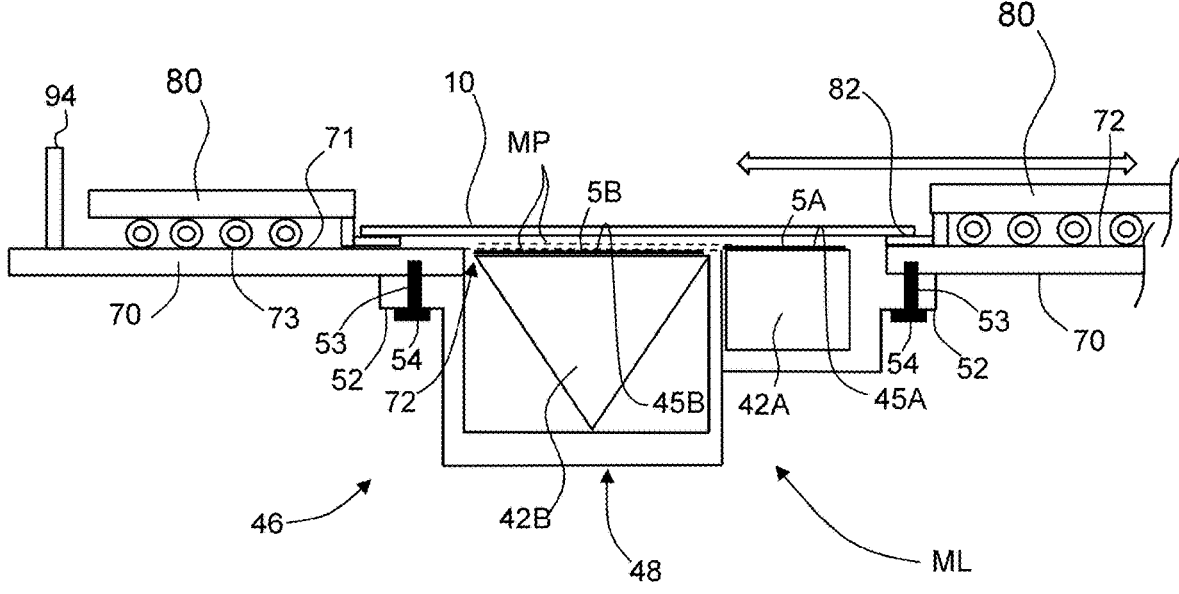
FIG. 7 is a cross-sectional view of an example prism support structure attached to an example support plenum of the hybrid system and showing an example movable substrate holder used to adjust measurement position on the CS substrate.

FIG. 7 is an x-z cross-sectional view of an example prism support structure 46 attached to an example support plenum 70 of the hybrid system 20 using the securing tabs 52 and securing members 54, such as screws, that pass through the mounting holes 53. The support plenum 70 has a top surface 71 and measurement aperture 72. The top surface 71 defines an example measurement plane MP at the measurement aperture 72. The prism support structure 46 is supported by the support plenum 70 such that the EPCS and LSP coupling prisms 42A and 42B reside at the measurement aperture 72. In an example, the EPCS and LSP coupling surfaces 45A and 45B of the EPCS and LSP coupling prisms 42A and 42B reside at or substantially at the measurement plane MP.

In an example, the CS substrate 10 is operably supported by a movable substrate holder 80 that holds the CS substrate over the measurement aperture 72 so that the EPCS and LSP coupling prisms 42A and 42B can be interfaced with the top surface 12 of the CS substrate 10 to establish the first and second coupling interfaces INT1 and INT2 at or substantially at the measurement plane MP. In an example, the movable substrate holder 80 is conveyed over the upper surface 71 of the support plenum 70 using conveying elements 73 such as rollers, wheels, sliders, bearings, etc. In an example, the CS substrate 10 is supported by the movable substrate holder 80 at an interior lip 82 that supports an outer (perimeter) portion of the top surface 12 of the CS substrate. In an example, the plane of the interior lip 82 defines an example measurement plane MP. Thus, FIG. 7 shows two different example locations of the measurement plane MP.

Figure 8A:
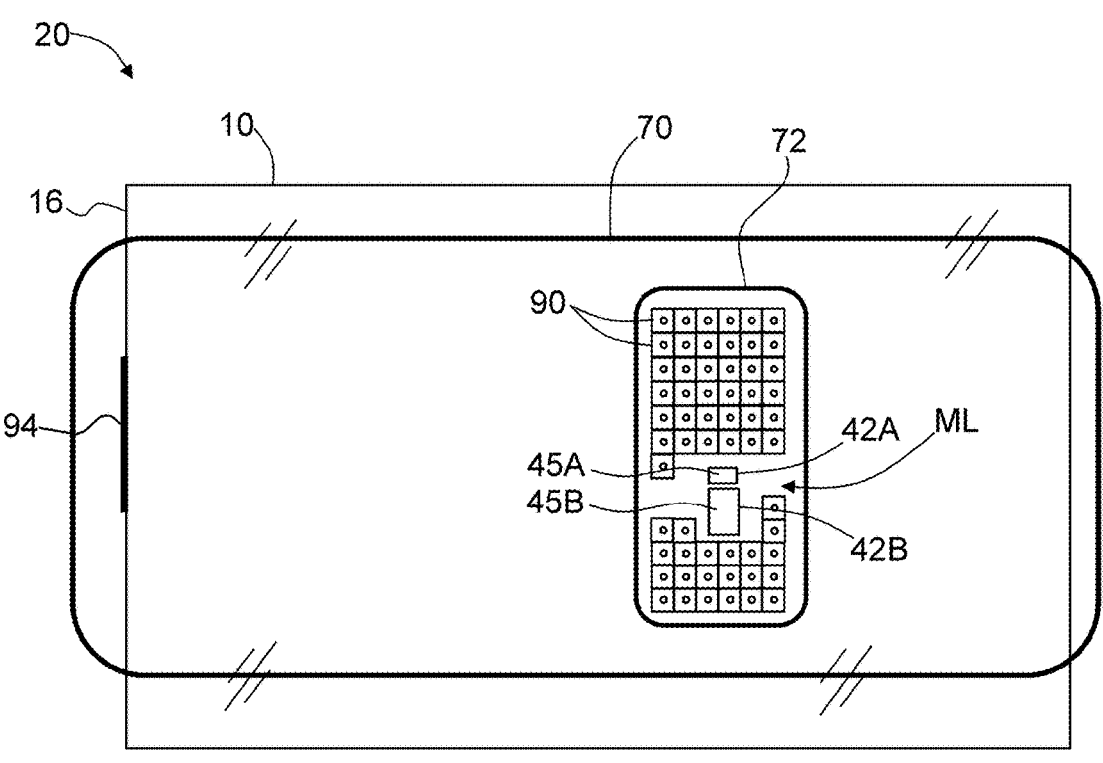
FIG. 8A is an elevated view of the support plenum showing the measurement aperture and pressure-vacuum (PV) bars of a vacuum system operably disposed within the measurement aperture to pneumatically engage the CS substrate to pull the CS substrate onto the coupling surfaces of the EPCS and LSP coupling prisms.
Figure 8B:
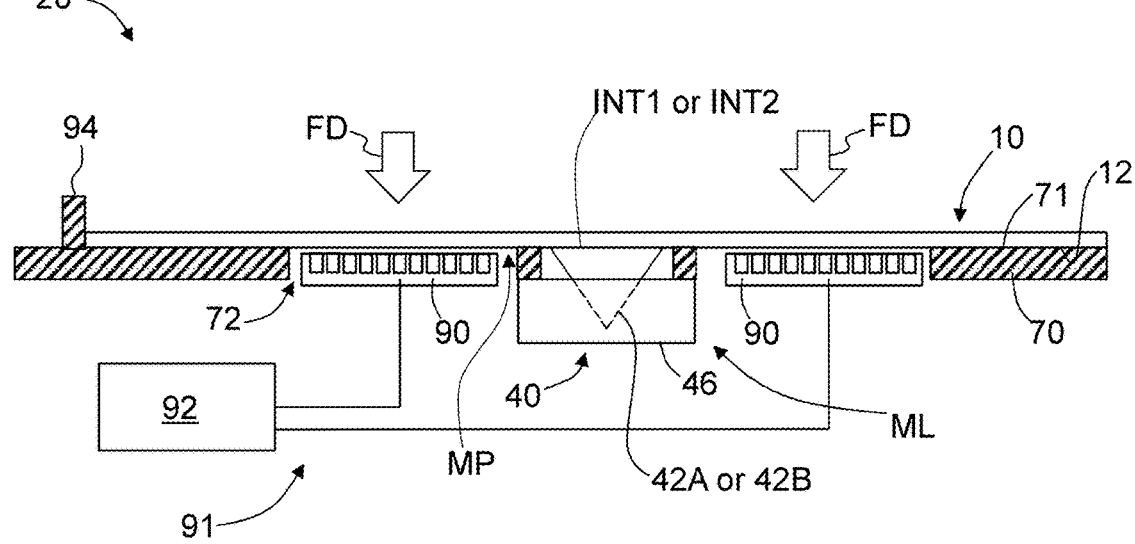
FIG. 8B is a close-up cross-sectional view of the support plenum and the measurement aperture showing an example configuration of the coupling prism assembly and the vacuum system.

FIG. 8A is an elevated view that illustrates an example wherein the support plenum 70 is in the form of a plate that includes pressure-vacuum (PV) conduits or PV elements 90 (e.g., PV bars) used to pneumatically engage the CS substrate 10 to pull the CS substrate onto the coupling surfaces 45A and 45B of the EPCS and LSP coupling prisms 42A and 42B via vacuum (negative pressure) and then release the CS substrate from the prisms via pressure (positive pressure). FIG. 8B is a cross-sectional view of the support plenum and measurement aperture of the configuration of FIG. 8A showing an example vacuum system 91 that include the PV elements (PV bars) 90 and a vacuum source 92.

Note that the interior lip 82 of the movable substrate holder 80 defines a stop member for limiting the vertical movement of the CS substrate 10 when a vacuum is applied to the CS substrate via the vacuum system 91.

Hybrid System Employing a Single Index-Matching Fluid

Figure 6C:
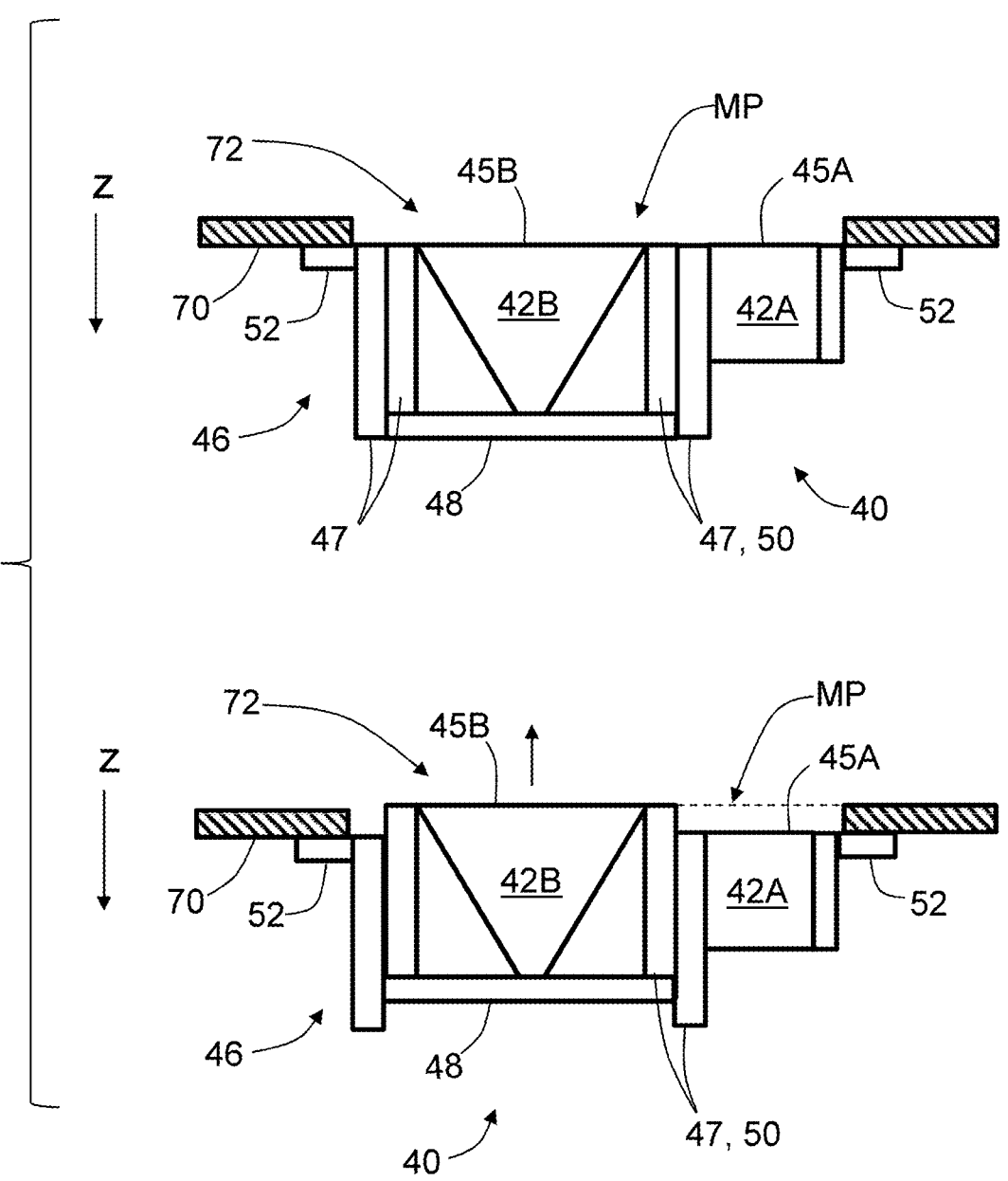
FIG. 6C is a side view of an example coupling prism assembly wherein the prism support structure is configured so that at least one of the EPCS and LSP coupling prisms is movable in one direction (e.g., the z-direction, as shown) relative to the other.
Figure 6D:
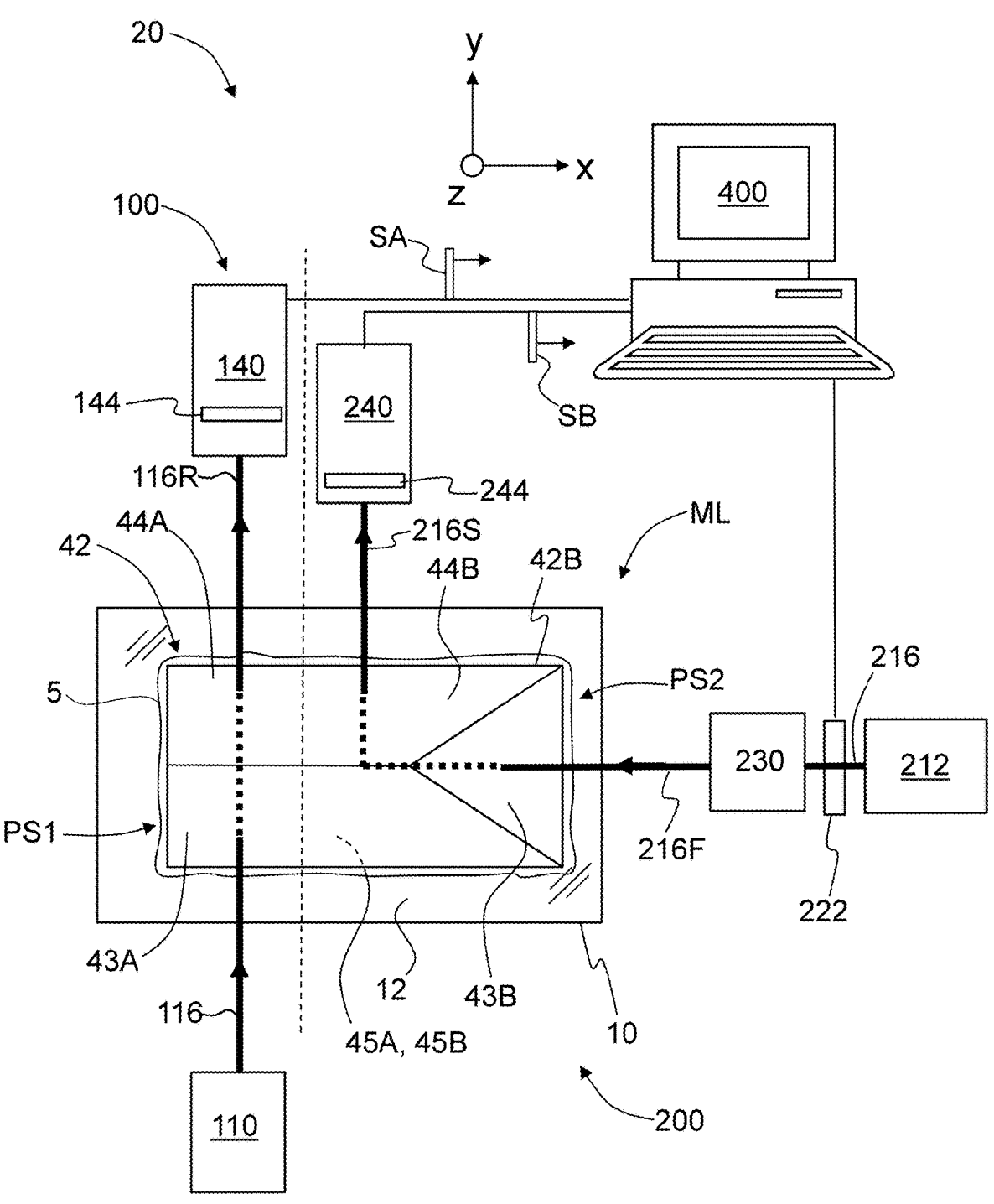
FIG. 6D is a schematic diagram of an example hybrid EPCS-LSP measurement system wherein a single coupling prism is used for the EPCS sub-system and the LSP sub-system instead of two separate coupling prisms.

An example embodiment of the hybrid system 20 such as shown in FIG. 6D employs a single index-matching fluid 5 of refractive index $n_f$ for both EPCS and LSP sub-systems 100 and 200. This is a counter-intuitive approach since a single index-matching fluid 5 would typically be considered as not being able to produce good measurement results from both sub-systems at the same time for at least the following reasons.

If the index-matching fluid is chosen based on EPCS measurement considerations, the index matching fluid has a refractive index $n_f$ that is substantially higher (e.g., by 0.1 or more) than the surface refractive index $n_S$ of CS substrate to facilitate coupling of light into the guided modes and to obtain good fringe contrast in the captured TM and TE mode spectra.

On the other hand, this level of refractive index contrast (difference) $\Delta n$ between refractive indices of the index-matching fluid 5 and the surface 12 of the CS substrate 10 causes significant surface scattering at the coupling interface INT2 from beam deflection at the index mismatch associated with the micro-roughness of the surfaces. This is problematic for the accurate extraction of retardation and stress measurements at moderate depths based on receiving and processing scattered light from the CS substrate. The high degree surface scattering produces a "fireball", e.g., a large bright spot on the image of the scattered light beam where the pixels 247 of the digital detector (CCD camera) 246 are saturated with photons. This results in the loss of a substantial amount of stress-related information. Well-polished surfaces or pristine surfaces (such as formed by fusion drawing) tend to have less scattering.

If the index-matching fluid $n_f$ is approximately matched to (e.g., being similar, slightly higher, or slightly lower than) the surface refractive index $n_S$ of the CS substrate 10 to ensure low surface scattering, the fringe contrast in the mode spectrum 160 is usually poor when there is a steep change in the refractive index near the surface, e.g., such as the spike region R1 (see FIG. 1B) as caused by a shallow concentrated spike of $K_2O$ concentration as produced by an IOX process. Furthermore, the position and contrast of the TM and TE fringes 163TM and 163TE become dependent on the thickness of the index-matching fluid. These two effects make it very difficult to measure the surface CS and spike DOL accurately using the EPCS sub-system 100.

If the index-matching fluid 5 is chosen to have a refractive $n_f$ index of lower than the substrate (bulk) refractive index $n_B$ of the CS substrate 10 (which also usually means lower than the surface refractive index), then the thickness of the index-matching fluid must be very small (e.g., less than 0.4 micron) to enable light coupling into the waveguide modes of the near-surface portion (spike region R1) of the NSWG 18 for the surface CS measurement. The small thickness is also required for measuring the critical angle for coupling light that travels in the deep region R2 between the surface spike region R1 and the bulk region R3. This is difficult to achieve consistently in a production environment due to issues with small particle contamination. These issues cause problems for accurately measuring the surface (compressive) stress S(0) and the "knee stress" $S_k$ at the bottom of the surface refractive-index spike region R1 for dual IOX Li-containing glasses and glass ceramics.

It turns out a single index-matching oil 5 for both EPCS and LSP measurements can be used under select conditions wherein the spike region R1 of the CS substrate 10 has a normalized slope $S_n = |(\lambda/n)dn(z)/dz| < 0.0005$, or more preferably $S_n < 0.0004$, where $\lambda$ is the measurement wavelength and n(z) is the index of refraction of the CS substrate 10 at the measurement wavelength.

In one embodiment, an index-matching fluid 5 having a refractive index $n_f$ that is higher (greater) than the surface refractive index $n_S$ of the CS substrate 10 glass by amounts $\Delta n = n_f - n_S$ in the range from 0.02 to 0.06 is found to produce adequate measurement results for both the EPCS and LSP measurements. When $S_n < 0.0004$, it is preferred that $\Delta n$ be in the high end of the above-stated range, e.g. from 0.05 to 0.06.

In one aspect of the invention, the measurement wavelength $\lambda_A$ for the EPCS measurement is reduced to reduce the normalized slope $S_n$ to more readily satisfy the above-described conditions. In one example, the measurement wavelength $\lambda_A$ of the EPCS measurement is shorter than the measurement wavelength $\lambda_B$ of the LSP measurement by 5% or more, to help achieve a smaller normalized slope $S_n$. In an example, one or more light blocks (not shown) can be selectively positioned on the beam path of the EPCS sub-system 100 to preferentially block light rays propagating at larger incidence angle corresponding to higher effective indices. This enhances the contrast of the captured TM and TE fringes of the guided modes for the near-surface spike region R1 of the NSWG 18.

In another embodiment, the surface spike region R1 may have normalized slope $S_n > 0.0005$. In an example, the index-matching fluid may be selected to have at the EPCS measurement wavelength $\lambda_B$ a refractive index $n_f$ very close to the effective refractive index at the z location $z_k$ at the knee KN, i.e., at the bottom of the spike region R1. In this case, of $n_f \approx n_{crit}$, where $n_{crit}$ is the refractive index associated with the critical angle of the spike region, i.e., the angle below which light does not travel as a guided wave within the spike region R1

In many cases of practical interest, the difference in effective index between the TM and the TE guided wave at the location corresponding to the bottom of the surface spike region R1 is relatively small. For example, in most cases of practical interest the difference is less than 0.0006 refractive-index units (RIU), and most often it is between 0.00015 and 0.0005 RIU. In an example, $$0.0001 \leq \left| n_{crit}^{TM} - n_{crit}^{TE} \right| \leq 0.0006.$$

In some examples, it is adequate to specify that $n_f \approx n_{crit}$, meaning that $$n_{oil} \approx n_{crit}^{TM}$$

and/or $$n_{oil} \approx n_{crit}^{TE}.$$

To be more specific, $n_f$ is not substantially smaller than the smaller of the TM and TE critical indices, and would also not be significantly greater than the largest of the TM and TE critical index. Thus, in an example (and to express the above mathematically):

$$\min\left(n_{crit}^{TM}, n_{crit}^{TE}\right) - 0.001 \leq n_{oil} \leq \max\left(n_{crit}^{TM}, n_{crit}^{TE}\right) + 0.001$$

The upper limit in the equation immediately above is defined to reduce the chances of missing a fringe associated with the spike region R1 by making $n_f$ greater than the effective index of that fringe when the index-matching fluid is absent. Thus, to enable proper accounting for all modes for the purposes of accurately calculating of the depth of the surface spike region R1 (which in an example is defined by a potassium IOX process), it is preferred that $n_f$ be not significantly greater than the larger of the TM and TE critical indices $$n_{knee}^{TM}, n_{knee}^{TE},$$

but also ideally not significantly greater than the smaller of the two critical indices.

In one embodiment, the mode fringes in the TM and TE mode spectra associated with the spike region R1 are spaced far apart in effective index space, e.g., by more than 0.0015 RIU or preferably by more than 0.002 RIU or even more preferably by than 0.0025 RIU when there is significant effective-index difference between the effective index of the last fringe in a specific polarization state (TM or TE), and the corresponding critical index $$\left(n_{crit}^{TM} \text{ or } n_{crit}^{TE}\right).$$

In this embodiment, the index-matching fluid refractive index $n_{oil}$ may be chosen closer to the higher of the two critical indices, and possibly higher than the greater one of them:

$$\max\left(n_{knee}^{TM}, n_{knee}^{TE}\right) - 0.0005 \leq n_{oil} \leq \max\left(n_{knee}^{TM}, n_{knee}^{TE}\right) + 0.001 \text{ or}$$

$$\max\left(n_{knee}^{TM}, n_{knee}^{TE}\right) - 0.0005 \leq n_{oil} \leq \max\left(n_{knee}^{TM}, n_{knee}^{TE}\right) + 0.0005$$

These differences in effective index are easy to establish using the EPCS sub-system 100 by measuring the difference in locations of the critical angles, which corresponding to the intensity transitions 166TM and 166TE from bright total-internal reflection to dark (partial reflection) on the sensor, and/or fringe positions, and taking into account the calibration of the instrument (angle per RIU, or pixels per RIU, or spacing of points on the sensor plane per RIU).

In another embodiment having a more general application, the refractive index $n_{oil}$ of the index-matching fluid is chosen closer to the lower of the TM and TE effective indices. This enables the capture of TM and TE fringes that may be close in effective index to the critical index, but may require relatively close proximity between the coupling surface 45A of the EPCS coupling prism 42A and the top surface 12 of the CS substrate 10 (e.g., a few wavelengths).

More specifically, in this embodiment it is preferred that $$\min\left(n_{crit}^{TM}, n_{crit}^{TE}\right) - 0.001 \leq n_{oil} \leq \max\left(n_{crit}^{TM}, n_{crit}^{TE}\right) \text{ or }$$

$$\min\left(n_{crit}^{TM}, n_{crit}^{TE}\right) - 0.001 \leq n_{oil} \leq \min\left(n_{crit}^{TM}, n_{crit}^{TE}\right) + 0.0005.$$

Furthermore, to reduce significant change in the shape of the critical-angle transition, it may be preferred that $$\min\left(n_{crit}^{TM}, n_{crit}^{TE}\right) - 0.0005 \leq n_{oil} \leq \min\left(n_{crit}^{TM}, n_{crit}^{TE}\right) + 0.0005 \text{ or even that }$$

$$\min\left(n_{crit}^{TM}, n_{crit}^{TE}\right) - 0.0002 \leq n_{oil}$$

In some cases of practical interest, the guided mode having the lowest effective index has its effective index very close to that of the critical index, within about 0.0002 RIU. In this case, it may be ideal to also impose a stricter requirement for the index-matching fluid refractive index to be limited from above:

$$n_{oil} \leq \min\left(n_{crit}^{TM}, n_{crit}^{TE}\right) + 0.0002$$

In cases where $n_{oil}$ is smaller than at least one of the two critical indices, obtaining a high-contrast transition for proper measurement of the critical index $n_{crit}$ may require the aforementioned close proximity between the coupling surface 45A of the EPCS coupling prism 42A and the top surface 12 of the CS substrate 10 (e.g., a few wavelengths). In an example, this close proximity is enabled by use of a vacuum system attracting the specimen toward the prism via the PV conduits 90 pneumatically connected to the PV source 92.

In another embodiment, a correction is made for a systematic error in the calculation of surface compressive stress $S(0)=CS$ when the index-matching fluid refractive index $n_{oil}$ is not significantly different from the effective indices of the guided optical modes that are used to calculate the surface compressive stress CS. In particular, such correction may be preferable to utilize when:

$$\min\left(n_{crit}^{TM}, n_{crit}^{TE}\right) - 0.01 \leq n_{oil} \leq \max\left(n_{crit}^{TM}, n_{crit}^{TE}\right) + 0.01$$

In one example embodiment, the correction is prescribed by calibrating the systematic error, e.g., by comparison of the surface compressive stress CS measured using the preferred inventive dual-use index-matching fluid with the CS measured by using a more convention index matching fluid having a relatively large refractive index $n_{oil}$, such as an oil with $n_{oil}=1.72$ at $\lambda_A=590$ nm used for measuring a CS substrate 10 having a bulk refractive index $n_B$ in the range 1.45 to 1.55.

In a related embodiment, the systematic error may also be calibrated against the breadth of the TM and TE fringes 163TM and 163TE, as the breadth may be associated with the thickness of the index-matching fluid, and at the same time associated with the amount of systematic error in the measurement of the surface compressive stress CS. It should be noted that the systematic error would also depend on the index slope $S_n$ of the refractive index profile of the surface spike region R1 of the CS substrate 10. This means that the systematic error can be defined for a particular type of CS substrate having a surface index slope $S_n$ that falls within a relatively narrow range. Such a narrow range is typical for CS substrates that employ Li-based glass that has been strengthened using an IOX process.

The high-power nature of the laser diode used in the system leads to index oil degradation over time. This is yet another source of noise and variations in the measurements. To mitigate this issue, a laser-blend index oil may be used, which is adequate to sustain the laser energy without degradation.

Hybrid System Employing Two Different Index-Matching Fluids

An example embodiment of the hybrid system 20 employs two different index-matching fluids 5 (denoted 5A and 5B) for the EPCS and LSP sub-systems 100 and 200 respectively, with the two different index-matching fluids 5A and 5B having respective refractive indices $n_{fA}$ and $n_{fB}$ (or $n_{oil-A}$ and $n_{oil-B}$).

Employing two different index-matching fluids 5A and 5B calls for keeping the two index-matching fluids separated so that they do not mix with each other. In one example discussed above in connection with FIGS. 5A and 5B, the prism-support structure 46 includes an isolation member 50 disposed between the EPCS coupling prism 42A and the LSP coupling prism 42B to keep the two index-matching fluids 5A and 5B fluidly separated, i.e., in fluid isolation from one another.

In another embodiment, a pressurized gas (e.g., air) is introduced into a small gap between the EPCS coupling prism 42A and the LSP coupling prism 42B to define an "air curtain" 30 (see FIG. 2B) that ensures that the index-matching fluids 5A and 5B do not interact with other while the CS substrate 10 is being measured in the hybrid system 20. This separation will then enable automatic dripping of the respective index-matching fluids 5A and 5B onto their respective EPCS and LSP coupling prisms 42A and 42B at the same time, thus allowing simultaneous measurements. In an example, the air curtain 30 can be formed using the PV system 91 (see e.g., FIG. 8B).

Hybrid System with Reduced Cross-Talk

Given the proximity of the EPCS coupling prism 42A and the LSP coupling prism 42B, cross-talk between the EPCS sub-system 100 and the LSP sub-system 200 can occur. Such cross-talk can reduce the accuracy of the stress measurement of each sub-system. The various embodiments for reducing (including eliminating) cross-talk described below can be used separately or in combination.

In one example, the EPCS detector system 140 for the EPCS sub-system 100 includes the aforementioned band pass filter 144 centered on the EPCS measurement wavelength $\lambda_A$. Meanwhile, the LSP detector system 240 for the LSP sub-system 200 includes a band pass filter 244 centered on the LSP measurement wavelength $\lambda_B$. In an example, the respective bandwidths of the band pass filters 144 and 244 are sufficiently narrow to substantially filter out the other sub-systems measurement wavelength. Since band pass filters can be made very narrow, (e.g., a few nanometers), just a small difference in the measurement wavelengths (e.g., 10 nm) would be more than sufficient to reduce or eliminate cross-talk using the band pass filters. In an example, the given band pass filter can be inserted anywhere between the corresponding coupling prism and detector system.

In another embodiment, a barrier that is optically opaque to the measurement EPCS and LSP wavelengths $\lambda_A$ and $\lambda_B$ is disposed between the EPCS coupling prism 42A and the LSP coupling prism 42B. In an example, the barrier takes the form of the isolation member 50 as discussed above in connection with FIG. 5A. The isolation member 50 can be formed of a rigid material such as aluminum, or a non-rigid material such as rubber, as long as it is capable of stopping EPCS and LSP measurement light from communicating between the EPCS and LSP coupling prisms. As noted above, the isolation member 50 can also be configured to serve the dual purpose of optical isolation and fluid isolation.

Reduction of Laser Entrance and Exit Noise

The noise in retardation data may be due to many aspects, including laser speckle, surface roughness and fireball, which as described above is a bright light scattering that occurs at the glass-prism and glass-air interfaces. The laser speckle noise may be mitigated with the use of a spinning holographic diffuser 222, but the fireball remains a challenge even with the use of index-matching fluids.

Figure 8C:
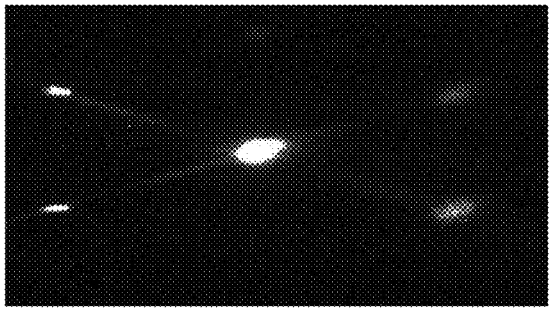
FIG. 8C is an LSP image without a backing material.
Figure 8D:
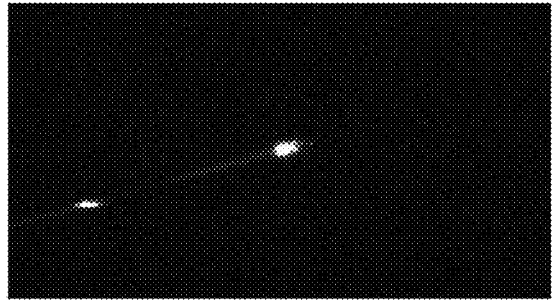
FIG. 8D is an LSP image with a black permanent marker line as a backing material.

Embodiments of the present disclosure mitigate the fireball effect by application of an ink layer on a back surface of a sample 10 (i.e., the top surface 12 of the sample 10 as shown in FIG. 1A that is not the incident surface of the sample 10 with respect to the beam 216). Thus, a black ink line drawn on top of the sample under test mitigates the fireball at the glass-air interface. Particularly, it was found that a black permanent marker line on the sample 10 provides the best results. FIG. 8C is a hybrid system 20 image without a permanent marker line on the back surface of the sample and FIG. 8D is a hybrid system 20 image with a permanent marker line on the back surface of the sample. FIG. 8D illustrates a clear reduction of the fireball effect.

Figure 8E:
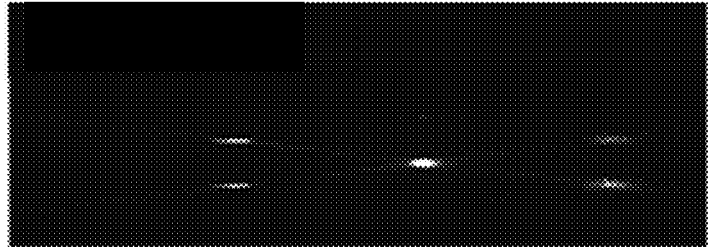
FIG. 8E is another LSP image without a backing material.
Figure 8F:
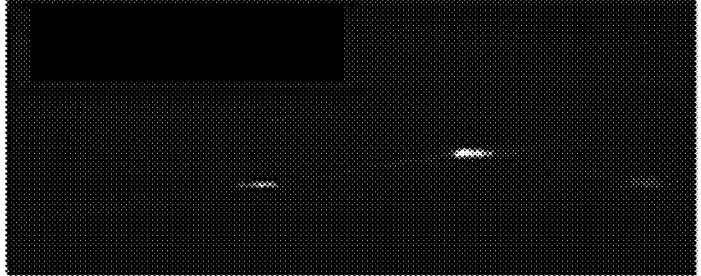
FIG. 8F is an LSP image with standard oil and an immersion lens as a backing material.
Figure 8G:
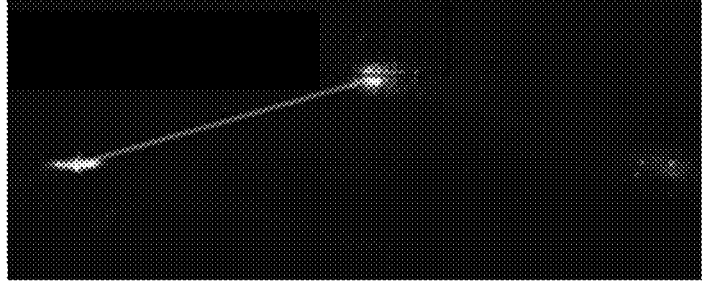
FIG. 8G is an average LSP image with standard oil and an immersion lens as a backing material.
Figure 8H:
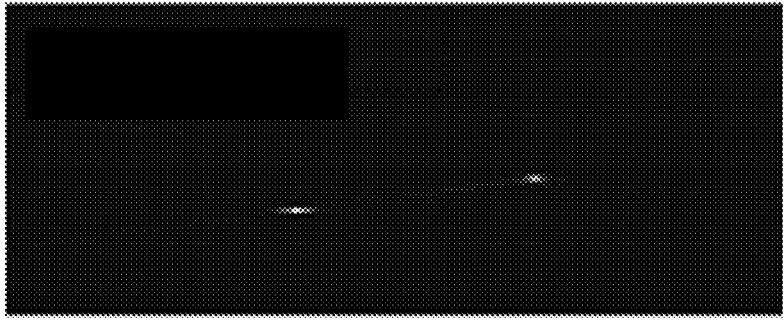
FIG. 8H is another LSP image with a black permanent marker line as a backing material.
Figure 8I:
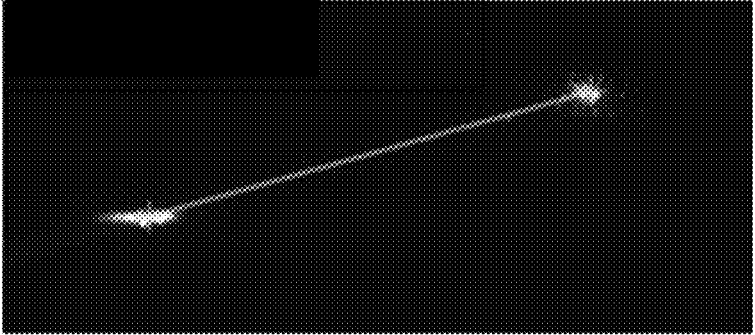
FIG. 8I is an average LSP image with a black permanent marker line as a backing material.

Prior to using the permanent marker backing method, the present inventors applied a lens and immersion oil at the back of glass samples to reduce reflection and laser speckle of the image. The use of the permanent marker backing method further reduced reflection as well as laser speckle on the back surface, which results in less noise during measurement. FIG. 8E illustrates an image with no backing material. FIG. 8F illustrates an image with standard oil and a L3 lens. FIG. 8G illustrates an average image with a L3 lens. FIG. 8H illustrates an image with a permanent marker line on a back surface as described above. FIG. 8I illustrates an average image with a permanent maker line on a back surface as described above.

Figure 8J:
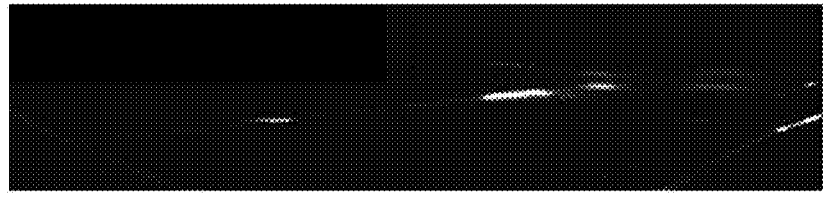
FIG. 8J is an LSP image with a polarized filer and immersion oil as a backing material.
Figure 8K:
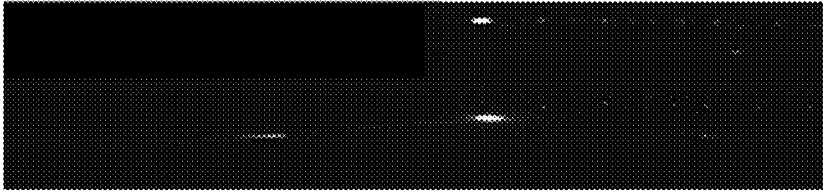
FIG. 8K is an LSP image with a black plastic capsule and immersion oil as a backing material.
Figure 8L:
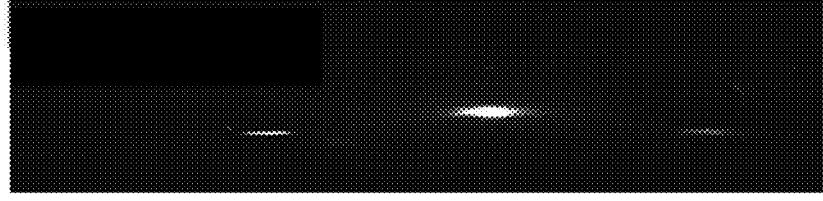
FIG. 8L is an LSP image with a dry erase marker line as a backing material.
Figure 8M:
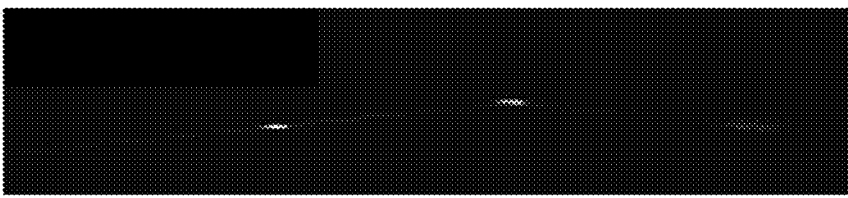
FIG. 8M is an LSP image with a red permanent marker line as a backing material.
Figure 8N:
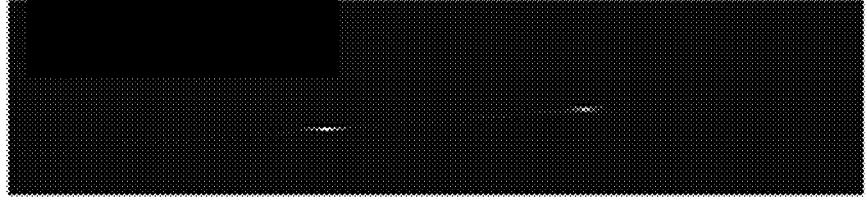
FIG. 8N is an LSP image with a black permanent marker line as a backing material.

Experimentation was conducted to find an alternative to the original method of using an L3 lens and immersion oil atop the glass sample. Throughout the experiment, various backing materials were applied, and measurements were attempted. Most materials were less effective at reducing reflection and back scatter than the original L3 lens method, and although some materials did allow measurements, the black permanent marker proved to be most effective at reducing reflection, back scatter and noise during SLSS measurement. FIG. 8J illustrates an image of a sample with a backing material comprising a polarized filter with immersion oil. FIG. 8K illustrates an image of a sample with a backing material comprising a black plastic capsule with immersion oil. FIG. 8L illustrates an image of a sample with a backing material comprising a black dry erase marker. FIG. 8M illustrates a digital image of a sample with a backing material comprising a black permanent marker. As shown by FIGS. 8J-8N, the black permanent marker is the most effective backing material to minimize the fireball effect.

Coupling Prism Alignment

The hybrid system 20 provides the most accurate measurements when the EPCS and LSP coupling prisms 42A and 42B are aligned with respect to each other and with their coupling surfaces 45A and 45B residing in a common plane.

To achieve such alignment, the coupling prism assembly 40 employs the aforementioned prism support structure 46 is used. In an example of forming the prism support structure 40, the coupling surfaces 45A and 45B of the EPCS and LSP coupling prisms 42A and 42B are first ground and polished to a high degree of flatness and perpendicularity. With reference again to FIG. 6A, the EPCS and LSP coupling prisms 42A and 42B are then placed on a stable platform 75, such as a precision flat granite bar, with the coupling surfaces 45A and 45B resting upon a surface 76 of the stable platform.

With reference now to FIG. 6B, a mold 49 is installed on the stable platform 75 at the surface 76 and a resin 49R is then poured into the mold. Upon hardening of the resin, the walls of the mold 49 are removed to define the prism support structure 46 of the coupling prism assembly 40, such as shown in FIG. 5B. In an example, the molded prism support structure 46 includes the isolation member 50 in the form of a thin wall 47 between the EPCS and LSP coupling prisms 42A and 42B, as shown in FIG. 6C. In an example, the molded prism support structure 46 is formed such that at least one of the prisms is partially encased to avoid cross-talk. In an example, the molded prism support structure 46 comprises or consists of a unitary molded structure, i.e., is a single piece made of a single material (i.e., the piece monolithic) and so is not formed by joining two or more components.

In an example, the molded prism support structure 46 includes securing tabs 52 that include mounting holes 53 for securing the prism support structure 46 to the support plenum 70 (see also FIG. 5A). The use of the movable substrate holder 82 as shown in FIG. 7 and described above enables EPCS and LSP measurements to be made at the same location on the CS substrate 10. The movable substrate holder 82 can be moved under the operation of the system controller 40 by using precision linear motors (e.g., piezoelectric actuators) to set the measurement location for the EPCS and LSP sub-systems 100 and 200.

In an example, the prism support structure 46 includes sections that are movable with respect to one another so that the EPCS and LSP prisms 42A and 42B can be moved relative to one another, e.g., axially or the z-direction as shown in FIG. 6C. In an example, the support frame 48 of the prism support structure includes adjacent walls 47 configured so that one wall can slide relative to the other in a controlled manner. In the example of FIG. 6C, the EPCS coupling prism 42A is shown has having moved in the z-direction relative to the LSP prism 42B.

FIG. 6D is similar to FIG. 4C and illustrates an embodiment of the hybrid system 20 wherein the EPCS sub-system 100 and the LSP sub-system 200 share a common coupling prism 42, i.e., the common coupling prism 42 acts as both the ECSP coupling prism 42A and the LSP coupling prism 42B. A single index-matching fluid 5 is also used. The various surfaces of the coupling prism 42 have dual purposes, e.g., the coupling surface is denoted 45A and 45B because it serves the dual purpose of performing EPCS coupling and LSP coupling. In an example, the band pass filters 144 and 244 of the EPCS sub-system 100 and the LSP sub-system 200 are used, along with different wavelengths $\lambda_A$ and $\lambda_B$ (e.g., separated in wavelength by at least the bandwidth of one of the band pass filters 144 and 244) to substantially reduce or eliminate cross-talk between the sub-systems. In the example of the common coupling prism 42, the coupling prism can have an ECSP section PS1 and a LSP section PS2, and further in the example the sections can be separate, i.e., the ECSP measurement light 116 and the LSP measurement light 216 generally stays in their respective sections, with the exception of small amounts of scattered light.

Reducing Substrate Warp

The CS substrate 10 can be large enough that it can warp to the point where making accurate EPCS and LSP stress measurements becomes problematic. In particular, a warped CS substrate 10 can make it difficult to establishing the EPCS and LSP coupling interfaces INT1 and INT2 needed for making the EPCS and LSP measurements.

With reference again to FIGS. 8A and 8B, the PV system 91 is used to reduce or eliminate substrate warp. The PV conduits (PV bars) 90 are in pneumatic communication with the top surface 12 of the CS substrate 10 through the aperture 72 in the support plenum 70, which supports the CS substrate so that the top surface 12 resides substantially at the measurement plane MP. Activation of the PV source 92 generates reduced pressure near the coupling prism assembly 40 via the PV bars 90, resulting in a downward force FD on the CS substrate by the surrounding high pressure, as shown by the two large arrows. The PV bars 90 enable height control of the CS substrate relative to the top surface 72 of the support plenum 70 (and thus to the measurement plane MP) to within an accuracy of ±5 microns. The use of the PV system 91 also reduces vibrations and enable non-contact control of the CS substrate for dynamic processing and inspection without the need to stabilize the CS substrate on a vacuum chuck.

The PV bars 90 are commercially available and can be configured for reducing warp as shown in FIGS. 8A and 8B. Some of the PV bars 90 proximate to the coupling prism assembly 40 may need to be omitted to avoid interference with the EPCS and LSP measurement light beams 116 and 216 and various components of the EPCS and LSP sub-systems 100 and 200 that reside immediately below the support plenum 70. In an example, one or more stop members 94 can be used to hold the CS substrate 10 in place on the support plenum 70.

In some cases, it may be desirable that at least one of the EPCS and LSP coupling prisms 42A and 42B be capable of being adjusted independent of the other. In this case, the coupling prism assembly 40 can comprise two separate prism support structures 46, with one or both of them being adjustable. In one example, the EPCS coupling prism 42A is adjustable in the z-direction to optimize the contrast of the TM and TE mode fringes in the mode spectrum. This can be accomplished by using a single-axis micro-positioner operably attached to the prism support structure 46 that holds the EPCS coupling prism in a movable configuration.

Processing EPCS and LSP Measurements

Figure 9:
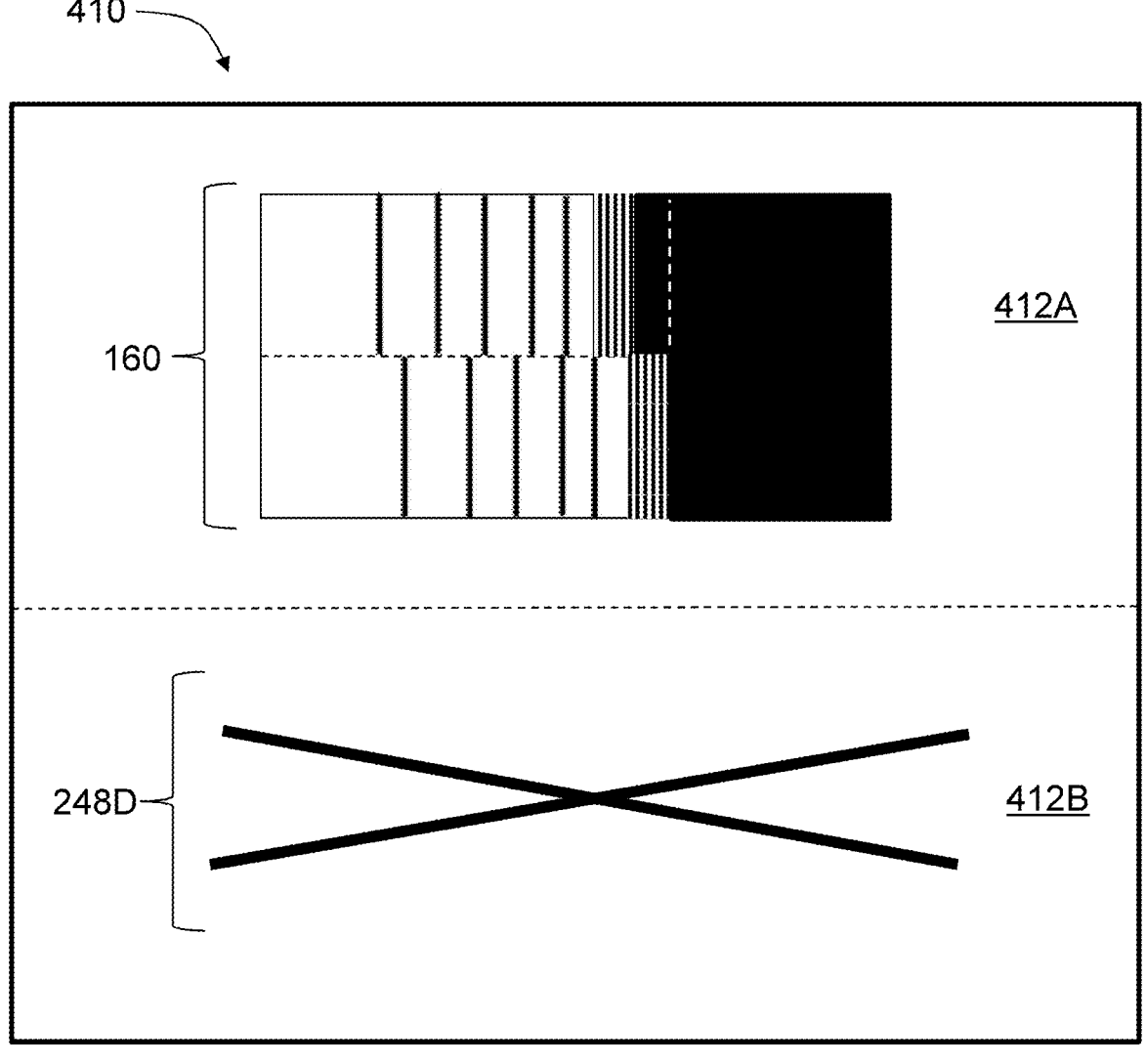
FIG. 9 is a schematic representation of an example user interface as presented by the system controller, wherein the user interface includes a EPCS section that shows the EPCS mode spectrum and an LSP section that shows the LSP line images of the digital LSP image.

FIG. 9 is a schematic diagram of an example user interface 410 as displayed by the system controller 400 of the hybrid system 20. The user interface 410 includes a EPCS section 412A that shows the mode spectrum 160 generated by the EPCS sub-system 100 and a LSP section 412B that shows the digital LSP image 248 generated by the LSP sub-system 200. The software in the system controller 400 is configured to calculate first stress characteristics of the CS substrate using the EPCS measurements from the EPCS sub-system 100 (i.e., the mode spectrum 160) and calculate second stress characteristics of the CS substrate using the LSP measurements from the LSP sub-system 200 (i.e., the digital LSP image 248D) and then combine the measurements to generate a complete or full stress characterization of the CS substrate.

Processing LSP Measurements

In an example, the system controller 400 is configured (e.g., with software) to process the LSP image 248 to extract the "second" or LSP stress characteristics obtained from the LSP sub-system 200. This includes digitally characterizing the contour of the LSP image 248 using a Gaussian blurred Otsu thresholding is performed as part of the contour detection method to facilitate the calculation of optical retardation vs. depth (OR vs. D).

FIG. 10A is an example representation of the LSP image 248 as shown in the LSP section 412B of the user interface 410. The detection of the LSP image 248 by the digital detector 246 forms a digital LSP image 248D, which can be referred to as a raw LSP image or a raw digital LSP image. The LSP section 412B of the user interface also shows a histogram of the scattered light intensities that constitute the digital LSP image 248D as well as some pertinent statistical measurements. In this example view, the primary beam entrance into the CS substrate is from the lower right to the center of the cross. From the center of the cross to the upper right, the digital camera sees a reflection off the air surface of CS substrate of the side of the beam (see FIG. 11C below) due to total internal reflection. From the center of the cross to the lower left, the direct beam has reflected off the CS substrate air surface and traverses back through the thickness of CS substrate towards the LSP coupling prism. From the center to the upper left, the digital camera views a reflection of the reflected beam.

Figure 10B:
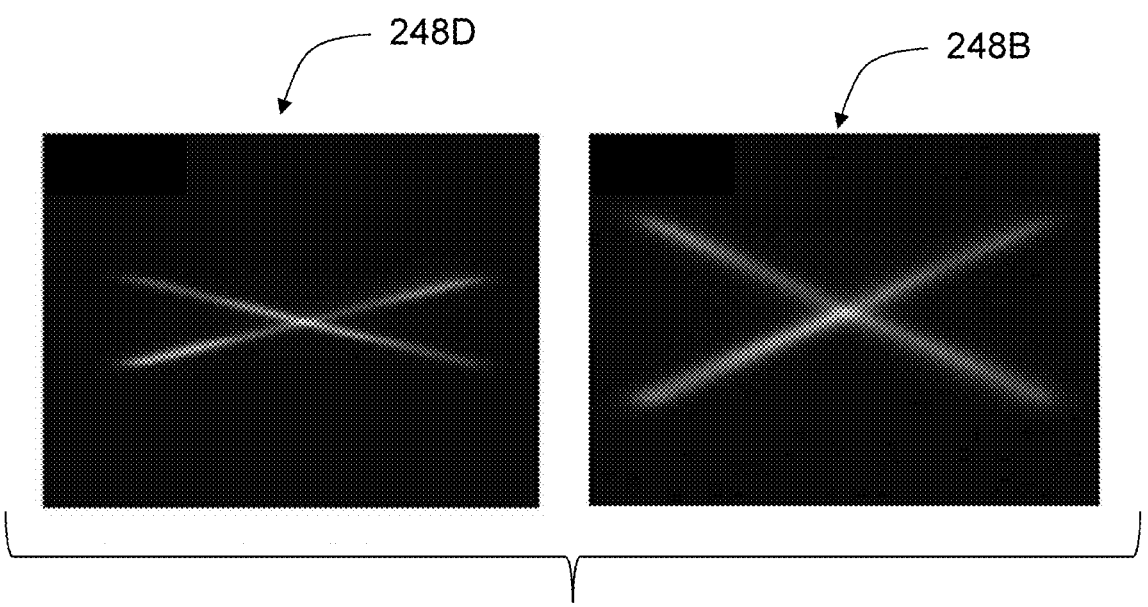
FIG. 10B shows an example initial or raw digital LSP image along with a Gaussian-blurred ("blurred") LSP image.

The digital LSP image 248D is largely comprised of very bright pixels and pixels with little to no exposure. With reference to FIG. 10B, as part of the contour detection method, a Gaussian blur is applied to an original (raw) digital LSP image to reduce any residual noise. The result is a blurred LSP image. Image 248D is an example of an original (raw) digital LSP image. Image 248B is an example of a blurred LSP image. The Gaussian blurring is applied in a manner that does not obscure the optical retardation information encoded in the intensity variations of the digital LSP image 248D.

Figure 10C:
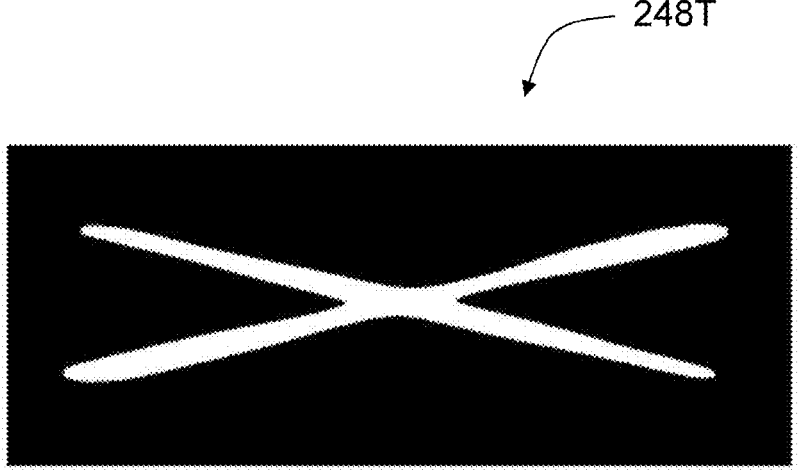
FIG. 10C shows an example threshold image as obtained by applying Ostu thresholding to the Gaussian-blurred image of FIG. 10B.

With reference now to FIG. 10C, Otsu thresholding is applied to the (Gaussian) blurred LSP image 248B of FIG. 10B to obtain a threshold LSP image 248T. The Otsu thresholding mechanism uses the image histogram (see FIG. 10A) to select an intensity value below which all pixels are set to zero. The bright section in FIG. 10C represents all pixels with intensity above that threshold value.

Figure 10D:
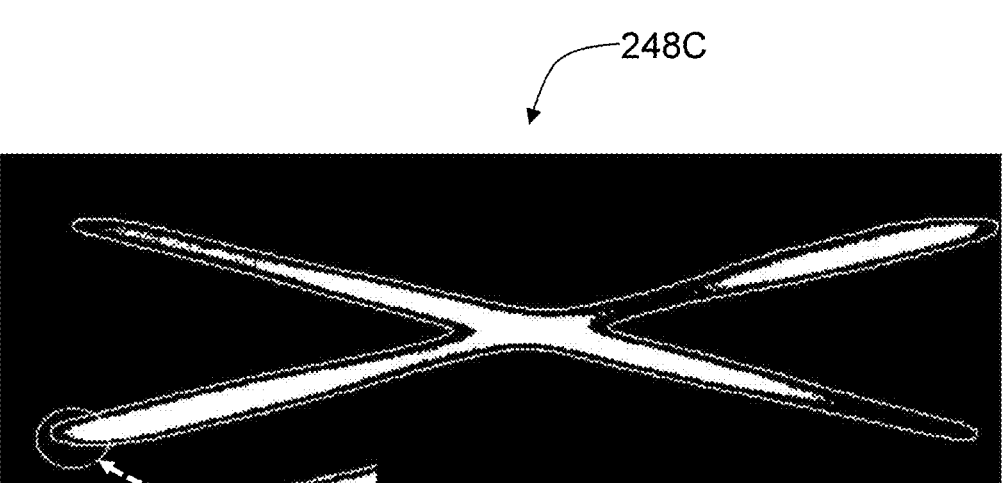
FIGS. 10D and 10E show an example of performing contour detection on an example Gaussian-blurred LSP image.

FIG. 10D shows the next process step, which involves using the threshold LSP image 248T to define an LSP image contour 248C using a binarizing method, such as by the application of the known open-source binarizing algorithm, such as available from open-source image-processing algorithms (e.g., via OpenCV). The example uses an image coordinate system with 0.0 in the upper left and with increasing values to the right (x) direction and down (y) direction. The LSP image contour 248C is comprised of an array of points that can be split into quadrants to find the following five critical points of the cross-shaped image: Upper Left, Upper Right, Lower Left, Lower Right, and Center. The close-up of FIG. 10D shows an example of the lower left point detection, which is obtained by finding the lowest X and highest Y values in that area. The same process is repeated for all four corners, and the center is determined by averaging the corner X and Y values.

Figure 10E:
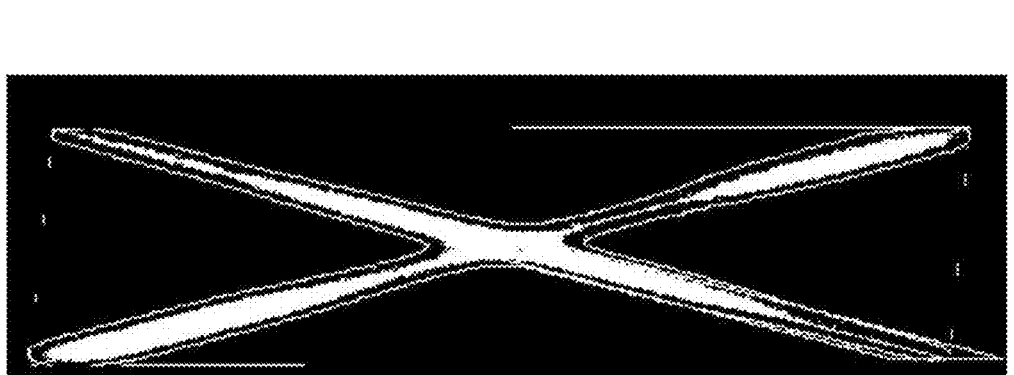

FIG. 10E shows the final LSP image contour 248C with a fully defined contour and processed area. In an example, the lower-right leg of the processed "X" LSP image contour 248C (see trapezoidal area) is then used for calculating the LSP stress characteristics. Horizontal lines in the LSP image contour 248C in FIG. 10E are at constant depth. The intensity (e.g. sum, peak, or average) Gaussian blur across the horizontal line from each of the images acquired while the polarization of the light source is being modulated, is used as an input for subsequent analysis to obtain the OR vs. D data.

Thus, the threshold LSP image 248T and the LSP image contour 248C are used to define a "mask" that identifies a portion or portions of the captured or Gaussian-smoothed LSP image 248B to be used for calculating the optical retardation OR as a function of depth (D) into the CS substrate 10, as explained above.

CS Substrate Thickness Extraction and Beam Angle Calculation

Figure 11A:
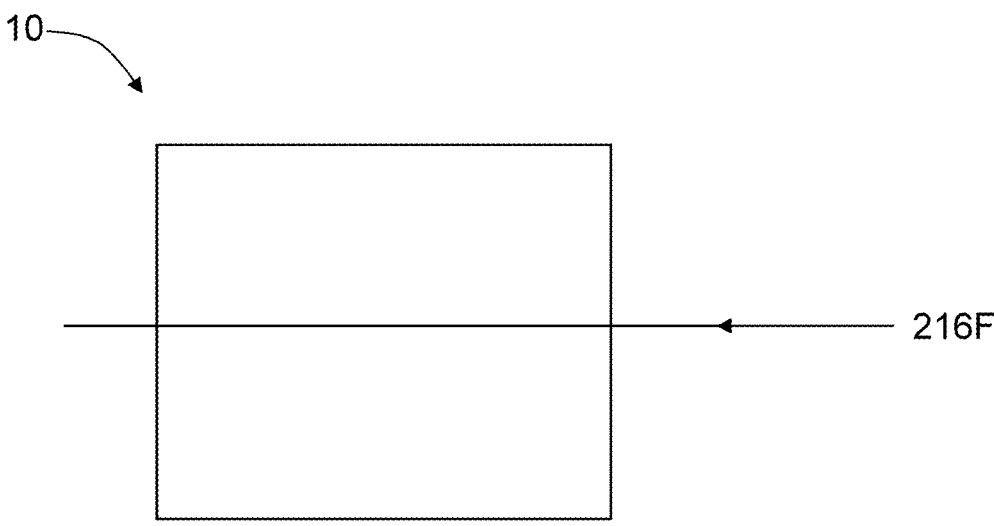
FIG. 11A is a close-up view of the CS substrate and the direction of the focused LSP light beam.
Figure 11B:
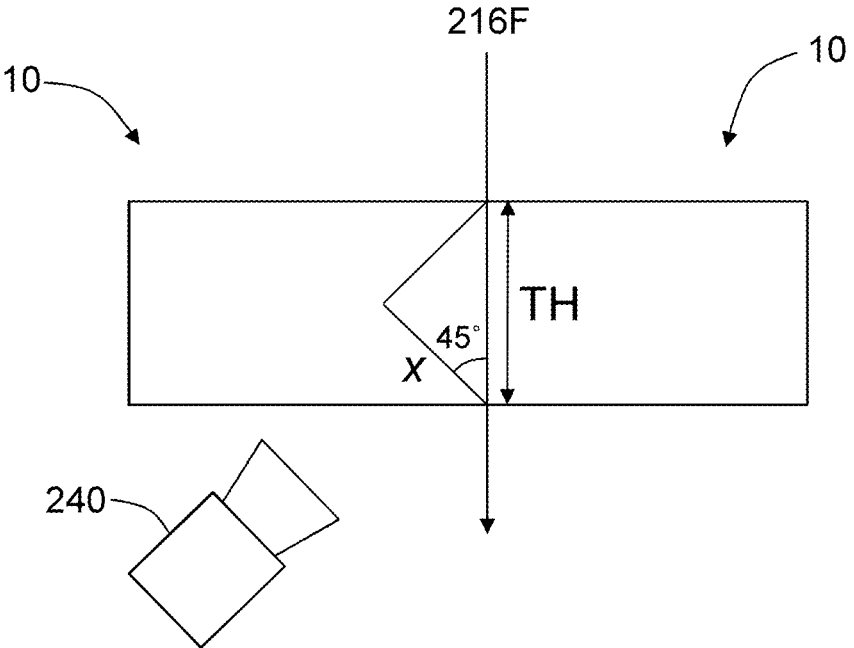
FIG. 11B is a close-up view of the edge portion of the CS substrate and showing the viewing angle of the LSP detector system relative to the focused LSP light beam.
Figure 11C:
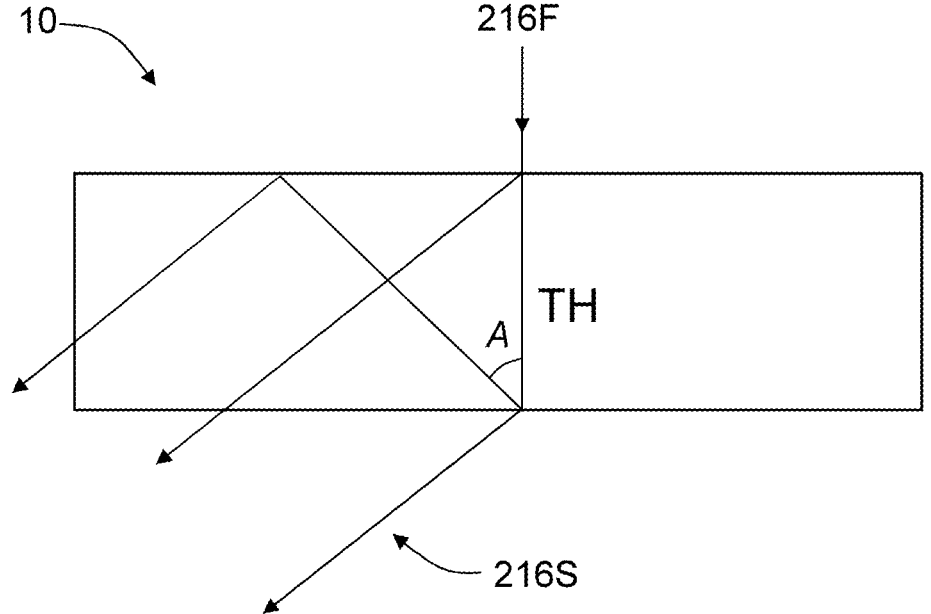
FIGS. 11C is similar to FIG. 11B and shows the scattered light beams that reach the LSP detector system and form the line images.
Figures 11D, 11E:
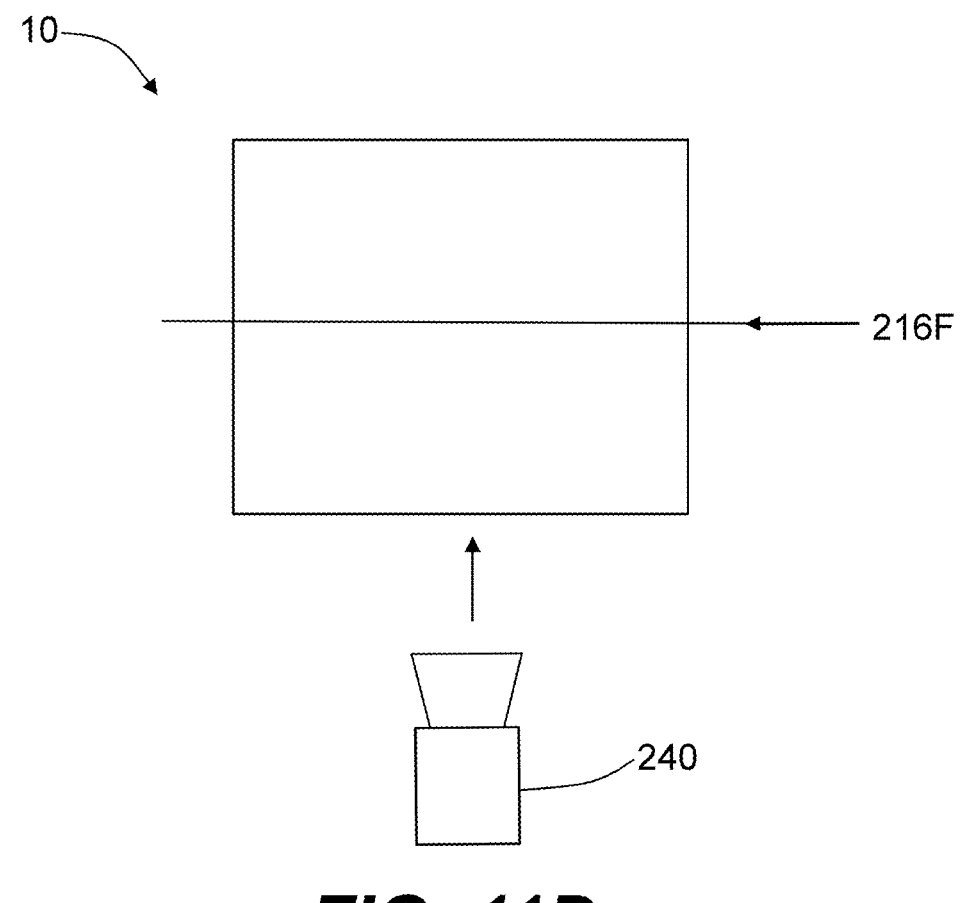
FIG. 11D shows another view of the LSP detector system and the CS substrate with the focused LSP light beam.
FIG. 11E is a schematic diagram showing dimensions and angles used to determine the CS substrate thickness.

FIG. 11A is a view of the CS substrate 10. FIG. 11A also shows beam path of a portion of the focused LSP light beam 216F inside the body 11 of the CS substrate 10 after going through the LSP coupling prism 42B (not shown). FIG. 11B is a close-up view showing an edge portion of the CS substrate 10 as the area of interest for calculating the CS substrate thickness TH. FIGS. 11C through 11E are additional views of the path of the focused LSP light beam 216F within the CS substrate. The LSP coupling prism 42B is not shown for ease of illustration.

By looking at the edge of the CS substrate 10 along the direction of propagation of the focused LSP light beam 216F, the thickness of the CS substrate 10 as seen by the digital detector 246 of the LSP detector system 240 can be highlighted, as shown in FIG. 11B. Since the digital detector 246 is looking at the focused LSP light beam 216F through an angled LSP coupling prism 42B (e.g., angled at 45°), the real thickness TH of the CS substrate 10 can be calculated as $$TH = x/\{Cos(45°)$$

where x represents the path length in the plane of the digital detector 246.

Once the thickness TH is calculated, the propagation angle A of the focused LSP light beam 216F within the CS substrate (see FIG. 11E) can be determined by looking at the edge of the CS substrate 10 along the direction of the digital detector 246, and using the schematic diagram of FIG. 11E, determining the propagation angle A using:

$$A = ArcTan(W/TH)$$

where W is the horizontal distance between the center cross C of the image contour 248C and the lower right (LR) critical point of the image contour as obtained from the contour detection method described above. Once the processed area is selected, the digital detector 246 records several images 248 as a function of input polarization. The optical retardation information as a function of depth into the CS substrate is then extracted using techniques known in the art.

Lock-In Detection Method

The lock-in detection method is a signal analysis technique that has proven very adept and fast at retrieving a signal that is obscured with noise. For this method to work, the period of the signal must be known.

The measurement (detector) signal SB from the LSP sub-system 200 has a period that depends on the rate of polarization rotation by the optical compensator 230. When using a rotating half-wave plate 234H in the optical compensator 150, one full rotation corresponds to four oscillations of the polarization state of the scattered light 216S.

The derivation of the lock-in method as applied to the LSP measurement signal SB=s(t) is as follows, where t is time. Consider the LSP measurement signal s(t) to be centered around zero and having an amount of noise ("noise factor") N. The measurement data D(t) received by the system controller 400 can be represented as:

$$D(t) = s(t) + N$$

The measurement signal s(t) can be generalized in the form $$s(t) = A \cos(ft + \varphi)$$

where $\varphi$ is the phase value to be extracted and f is the known frequency of the signal. This signal can be "locked" into by multiplying it with a generic test wave of an equal and negative period (and arbitrary phase) $W(t) = \cos(-f - \theta)$ to yield the following equations:

$$
\begin{aligned}
D(t) * W(t) &= (A\cos(ft + \varphi) + N) * (\cos(-ft - \theta)) \\
&= (A\cos(ft + \varphi) * \cos(-ft - \theta)) + (N * \cos(-ft - \theta)) \\
&= \frac{1}{2}(A\cos(\varphi - \theta) + A\cos(2ft + \varphi + \theta)) + N\cos(-ft - \theta)
\end{aligned}
$$

$$D(t) * W(t) = \left(\frac{A}{2}\cos(2ft + \varphi + \theta) + N\cos(-ft - \theta)\right) + \frac{A}{2}\cos(\varphi - \theta).$$

The first two terms of the equation for D(t)*W(t) immediately above oscillate according to the time variable t. The final term, however, is a constant that can be extracted through strong low-pass filtering of the product wave. Since the average of a wave approaches the offset value of that wave over multiple oscillations, this is achieved by averaging the product wave.

This approximation incurs a slight amount of error if the measurement signal s(t) does not have many oscillations (e.g. less than one full oscillation) or if the signal has a non-integer number of half-cycles. This error can be reduced by taking the average of the signal over only the largest amount of half-cycles in the signal. For example, if the signal has about 3.7 oscillations, then take the average of the signal up to 3.5 cycles.

Once the low-pass filtering is performed using known means, the product D(t)*W(t) is reduced to the constant term [A/2] cos(−+φ). Recall that φ is the desired phase value, and θ is the arbitrary phase of the test wave. Hence, if θ is incremented through a series of numbers, the constants resulting from the low-pass filtering of the product wave for each increment will oscillate according to the non-time-varying cosine function [A/2] cos(−θ+φ). This cosine wave has a wave number of −1, an amplitude of A/2, and a phase of φ. Knowing this, a cosine can be fit to these constants (e.g., using least-squares fitting), and the phase φ can be extracted. The amplitude of the signal A can also be extracted.

Figure 12A:
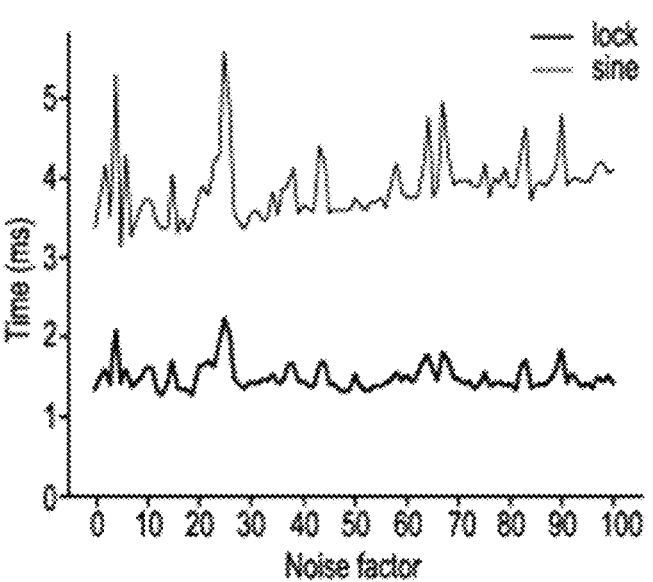
FIG. 12A is a plot of the average computation time T in milliseconds (ms) needed to extract the phase $\varphi$ of a noisy LSP signal versus the noise factor N for both the lock-in method (lock or L) and the sine method (sine or S).

The lock-in method for signal extraction has proven to be much faster than a regular sine fitting. FIG. 12A is a plot of the average computation time T in milliseconds (ms) needed to extract the phase φ of a noisy signal versus the noise factor N for both the lock-in method (L or black curve) and the sine method (S or gray curve). The data for FIG. 12A were collected over a series of tests. In these tests, random noise was added to a set signal upon which both the sine fitting and the lock-in detection methods were used to extract the phase. At each noise level 100 tests were performed with randomized noise. The lock-in method performed the calculation in approximately half the time that it took the sine fitting method.

Figure 12B:
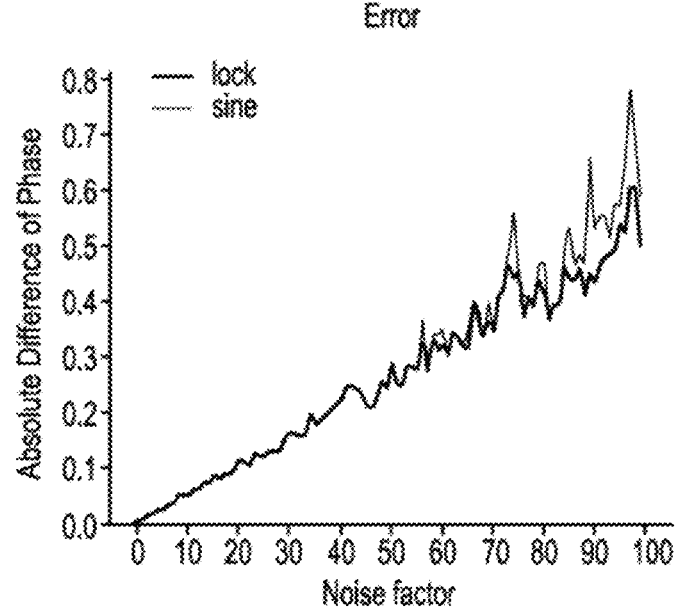
FIG. 12B is a plot of the absolute phase difference $|\Delta\varphi|$ for versus the noise factor for the lock-in method (lock or L) and the sine method (sine or S) for processing a noisy LSP signal.

FIG. 12B is a plot of the absolute phase difference |Δφ| for versus the noise factor N for the lock-in method (L or black curve) and the sine method (S or gray curve). FIG. 12B shows that both methods retained approximately the same level of accuracy and precision over all the tests.

The lock-in method removes the necessity of predicting the sine parameters for fitting. The only fitting performed is that of the cosine wave to the low-pass filtering constants, which is so constrained that it almost never produces a bad fit. If sine fitting is used, however, it has been found that it performs much more accurately when the sine wave that is fitted to the data has a constant period. If the period can be fitted along with the other parameters, the processing time takes longer and the results are often not as accurate.

Noise Reduction in the LSP Measurement

The extraction of second stress characteristics using the LSP measurements from the LSP sub-system 200 consists of two main parts—a data acquisition part and data analysis part. In the data acquisition part of the measurement, the scattered light 216S is imaged as a function of the input polarization state of the initial LSP light beam 216 from the LSP light source 212. The imaging is achieved by recording at the digital detector 246 the intensity of scattered light from features (e.g., particles, refractive index variations) within the body CS substrate 10 due to the IOX process or processes.

The recorded images 248 are processed by the system controller 400 to extract the intensity along the laser beam, which is analyzed against the input polarization to extract the amount of optical retardation between two orthogonal states of the light beam. The stress profile is reconstructed by modeling the observed retardation. As a result, the quality of LSP measured stress profile is fundamentally limited by the noise in the imaging process, which is typically dominated by laser-based noise. One example of such laser-based noise is speckle, which originates from the high degree of coherence of the LSP light source 212, and imperfections in the optical surfaces (roughness, flatness, etc.) and volume properties of the optical elements (impurities, inhomogeneity and heterogeneity of density, etc.).

During propagation of the LSP light beam 216 through the LSP sub-system 200, interactions of the light (laser) beam 216 with system imperfections result in random amplitude and phase variations within the light beam wavefront. When the LSP light beam 116 is coherently imaged by Rayleigh scattering, wavefront distortions lead to a static interference pattern in the image plane that is called a speckle pattern, which is characterized by large intensity variations with high spatial frequencies superimposed on the desired signals. Intensity deviations from the desired signals are considered as noise in an LSP measurement. To reduce the effect of laser speckle, the imaging can be averaged over independent speckle patterns by modulation of polarization, amplitude or phase in the beam wavefront.

In one embodiment, laser-based noise is reduced in the LSP sub-system 200 by passing the initial light (laser) beam 216 through a movable light diffuser 222, which in an example can comprise a holographic diffuser. This "stirs" the light beam rays within the diffusing angle depending on the local structure of the diffuser. To minimize the beam divergence caused by this "ray stirring," the light diffuser 222 is placed in the image plane of a Keplerian telescope configuration, as shown in the example configuration of FIG. 4A. The LSP light beam 216 is first focused onto the light diffuser 222 by the first focusing lens 220 and the transmitted light beam is re-collimated by the second focusing lens 224.

Mitigating the divergence of the LSP light beam 216 after undergoing light diffusion provides more efficient (i.e., less aberrated) focused LSP light beam 216F at the CS substrate. Using the moving light diffuser 222, variations the laser-based noise (e.g., speckle pattern) at the digital detector 246 are produced at the rotational velocity $v_D$ of the spinning diffuser. The maximal effect of noise averaging is achieved at the $v_D \tau_C > 1$ condition, where $\tau_C$ is the exposure time of the digital detector 246. This condition also eliminates a potential blinking in the imaging caused by optical transmission variations across the light diffuser 222. Implementation of diffuser-based noise reduction improves the measurement of the optical retardation. This is illustrated in FIGS. 13A and 13B, which are plots of optical retardation OR (radians) versus depth D (mm) into the CS substrate. The plot of 13A was obtained without using the noise reduction apparatus and methods described above. The plot of FIG. 13B was obtained by using the noise reduction apparatus and methods described above. The smoothness of the plot of FIG. 13B is a direct result of the application of the noise-reducing apparatus and methods disclosed herein.

Another way to reduce noise is by moving the substrate.

Shifting the OR Plot Using the Bend Points and CS Substrate Mid-Plane

Since the location of the surface 12 of the CS substrate 10 can be difficult to determine from the LSP images 248, the stress profile can be shifted into position based on the general shape of the retardation curve (OR vs D). The OR retardation curve has two bend points where the derivative is zero. An example actual OR vs. D curve is shown in FIG. 14A along with the two bend points BP1 and BP2. The data points are shown as open circles. The two bend points correspond to where the stress profile changes from compression to tension, or vice versa.

If the stress profile is symmetric, then the two bend points BP1 and BP2 should also be symmetric around the midplane MP of the CS substrate (see FIG. 1A). Therefore, if the thickness TH of the CS substrate 10 is known and the two bend points BP1 and BP2 of the optical retardation OR curve can be found, then the OR profile can be horizontally shifted into the correct position. This allows for the depth of compression DOC to be more accurately determined because the location of the surface 12 of the CS substrate 10 is chosen based on the known symmetry and thickness of the CS substrate. FIG. 14B is similar to FIG. 14A but shows the OR curve shifted to the left as compared to FIG. 14A using the plot-shifting (data-shifting) technique described above.

Shifting the OR Plot Using Curve Fitting

An alternate method of extracting the DOC for a symmetric stress profile involves analyzing the shape of the retardation profile, i.e., the OR vs. D curve. If the thickness TH of the CS substrate is known and the relative positions of the bend points BP1 and BP2 can be determined through polynomial fittings, then the depth of compression DOC of the CS substrate can be determined by expression:

$$DOC=[TH-(BP2-BP1)]/2$$

where BP1 and BP2 are the relative depth positions of the bend points.

Curve Fitting for the OR vs. D Curve

An embodiment of the disclosure is directed to methods obtaining an excellent fit to the data of the OR vs D curve. The methods include employing a combination of linear and quadratic functions to obtain the curve fit. This method is referred to below as the LinQuad method.

FIG. 15A is a plot of OR vs. D data (circles) and shows an example fitted curve FC (solid line) to the OR data using the LinQuad method. The LinQuad method assumes the following model stress function, where $\sigma$ is the stress, x is the depth coordinate into the CS substrate 10 and R is as defined below:

$$\sigma(x) = \frac{d\sigma}{dC}(C(x) - R * C_0)$$

One can extract the corresponding retardation and fit it to the raw data of interest to recreate the stress profile. Here, C represent the normalized modeling concentration of ions in the CS substrate. Their expressions are as follows.

$$C(x) = \begin{cases} C_0\left(1 - \frac{2x}{d_c + d_l}\right) \text{ for } 0 \le x \le d_l \\ C_0\left(1 - \frac{2d_l}{d_c + d_l}\right)\frac{(d_c - x)^2}{(d_c - d_l)^2} \text{ for } d_l \le x \le d_c \\ 0 \text{ for } x \ge d_c \end{cases}$$

$$R = \frac{2}{3}\frac{d_c}{t}\frac{1 + \delta + \delta^2}{1 + \delta}, \delta = \frac{d_l}{d_c}$$

where $d_l$ is the depth of the linear region, $d_c$ is the depth of the curved region, $C_0$ is a constant multiplier and t is the CS substrate thickness.

An alternate expression is given by:

$$\sigma(x) = CT - C(x) * \frac{d\sigma}{dC}$$

Here, CT is the central tension of the stress profile, and $d\sigma/dC$ is a (partially arbitrary) constant of around $$60\frac{MPa}{mol \%}.$$

The true LinQuad function is defined above, where only $d_c$, $d_l$, $C_0$ are fit. However, this latest expression for $\sigma(x)$ allows a fourth parameter—namely the central tension CT—to vary, which can help the function fit the data more closely.

FIG. 15B is a plot of the stress S(x)=$\sigma(x)$ versus depth D (mm) (or x coordinate) based on the LinQuad fit to the OR vs. D curve of FIG. 14A.

Power-Spike Function

A power-spike function is defined as:

$$\sigma(x) = CT_{sp} + CT_p - CT_p(p + 1) * \left|\frac{2(x - mid)}{t}\right|^p -$$

-continued $$(CS_{sp} - p * CT_p) * \left(2 - ERF\left(\frac{x}{L_{eff,sp}}\right) - ERF\left(\frac{t - x}{L_{eff,sp}}\right)\right)$$

$$CT_{sp} = 2 * (CS_{sp} - p * CT_p) * \frac{L_{eff,sp}}{t\sqrt{\pi}}$$

$$CT_{sp} = 2 * (CS_{sp} - p * CT_p) * \frac{L_{eff,sp}}{t\sqrt{\pi}}$$

$$L_{effsp} = \frac{DOL_{sp}}{1.3829}$$

where $CT_{sp}$ is the central tension of the spike in the spike region R1, mid is half of the thickness TH, $CS_{sp}$ is the compressive stress of the spike, and $DOL_{sp}$ is the depth of layer for the spike. The parameter $L_{eff}$ is an effective length (depth) of the spike region R1. This function is a stitching of a power profile with two error function spikes at the ends. The $CS_{sp}$ and $DOL_{sp}$ values are specific to each glass type and are entered as a constant. The only parameters that need to be fitted are the power of the function p and the peak central tension $CT_p$.

FIG. 16A is a OR vs. D plot illustrating an example fitted curve FC using the power-spike function. FIG. 16B is plot of the stress profile S(x) (MPa) versus depth D into the CS substrate 10 based the power-spike function fit to the OR vs. D curve of FIG. 16A.

Removing Systematic Error to Conform with a Symmetric Stress Profile

The stress profile of the CS substrate using the LSP measurement data is obtained by differentiating the OR vs. D curve. As such, a symmetric stress profile will always correspond to an asymmetric OR vs. D curve. However, systematic error from various components in the LSP sub-system 200 can introduce a symmetric component into the OR vs. D retardation data, thereby hindering the accurate extraction of the stress profile. This effect can be mitigated by decomposing the retardation data into symmetric and anti-symmetric components, and only fitting the anti-symmetric portion (i.e., the asymmetric data points).

Given a optical retardation OR in the form of a function f(x), the decomposition can be achieved as follows.

$$f(x)=f_s(x)+f_a(x)$$

where $f_s$ and $f_a$ are the symmetric and anti-symmetric components of the retardation f, and expressed by the following equations:

$$f_s(x) = \frac{f(x) + f(-x)}{2}$$

$$f_a(x) = \frac{f(x) - f(-x)}{2}$$

FIG. 17A is fit to the OR vs. D plot based on the original OR data while FIG. 17B is a fit to the OR vs. D plot with the symmetric component of the data removed using the technique described above. The fitting error of the fitted curve FC to the measurement data in FIG. 17B is 0.006 while that of FIG. 17A is about 0.46

Adjustable Fitting Regions for Accurate CT and DOC

A single fit to the OR v. D curve may not always be adequate to accurately determine both the central tension CT and the depth of compression DOC. This is because scattering from the LSP coupling prism 42B or the coupling interface INT2 can hinder data collection close to the top surface 12 of the CS substrate 10.

In an example, the fit to the OR vs. D curve is performed using fits to separate regions of the curve respectively associate with the central tension CT and depth of compression DOC and adjust the fitting range of the OR data for accurate CT and DOC extractions.

FIGS. 18A and 18B show an example OR vs. D curve wherein regions around the bend points BP1 and BP2 defined by the data (circles) are fitted to extract the depth of compression DOC. FIG. 18B shows the central linear region between the bend points BP1 and BP2 fitted to extract the central tension CT. In both cases, the range of the OR vs. D data is substantially reduced to that portion of the OR vs. D curve that is relevant to the given stress parameter.

Figure 19A:
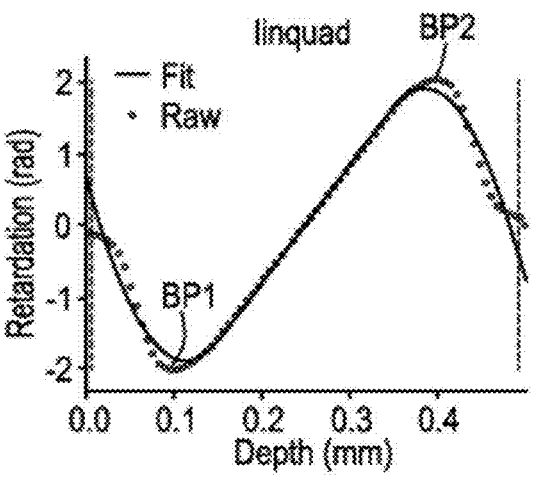
FIG. 19A is a OR vs. D plot
Figure 19B:
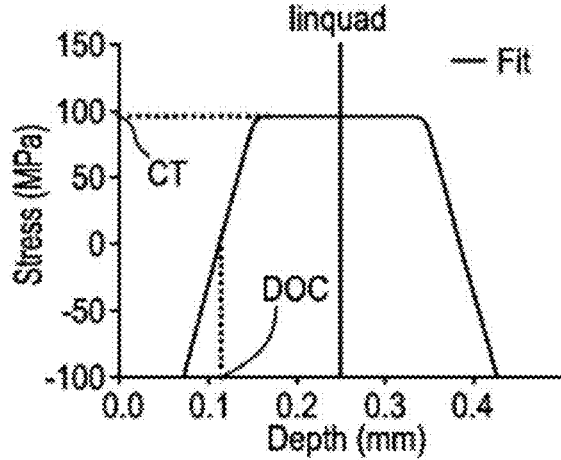
FIG. 19B is the corresponding S vs. D plot, wherein the curve fitting is done for the entire set of OR data.

FIGS. 19A through 19D further illustrate the effect of data range selection (shown by vertical dashed lines) on the fitting quality. FIG. 19A is a OR vs. D plot where the full data range is considered and where the fitted curve does not fit the bend points BP1 and BP2 very closely. FIG. 19B is the corresponding plot for FIG. 19A of the stress S(x) versus D (depth) that shows the compressive stress CT and the depth of compression DOC.

Figure 19C:
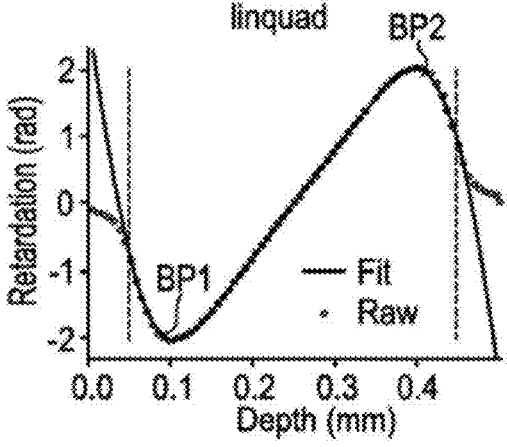
FIG. 19C is a OR vs. D plot
Figure 19D:
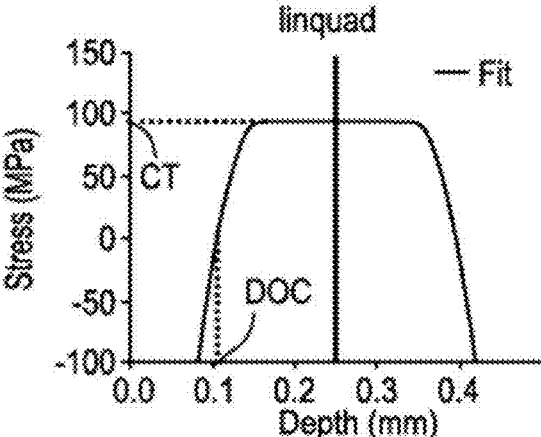
FIG. 19D is the corresponding S vs. D plot, wherein the curve fitting is done for reduced set of OR data that excludes portions of the data near the opposite end points.

FIG. 19C is an OR vs. D plot similar to FIG. 19A except that the data range is reduced to the region between the vertical dashed lines and so omits first and second "end regions" ER1 and ER2 of the measurement data. The fitted curve FC of FIG. 19C closely follows the bend points BP1 and BP2. The corresponding S(x) vs. D plot is shown in FIG. 19C and the values for the compressive stress CT and the depth of compression DOC differ substantially from that of FIG. 19B in which the full range of data was used.

Optimized Bending Point Detection

Embodiments also provide for precise detecting of the two bending points BP1 and BP2 of the retardation curve. The bending points occur where the retardation profile levels out, i.e., where the glass stress changes from compression to tension. These points are reported as the depths of compression (DOC). Previously, the locations of these points would be roughly estimated and the regions around these estimates would be fit with a polynomial of some predefined order. A third or fourth order polynomial has been used in the past, yet, for some retardation profiles, these orders proved to not fit as well as others might. To achieve an accurate fit to the two bending points, determination of the optimal polynomial order should be made, along with the best range within which to fit.

Figure 19E:
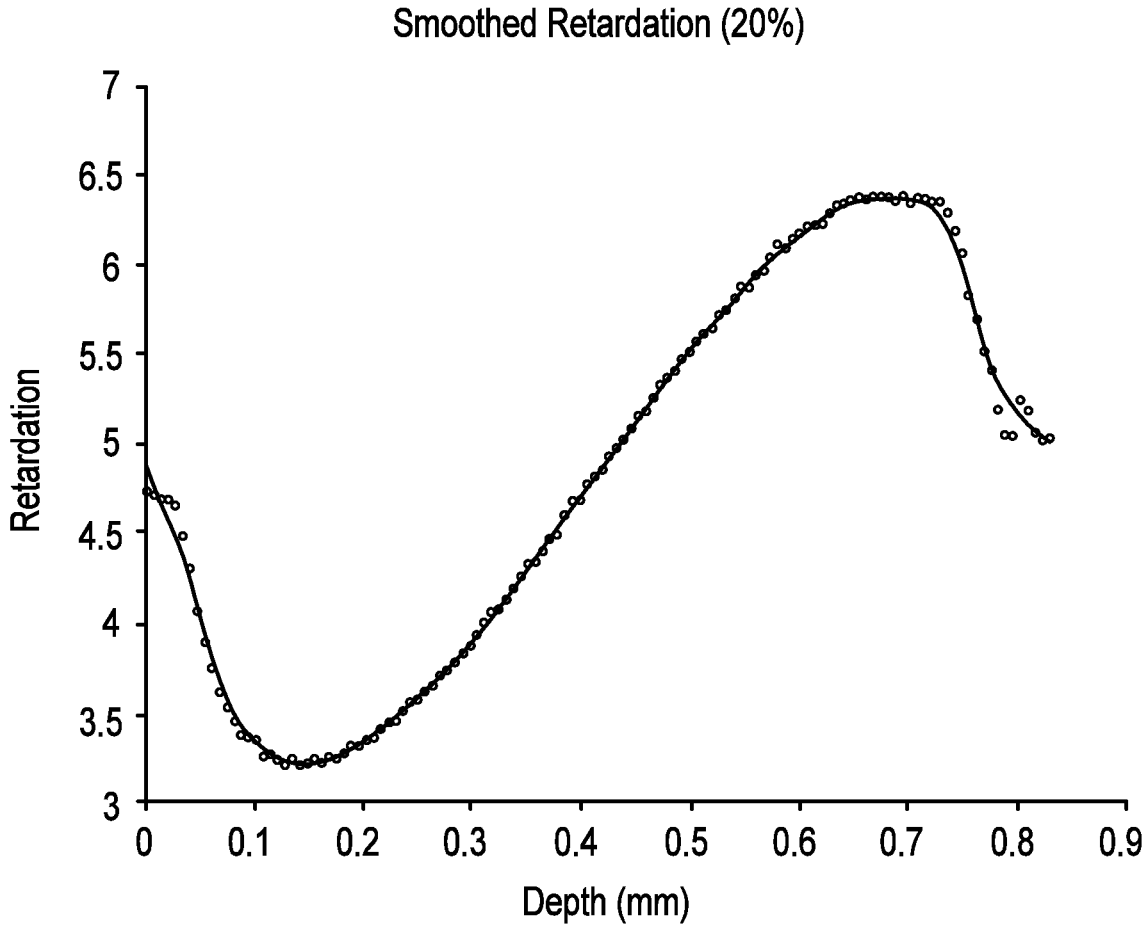
FIG. 19E is a R vs. D plot following a 20% smoothing filter on OR data.

In a first step, a profile is smoothed to roughly estimate the locations of the two bending points. As a non-limiting example shown in the FIG. 19E, a LOESS filter with a smoothing of 20% is used to smooth over most of the noise in a retardation profile.

Figure 19F:
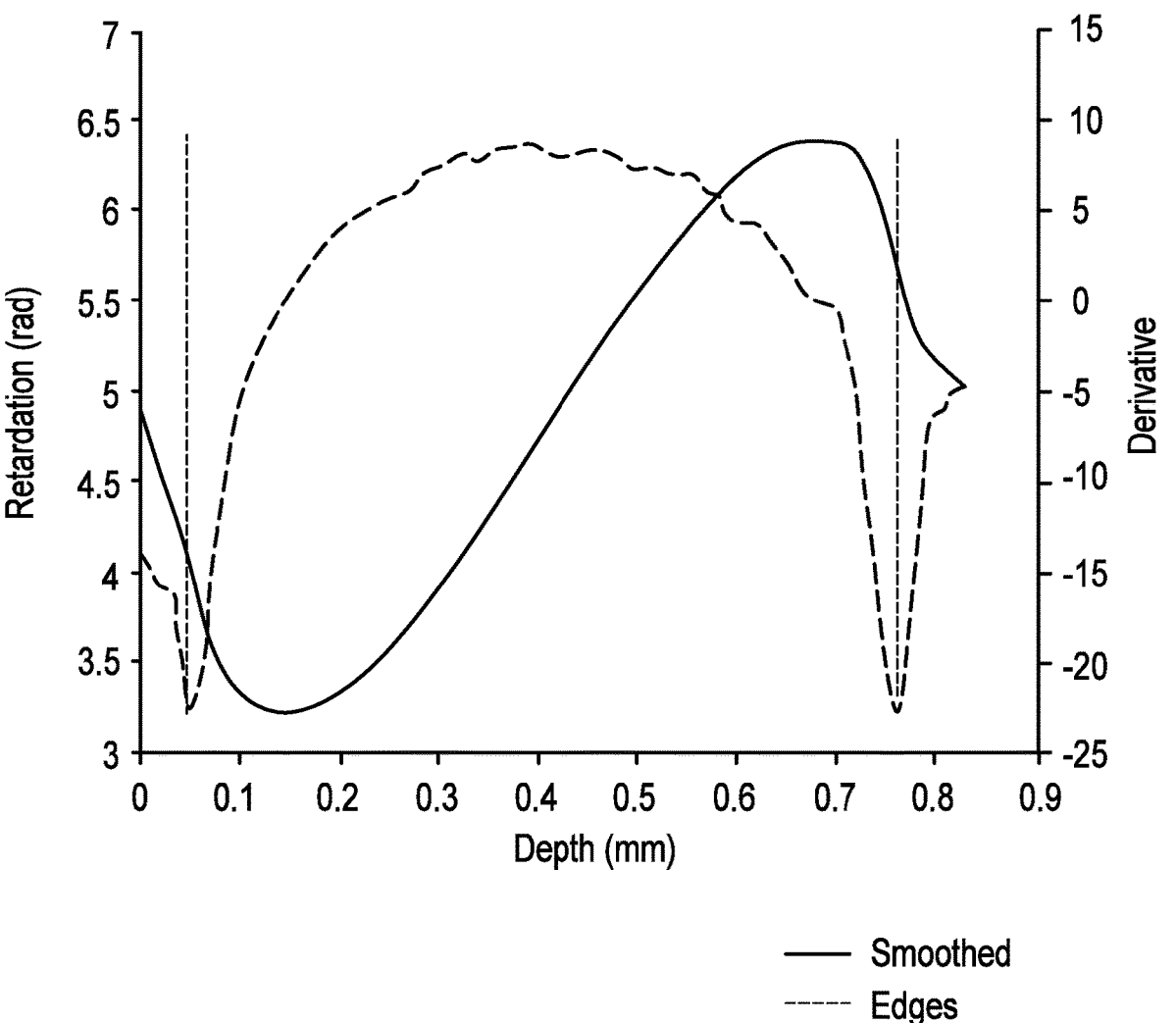
FIG. 19F is a plot of the derivative of the smoothed R data of FIG. 19E and a plot of the R vs. D plot of FIG. 19E.

Next, two steps are performed on this smoothed profile. First, the derivative of the smoothed profile is calculated, as shown in FIG. 19F. The starting and ending edges of the retardation profile are taken as the minimum points of the profile's first derivative. This edge selection can be seen in FIG. 19F. These edge points are used to restrict the polynomial fitting from extending too far into the surfaces of the retardation profile, where there is corruption from the fireballs. Second, the curvature of the smoothed profile is calculated. The curvature is calculated with the following equation:

$$k(x) = \frac{y''(x)}{\left(1 + y'(x)^2\right)^{\frac{3}{2}}},$$

where y' and y" are the first and second derivatives of the input profile, which is a function of the variable x.

Figure 19G:
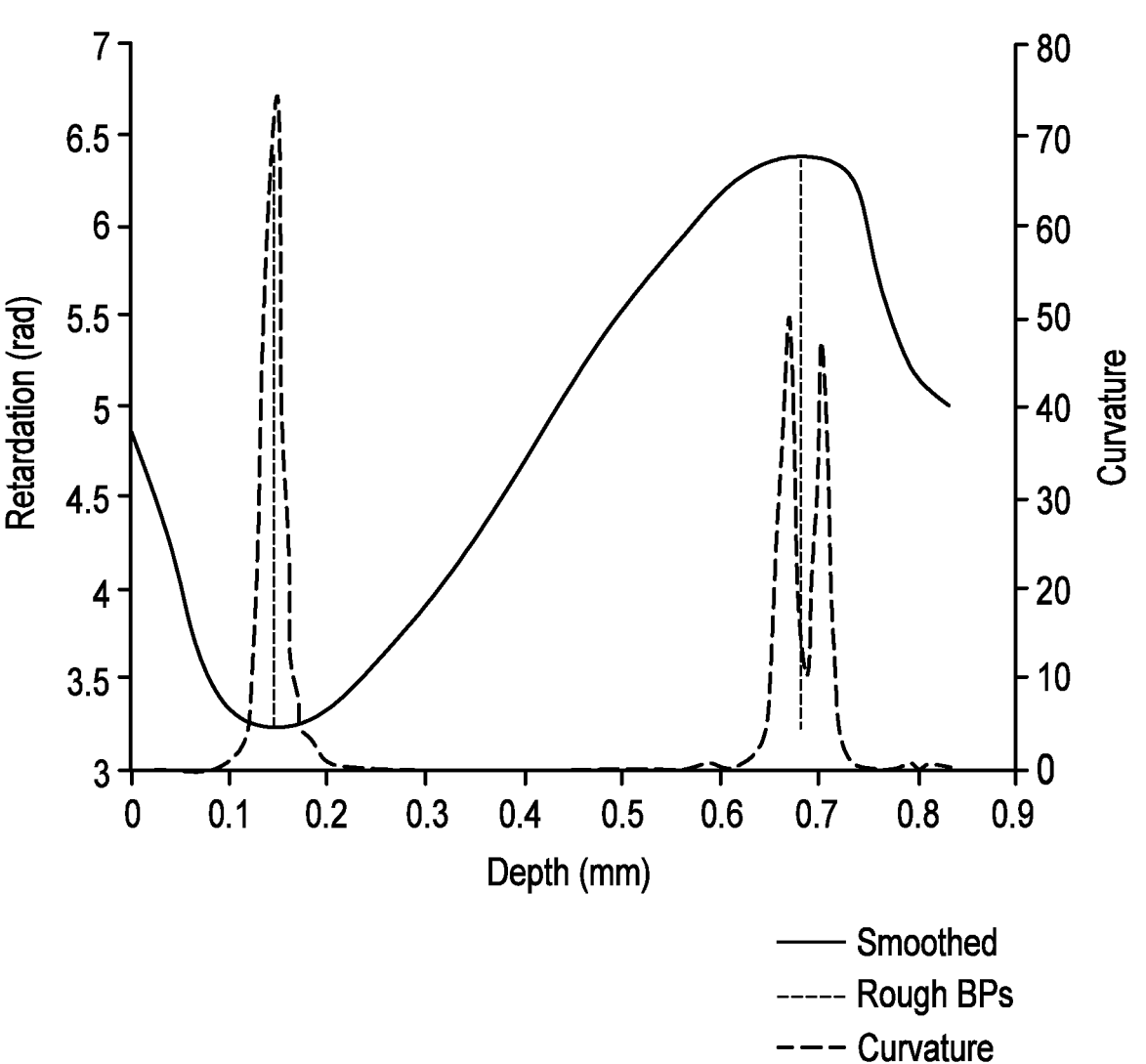
FIG. 19G is a plot of the curvature of the smoothed R data of FIG. 19E and a plot of the R vs. D plot of FIG. 19E.

Because the retardation profile will have the highest curvature at the two bending points, this calculated profile can be used to give a rough estimate of BP1 and BP2. To calculate this rough estimate, the curvature profile is split in half and weighted averages of the left and right sides are taken. This effectively determines the center-of-mass of the left and right side's curvature, which, as FIG. 19G depicts, roughly matches the location of the two bending points.

Figure 19H:
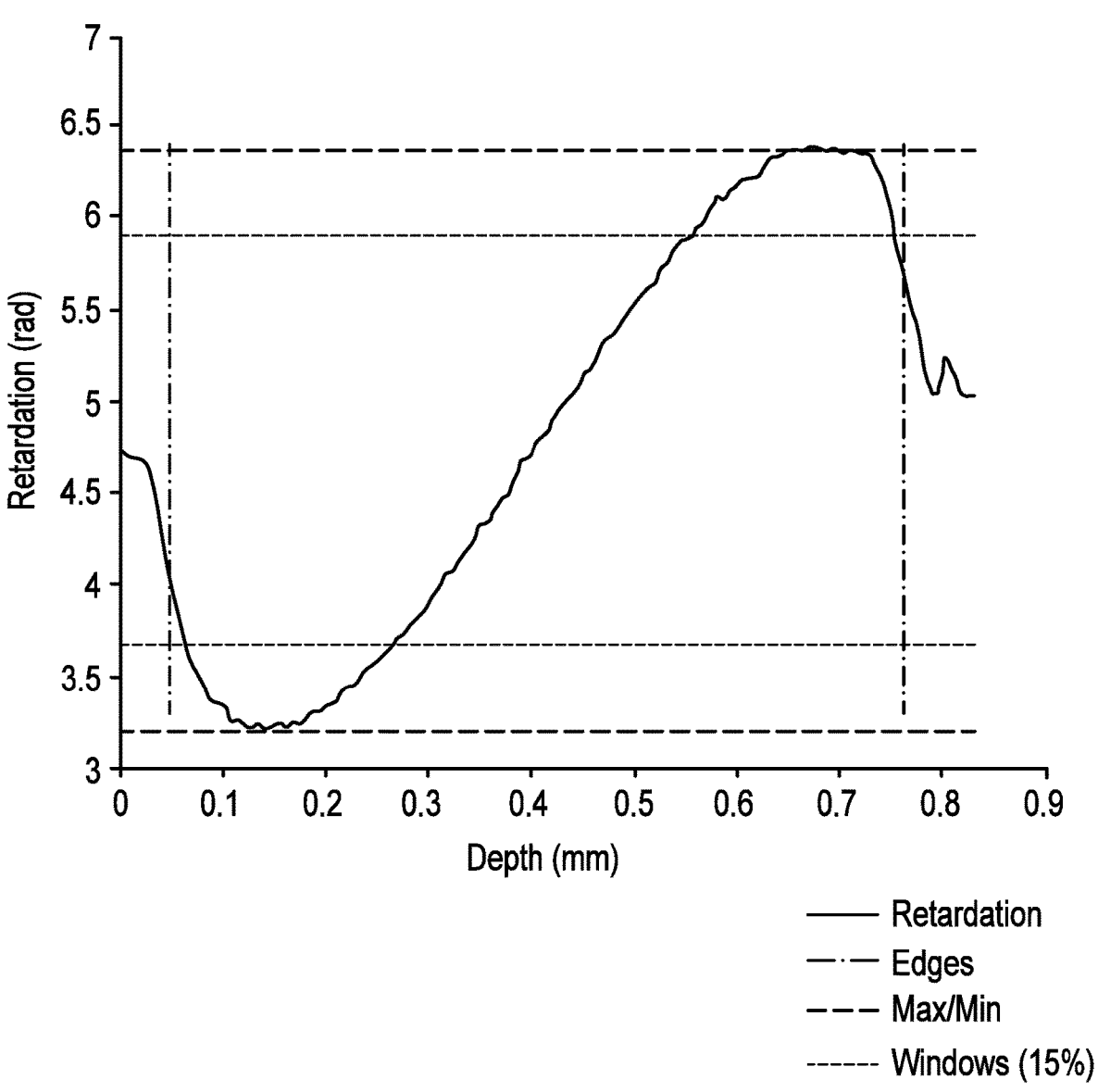
FIG. 19H is a R vs. D plot with top and bottom windows.

Next, the profile is windowed vertically to isolate the regions within which to fit. To window the profile, the difference is taken between the vertical positions of the rough BP1 and BP2 points obtained by the two methods described above. A percentage (e.g., 15%) of this total BP1 to BP2 vertical range is taken from the top and the bottom, and it is within these regions that data is selected for the polynomial fitting, as shown in FIG. 19H.

Now that the fitting regions for BP1 and BP2 are determined, the best polynomial order for fitting may be chosen. It can be difficult to choose a fixed order that will fit well not only to both the BP1 and BP2 regions (which may be slightly different in shape), but also to fit to every type of retardation profile that may be measured. If the order of the polynomial is too low, then the fit may not match the data very well and may skew the measurement results. If the order of the polynomial is too high, then the fit may follow the noise too closely, equally skewing the measurement results. Therefore, the polynomial order should be optimized based on the data being fit.

The polynomial optimization process works by fitting the input data with consecutive orders of polynomials (starting with the zeroth order and then the first, and so on). For each order, the cost of the fit is calculated by the following equation:

$$C = \frac{\text{Error}}{n - m},$$

where n is the total number of data points, m is the degrees of freedom for the fit function (which, for a polynomial, m=o+1, where o is the order), and the Error is the sum of the square difference between the raw data and the fit.

$$\text{Error} = \sum_{i}^{n} \left(y_i - y_{fit_i}\right)^2$$

Figure 19I:
FIG. 19I is a cost vs. order plot of polynomial fitting using the top and bottom
windows of FIG. 19H.
Figure 19J:
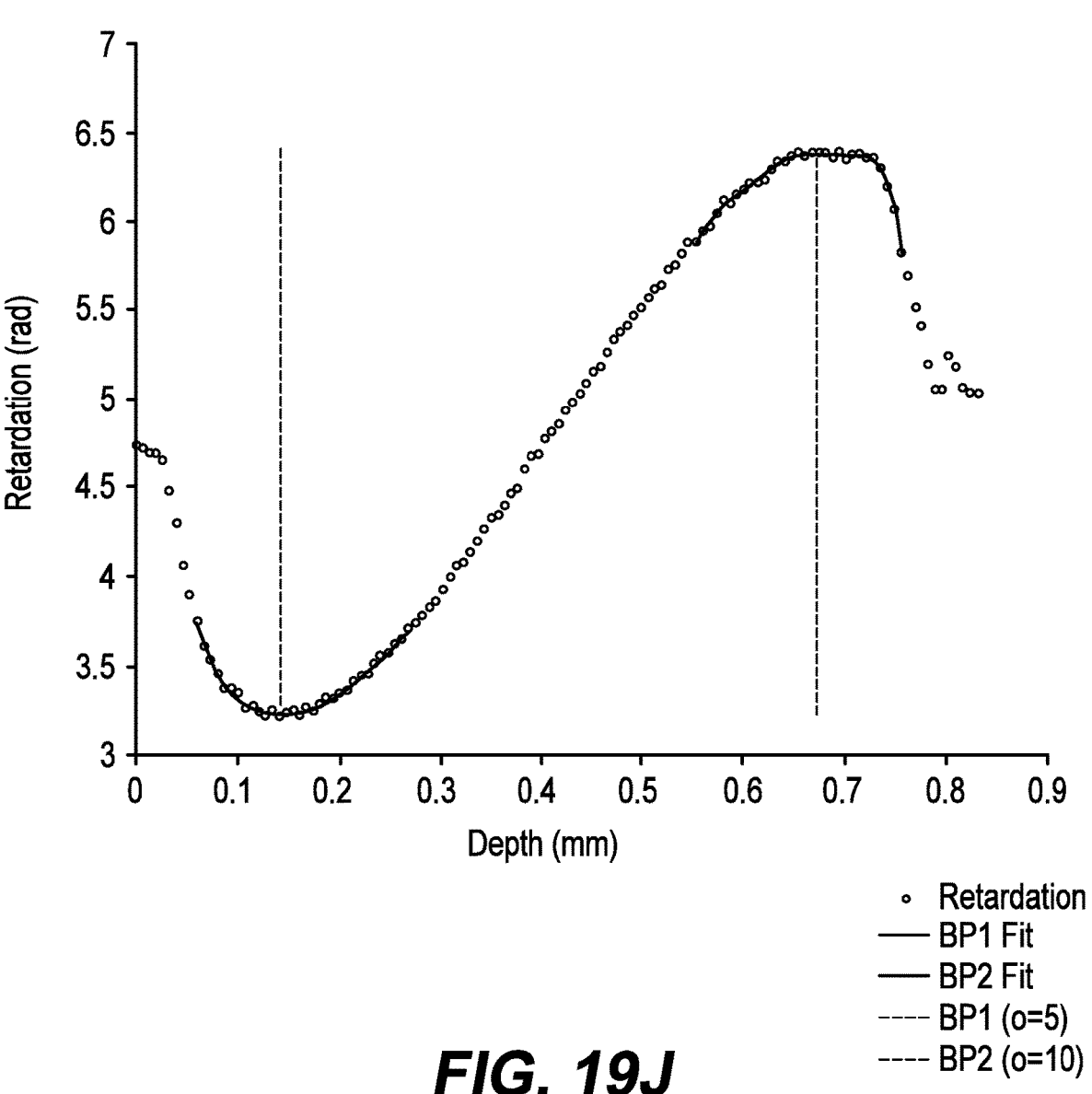
FIG. 19J is a R vs. D plot with polynomial fits for the two bending point regions.

Note that as the order of the polynomial increases, both the numerator and the denominator of the Cost equation decreases. Graphing this cost equation for the fitting of the first bending point region will show how the cost decreases rapidly over the first three orders and then settles down around order four to five, as shown by FIG. 19I. At those orders, the increase in the polynomial's order only gains a small increase in accuracy. As such, the algorithm will choose either order four or five as the optimal order (five may be chosen since it has the smaller cost of the two). Running this same analysis on the second bending point region yields an optimal order of ten. These fits can be seen in FIG. 19J. Once these fits are completed, the minimum point of the BP1 fit and the maximum point of the BP2 fit are taken as the two bending points of this retardation profile.

Therefore, with this method, the bending point regions can be windowed and fit in a way that will be optimized for whatever profile is being measured. This advancement not only improves the detection of the two bending points (which are reported as the profile's DOC parameter), but also the rest of the analysis, since the retardation profile is shifted, filtered, and fit based on the position of these bending points.

Simultaneous EPCS and LSP Measurement Considerations

One method of achieving good precision for the measurement of the depth of compression (DOC) using the LSP sub-system 200 is to press the CS substrate 10 against a stop surface (e.g., the support plenum 70) to ensure that the top surface 12 of the CS substrate 10 is co-planar with a pre-defined surface that can be assigned a depth of z=0. This pressing can be achieved by either pushing the CS substrate 10 against the stop, or by applying a vacuum such that the ambient atmospheric pressure provides the force to push the top surface 12 of the CS substrate 10 into place at z=0 (see e.g., FIGS. 8A, 8B).

On the other hand, achieving sharp (i.e., high contrast) mode spectrum 160 using the EPCS sub-system 10 to obtain an accurate stress measurement of the near-surface region R1 of the NSWG 18 also usually requires good CS substrate flatness in the EPCS measurement area, which may be also achieved with the use of the vacuum system 91.

Due to the EPCS and LSP measurement areas being at different locations of the CS substrate, applying vacuum at the LSP measurement area can in some case deform the CS substrate at the EPCS measurement area, and result in sub-optimal, or even very poor flatness or significantly deformed surface in the EPCS measurement area. This results in an EPCS mode spectrum 160 that has poor contrast and is "out of focus". These conditions can lead to decreased accuracy and decreased precision, as well as a failure to measure because the poor contrast can cause the system controller to fail to identify some of the target features of the mode spectrum 160 used to perform the stress calculations.

In an example embodiment, the EPCS detector system 140 of the EPCS sub-system 100 utilizes adaptive focusing to enable proper alignment of the CS substrate 10 on the support plenum 70 for the best (most precise) DOC measurement and near-surface stress measurements using the EPCS sub-system when the CS substrate is aligned for a best LSP measurement for the LSP sub-system 200.

In one embodiment illustrated in FIG. 20, this is accomplished by making the focusing lens 142 of the EPCS detector system 140 adjustable, e.g., axially movable by mounting the focusing lens on a translation stage 143, which in an example is operably connected to and controlled by the system controller 400. In an example, the translation stage 143 comprises a precision linear actuator, such as a piezo-electric actuator. In another example, the translation stage 143 comprises ball screw actuator. This allows for the focusing lens 142 to be translated along the second optical axis A2 to improve or maximize the contrast of the mode spectrum 160 captured by the digital detector 150. In an example, the contrast of the mode spectrum 160 is improved to enhance target spectral features, such as the TM and TE fringes 163TM, 163TE and the critical angle transitions 166TM and 166TE.

The position of the axial movable focusing lens 142 can be monitored electronically by the system controller 400 to correct the EPCS sub-system calibration by accounting for the "optical path length" or OPL, e.g., the distance from the focusing lens 142 to the digital detector 150. In one embodiment, the accounting can be simplified as long as the OPL does not fall outside of a pre-defined acceptable range, so that the original calibration remains accurate. In another embodiment, the calibration is corrected based on the OPL, and the surface stress S(0)=CS and/or the depth of layer DOL is calculated based on the corrected calibration.

In another embodiment, the focusing lens f1 has variable effective focal length which is actively controlled by the system controller 400 to obtain a high-contrast mode spectrum 160 when the specimen is aligned to ensure most precise or accurate measurement of the depth of compression DOC for the LSP sub-system 200. The variable focal length focusing lens 142 can comprise a compound lens (similar to photographic multi-component lenses with more than one optical element), or maybe otherwise comprise an adaptive lens, such as a fluid-filled lens where varying the pressure of the fluid changes the shape of the lens and thus the focal distance. When using variable focal length lens 142, shifting the position of the focusing lens 142 may not be necessary, as changing the focal length can in many cases be adequate to compensate for the deformation of the specimen shape in the EPCS measurement area as a result of aligning the specimen for best measurement in the LSP-measurement area.

In another embodiment, the variation of effective focal length of the focusing lens 142 may be enabled by an adaptive lens surface in the form of a mirror surface that may be combined with a fixed simple lens to produce a net effective focal length that can be varied over a range sufficient to produce a high-contrast mode spectrum 160 even when the CS substrate alignment is optimized for the LSP sub-system 200.

Since the deformation in the CS substrate 10 tends to not be very large, the change in refractive power for the variable focus focusing lens 142 need not be particularly large to compensate. In an example, the focal length of the focusing lens 142 can be changed by up to 15%, or in another example up to 10%.

On the other hand, when the CS substrate 10 has thickness less than 0.6 mm, it may be necessary to change the refractive power by more than 15%, and by as much as 20% or even 25%. Thus, in an example, the adaptive system for changing the focal length of the focusing lens 142 is configured to change the focal length over a focal length range that represents 25% of the average focal length, although in many cases a range of 20%, 15%, or even 10% of the average focal length may be adequate.

Similarly, since for measurements of flat CS substrates, the focusing lens 142 system is focused on infinity, when the focusing lens 142 has fixed focal length and the position of the focusing lens is axially adjusted to produce a high-contrast mode spectrum 160, the range of axial positions that are accessible by the focusing lens would ideally represent about 25% of the focal length of the lens, although in some cases 20%, 15%, or even 10% of the focal length may represent an adequate range of positions.

FIGS. 21A and 21B are schematic diagrams of example embodiments wherein two or more focusing lenses 142 of slightly different focal lengths are mounted on a support member 152 to define a focusing lens assembly 153. The support member 152 is movable to place a select one of the focusing lenses 142 in the optical path (i.e., along the second axis A2) of the reflected light beam 116R. This allows a user to choose a focal length of the focusing lens 142 from a discrete set of focal lengths. FIG. 21A shows an example where the support member 152 is in the form of a rotatable wheel that is rotatable about a rotation axis AW. FIG. 21B shows an example where the support member 152 is in the form of a linearly translatable support frame. Four example focusing lenses 142 are shown. In general, the focus lens assembly 153 can support two or more focusing lenses 142.

If the contrast of the features of interest (e.g., the TM and TE mode lines 163TM, 163TE, the TM and TE critical angle transitions 166TM, 166 TE, etc.) in the mode spectrum 160 is deemed adequate, the measurement proceeds as usual. If the contrast of the features of interest is deemed inadequate, then a focusing lens 142 of a different focal length is moved into the optical path of the reflected light beam 116R and a new mode spectrum 160 is captured by the EPCS digital detector 150 and the contrast analyzed. This process repeats until a mode spectrum 160 of adequate contrast is obtained.

In an example, differences in the focal lengths of the focusing lenses 142 may be set by the total desired range of focal-length coverage and the total number of lenses on the support member. In one example, there are six focusing lenses supported by the support member, with the focusing lenses covering a range that is between 20% and 30% of the average focal length for the entire set of focusing lenses, and the spacing of focal lengths is between 3% and 7% of the average focal length.

In another example, the focal lengths are spaced unevenly, such that the spacing of each pair of neighboring focal lengths is approximately a fixed percentage of the average of the neighboring focal lengths, where that percentage is between 2% and 20%, and more preferably between 3% and 10%.

In another related embodiment, some or all of the focusing lenses 142 comprise Fresnel lenses. In another embodiment, the focusing lenses 142 need not have different focal lengths, but may be positioned on the movable support member in such a way that when the focusing lens of choice is placed in the optical path, its distance from the digital detector 150 is different than for the other focusing lenses. In this embodiment, obtaining a spectrum having adequate contrast for the features of interest is guaranteed not necessarily by having a complete set of discrete densely spaced custom-chosen focal lengths, but by a set of distances to the digital detector and/or available focal lengths. This can reduce the cost of the EPCS sub-system 100 by utilizing standard off-the-shelf focusing lenses, and positioning each focusing lens to produce a sharp image for a specific range of warp/curvature of the CS substrate 10.

In an example, the system controller 400 can be configured to select one of the focusing lenses 142 based on a measurement of the contrast of the features of interest of the captured mode spectrum 160.

In another embodiment, measurements can be made by using two or three preferred mode spectra 160 having the best contrast among all captured mode spectra, and then a preferred result may be calculated as an average of the two or three preferred mode spectra. In an example, the preferred result may be calculated as a weighted average of the two or three preferred mode spectra. In a related example, the weight for each preferred spectrum may be proportional to the contrast of a feature of interest the preferred mode spectrum.

Using an Independent Stress Measurement for Stress Measurement Calibration

The EPCS sub-system 100 can be very good at obtaining a high-contrast mode spectrum 160 for a CS substrate formed an IOX process using a Li-based glass, e.g., wherein K ions replace Li and/or Na ions from the glass in the near-surface region. This in turn allows for very good measurements of the knee stress $CS_k$ by measuring the birefringence based on the relative positions of the TM and TE critical-angle transitions 166TM and 166TE (see FIG. 3B).

On the other hand, the EPCS measurement of the knee stress $CS_k$ usually has lower relative precision than the measurement of the surface stress S(0). In particular, the standard deviation of the measurement of the knee stress $CS_k$ is usually several % of its average value, whereas the standard deviation of the surface stress S(0) is usually on the order of 1% to 2% of its average value. In addition, the value of the knee stress $CS_k$ as obtained simply as a ratio of the birefringence B of the detected critical angle and the stress-optic coefficient (SOC) differs slightly from the value of the knee stress $CS_k$ as obtained from a destructive RNF measurement of the stress profile.

When the EPCS measurement of the knee stress $CS_k$ is believed to be less accurate than it could be or should be, it can be due to a systematic error in the measurement of the birefringence of the critical angle. This systematic error can be caused by the TM and TE modes lines 163TM and 163TE being too close to the TM and TE critical angle transitions 166TM and 166TE and further by the particular shapes of the TM and TE refractive index profiles.

When making quality-control measurements, such systematic errors are mitigated by calibrating the EPCS-based measurements of the knee stress $CS_k$ measurement with corresponding independent reference stress measurement, which may be a destructive measurement on a CS substrate taken from a set of CS substrates formed using the identical process or from the same batch during the same identical process. In an example, this is accomplished by applying a calibration multiplier $K_{cal}$ based on the independent measurement via the relationship:

$$CS_k(\text{EPCS,calibrated})=K_{cal}\cdot CS_k(\text{independent}).$$

In an example, the calibration multiplier $K_{cal}$ can be used as a general calibration factor for the stress profile calculated by the EPCS sub-system 100 via the equation:

$$S(\text{EPCS,calibrated})=K_{cal}\cdot S(\text{original})$$

where S(orig) is the originally measured (uncalibrated) stress profile S(z).

Tension Zone Stress Profile Extraction

An IOX process used to form a CS substrate 10 forms a compression zone that defines the NSWG 18. This compression zone extends into the substrate and reaches a zero value, which defines the depth of compression DOC. At the DOC, the compression zone ends and a tension zone begins.

If the stress profile in the tension zone can be accurately extracted, it can serve as a powerful tool to help extract a substantially accurate representation of the stress profile in the compression zone. This can be done by exploiting force-balancing of the stress in the entire CS substrate 10 or half of the CS substrate (i.e., so-called "half force balancing").

In one embodiment, besides the area of the stress profile in the tension zone (which is represented by the depth integral of tensile stress from one depth of compression to the opposite-side depth of compression), a reliable value of the slope of the stress profile at a depth of reliable slope extraction is also obtained from the LSP-based measurement.

In an example, the depth of reliable slope extraction may be the depth of compression DOC. In the compressive-stress region, a surface compressive stress is determined by the EPCS method. In some cases, a portion of the compressive-stress profile is also extracted from EPCS method using prior-art techniques such as IWKB, or linear-profile, erfc-shaped profile, exponential-profile, or a LinQuad profile approximation when there are not enough guided modes for reliable IWKB extraction. The EPCS-based method then provides a target point of connection, either at the surface with a surface stress value S(0), or at a deeper connection point (for example, the knee depth $z_k$; see FIG. 1B), up to which the surface portion of the stress profile S(z) can be extracted from EPCS measurement. In the latter case, the knee stress $CS_k$ may not be specified with high accuracy due to limitations of the EPCS measurement.

Nonetheless, this value of the knee stress $CS_k$ can provide an adequate starting point for pursuing extraction of the stress profile in the compression zone (e.g., substantially zones R1 and R2 in FIG. 1B) by iterative improvement. In a first iteration, the near-surface connection point with surface stress value S(0) may be connected with a deep connection point (e.g., the knee stress $CS_k$ or the depth of compression DOC) with a reliably extracted stress slope using a second-order polynomial. This determines a first approximation of the stress profile in the compression zone, having a first portion obtained from EPCS up to the first connection point (say, at the knee depth $z_k$) and a second portion obtained via polynomial interpolation between the two connection points, where at the second connection point not only the surface stress S(0) matched, but also the stress profile slope.

In a particular example, the second connection point can be the depth of compression DOC, but it need not be. The first approximation of the stress profile S(z) is integrated. If the stress profile is asymmetric, EPCS measurements may be performed on both sides of the specimen, and first approximations of the stress profile obtained as above for each side. If the stress profile S(z) is symmetric by design and implementation, then it may be assumed that the back side of the specimen has the same stress profile in the back-side compression region as the front-side compression region.

The first approximation of the stress profile from both front-side and back-side compression zones is integrated with respect to depth over the respective compression zones, and compared to the depth integral of tension over the tension zone. If the difference is larger in absolute value than a pre-defined acceptable limit, a corrective step is performed to reduce the difference. In an example, the pre-defined acceptable limit is 5% of the tension-zone stress area, but progressively better acceptable limits include 3%, 2%, 1%, and 0.5%.

The acceptable limit may be determined based on an estimate of the degree of accuracy of extraction of the tension-zone stress profile. In one embodiment, several first approximations for the stress profile are obtained by different methods, all of which match the knee stress $CS_k$ at the first connection point, and the stress value and stress slope at the second connection point, say the depth of compress DOC. Different types of first approximations may include second, third, and $4^{th}$ order polynomials, an exponential profile, an erfc-shaped profile, a Gaussian profile, and a Lorentzian profile. Then, for each of these first approximations, the difference is found between the stress area in the first-approximation compression zone, and the stress area in the tension zone extracted using LSP-based measurement. Then a linear combination of these first-approximation stress profiles is found, such that the stress area of the linear-combination stress profile equals the tension-zone stress area.

In another embodiment, the limited accuracy of the EPCS-based measurement of the knee stress $CS_k$ is taken into account by allowing a range of the knee stress $CS_k$ to be targeted around the initial EPCS-based estimate of the knee stress $CS_k$. In a first approximation of the compressive-stress portion of the stress profile, the connection is made with the EPCS-based initial value of the knee stress $CS_k$, using a preferred target shape function for the interpolated region of the compression zone. In an example, the preferred target shape is a second-order polynomial.

After each iteration, the stress area of the compressive-stress profile from the two combined compression zones (one on each side of the specimen) is subtracted from the stress area of the tension zone. If the difference is larger in absolute value than a target pre-defined acceptable limit, then the target value of the knee stress $CS_k$ may be changed within a pre-defined acceptable range for the knee $CS_k$ as determined in accordance with an estimated precision of the knee stress measurement available from the EPCS-based method.

In an example, an estimated knee stress precision is about 10 MPa, though in some cases it is better at 7 MPa or 5 MPa or 3 MPa. When no surface spike is present, and no guided modes are available, then the same technique may be used to connect to a target surface stress S(0) that is allowed to vary in a range determined by the precision of the surface stress measurement.

In an example, the range for acceptable values for the target surface stress S(0) or knee stress $CS_k$ may be up to 6 standard deviations wide, e.g., 3 standard deviations on either side of the measured value of surface stress or the knee stress. In one embodiment, the target surface value S(0) need not be varied iteratively, but may be determined by algebraic calculation, utilizing the measured difference in area between the first-approximation stress profile and the tension-zone stress profile and the preferred functional form chosen for the interpolated portion of the compressive-stress region.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of measuring first and second stress characteristics of a chemically strengthened (CS) substrate having a surface, a near-surface waveguide proximate the surface, and backing surface opposite the surface, comprising:

applying at least one ink line to the backing surface of the CS substrate;

operably disposing the surface of the CS substrate relative to a coupling prism assembly at a measurement location, the coupling prism assembly comprising an evanescent prism coupling spectroscopy (EPCS) coupling prism and a light-scattering polarimetry (LSP) coupling prism to respectively define adjacent EPCS and LSP coupling interfaces;

performing a EPCS measurement of the CS substrate using the EPCS coupling interface to obtain the first stress characteristics;

performing a LSP measurement of the CS substrate using the LSP coupling interface to obtain the second stress characteristics without removing either the coupling prism assembly or the CS substrate from the measurement location, the performing the LSP measurement comprising:

forming an LSP image on a digital detector;

processing the LSP image to form an optical retardation (OR) versus depth (D) curve of a retardation profile comprising OR data points that define first and second bend points and first and second end regions; and performing at least one of:

i) first and second curve fittings of the OR data points that respectively define the first and second bend points to determine a central tension CT for the CS substrate;

ii) a curve fitting of the OR data points between the first and second bend points to determine a depth of compression DOC for the CS substrate; and iii) performing a curve fitting to the OR data points over a span that excludes the first and second end regions to define an OR-fitted curve, and using the OR-fitted curve to determine at least one of a central tension CT and a depth of compression DOC for the CS substrate; and combining the first and second stress characteristics to define a full stress characterization of the CS substrate, wherein the first stress characteristics are selected from a group of first stress characteristics comprising: a surface compressive stress $S(0)$, a total depth of layer DOLT, a spike depth of layer DOLsp, a knee stress CSK and a birefringence B and the second stress characteristic comprises at least one of a depth of compression DOC and a central tension CT, wherein the curve fitting is performed within a top window and a bottom window of the OR versus D curve, and wherein the top window and the bottom window are determined by:

determining a first derivative curve of the OR versus D curve;

selecting a starting edge and an ending edge of the retardation profile corresponding to a first minimum and a second minimum of the first derivative curve, respectively, wherein the first region comprises depths less than or equal to the starting edge and the second region comprises depths greater than or equal to the ending edge;

determining a curvature of the OR versus D curve;

determining a center of mass of a left side of the curvature defining the first bend point and a right side of the curvature defining the second bend point; and the top window is defined by:

a maximum line defined by a maximum retardation of the OR versus D curve;

a lower line defined by a percentage of the maximum retardation of the OR versus D curve;

the starting edge; and the ending edge;

the bottom window is defined by:

a minimum line defined by a minimum retardation of the OR versus D curve an upper line defined by a percentage of the maximum retardation of the OR versus D curve;

the starting edge; and the ending edge.

2. The method of claim 1, wherein the performing the LSP measurement comprises:

the forming the LSP image on the digital detector defines a raw digital LSP image;

performing a Gaussian-blurring of the raw digital LSP image to form a Gaussian-blurred LSP image;

performing an Otsu thresholding process on the Gaussian-blurred image to define a threshold image; and using the threshold image to calculate an optical retardation versus depth into the CS substrate to obtain the second stress characteristics.

3. The method of claim 1, wherein the performing the LSP measurement comprises:

the forming the LSP image on the digital detector defines a raw digital LSP image;

performing Gaussian-blurring of the raw digital LSP image to form a Gaussian-blurred LSP image;

performing a binarizing method on the Gaussian-blurred LSP image to define an image contour; and and using the image contour to calculate an optical retardation versus depth into the CS substrate to obtain the second stress characteristics.

4. The method of claim 1, wherein performing the LSP measurement further comprises:

employing a combination of linear and quadratic functions to obtain a fitted curve to the OR data points.

5. The method of claim 1, wherein the performing the LSP measurement further comprises:

carrying out at least one of the following acts:

i) employing a power-spike function to obtain a fitted curve to the OR data points; and ii) shifting the OR data points so that the first and second bend points are symmetric about a mid-plane of the CS substrate, thereby defining shifted OR data points; and employing the shifted OR data points to obtain a depth of compression DOC measurement for the CS substrate.

6. The method of claim 1, wherein the curve fitting comprises performing a polynomial optimization process that determines an optimal polynomial order by applying a cost function.

7. The method of claim 1, further comprising identifying an entrance point and an exit point of a LSP laser beam on the CS substrate.

8. The method of claim 7, wherein the LSP image comprises a plurality of bright spots, and the identifying of the entrance point and the exit point comprises:

filtering a sub-set of bright spots of the plurality of bright spots that is outside of 50% above and below a thickness of the CS substrate and ±10 degrees around an angle of laser propagation;

creating a plurality of bright spot combinations of a remaining set of bright spots of the plurality of bright spots;

scoring each bright spot combination of the plurality of bright spot combinations for closeness to the thickness of the CS substrate, closeness to the angle of laser propagation, and a median intensity of light between each bright spot of the bright spot combination;

normalizing scores of the bright spot combinations;

for each bright spot combination, summing normalized scores for closeness to the thickness of the CS substrate, closeness to the angle of laser propagation, and the median intensity of light between each bright spot of the bright spot combination; and selecting a selected bright spot combination having a highest summed score among the bright spot combinations as the entrance point and the exit point.

9. A method of processing a light-scattering polarimetry (LSP) image comprising:

forming an LSP image of a chemically strengthened (CS) substrate on a digital detector;

processing the LSP image to form an optical retardation (OR) versus depth (D) curve of a retardation profile comprising OR data points that define first and second bend points and first and second end regions;

determining a top window and a bottom window of the OR versus D curve by:

determining a first derivative curve of the OR versus D curve;

selecting a starting edge and an ending edge of the retardation profile corresponding to a first minimum and a second minimum of the first derivative curve, respectively, wherein the first region comprises depths less than or equal to the starting edge and the second region comprises depths greater than or equal to the ending edge;

determining a curvature of the OR versus D curve;

determining a center of mass of a left side of the curvature defining the first bend point and a right side of the curvature defining the second bend point; and the top window is defined by:

a maximum line defined by a maximum retardation of the OR versus D curve;

a lower line defined by a percentage of the maximum retardation of the OR versus D curve;

the starting edge; and the ending edge;

the bottom window is defined by:

a minimum line defined by a minimum retardation of the OR versus D curve;

an upper line defined by a percentage of the maximum retardation of the OR versus D curve;

the starting edge; and the ending edge.

10. The method of claim 9, further comprising:

performing at least one of:

i) first and second curve fittings of the OR data points that respectively define the first and second bend points to determine a central tension CT for the CS substrate;

ii) a curve fitting of the OR data points between the first and second bend points to determine a depth of compression DOC for the CS substrate; and iii) performing a curve fitting to the OR data points over a span that excludes the first and second end regions to define an OR-fitted curve and using the OR-fitted curve to determine at least one of a central tension CT and a depth of compression DOC for the CS substrate.

11. The method of claim 10, wherein the curve fitting comprises performing a polynomial optimization process that determines an optimal polynomial order by applying a cost function.

12. The method of claim 9, further comprising identifying an entrance point and an exit point of a LSP laser beam on the CS substrate.

13. The method of claim 12, wherein the LSP image comprises a plurality of bright spots, and the identifying of the entrance point and the exit point comprises:

filtering a sub-set of bright spots of the plurality of bright spots that is outside of 50% above and below a thickness of the CS substrate and ±10 degrees around an angle of laser propagation;

creating a plurality of bright spot combinations of a remaining set of bright spots of the plurality of bright spots;

scoring each bright spot combination of the plurality of bright spot combinations for closeness to the thickness of the CS substrate, closeness to the angle of laser propagation, and a median intensity of light between each bright spot of the bright spot combination;

normalizing scores of the bright spot combinations;

for each bright spot combination, summing normalized scores for closeness to the thickness of the CS substrate, closeness to the angle of laser propagation, and the median intensity of light between each bright spot of the bright spot combination; and selecting a selected bright spot combination having a highest summed score among the bright spot combinations as the entrance point and the exit point.

14. A method of measuring first and second stress characteristics of a chemically strengthened (CS) substrate having a surface, a near-surface waveguide proximate the surface, and backing surface opposite the surface, comprising:

applying at least one ink line to the backing surface of the CS substrate;

operably disposing the surface of the CS substrate relative to a coupling prism assembly at a measurement location, the coupling prism assembly comprising an evanescent prism coupling spectroscopy (EPCS) coupling prism and a light-scattering polarimetry (LSP) coupling prism to respectively define adjacent EPCS and LSP coupling interfaces;

performing a EPCS measurement of the CS substrate using the EPCS coupling interface to obtain the first stress characteristics;

performing a LSP measurement of the CS substrate using the LSP coupling interface to obtain the second stress characteristics without removing either the coupling prism assembly or the CS substrate from the measurement location, the performing the LSP measurement comprising:

forming an LSP image on a digital detector, the LSP image comprising a plurality bright spots;

processing the LSP image to form an optical retardation (OR) versus depth (D) curve of a retardation profile comprising OR data points that define first and second bend points and first and second end regions, the processing the LSP image comprising identifying an entrance point and an exit point of a LSP laser beam on the CS substrate comprising:

filtering a sub-set of bright spots of the plurality of bright spots that is outside of 50% above and below a thickness of the CS substrate and +10 degrees around an angle of laser propagation;

creating a plurality of bright spot combinations of a remaining set of bright spots of the plurality of bright spots;

scoring each bright spot combination of the plurality of bright spot combinations for closeness to the thickness of the CS substrate, closeness to the angle of laser propagation, and a median intensity of light between each bright spot of the bright spot combination;

normalizing scores of the bright spot combinations;

for each bright spot combination, summing normalized scores for closeness to the thickness of the CS substrate, closeness to the angle of laser propagation, and the median intensity of light between each bright spot of the bright spot combination; and selecting a selected bright spot combination having a highest summed score among the bright spot combinations as the entrance point and the exit point; and performing at least one of:

i) first and second curve fittings of the OR data points that respectively define the first and second bend points to determine a central tension CT for the CS substrate;

ii) a curve fitting of the OR data points between the first and second bend points to determine a depth of compression DOC for the CS substrate; and iii) performing a curve fitting to the OR data points over a span that excludes the first and second end regions to define an OR-fitted curve, and using the OR-fitted curve to determine at least one of a central tension CT and a depth of compression DOC for the CS substrate; and combining the first and second stress characteristics to define a full stress characterization of the CS substrate, wherein the first stress characteristics are selected from a group of first stress characteristics comprising: a surface compressive stress S(0), a total depth of layer DOLT, a spike depth of layer DOLsp, a knee stress CSK and a birefringence B and the second stress characteristic comprises at least one of a depth of compression DOC and a central tension CT.

15. The method of claim 14, wherein the curve fitting comprises performing a polynomial optimization process that determines an optimal polynomial order by applying a cost function.

16. The method of claim 14, wherein the curve fitting is performed within a top window and a bottom window of the OR versus D curve.

17. The method of claim 14, wherein the performing the LSP measurement comprises:

the forming the LSP image on the digital detector defines a raw digital LSP image;

performing a Gaussian-blurring of the raw digital LSP image to form a Gaussian-blurred LSP image;

performing an Otsu thresholding process on the Gaussian-blurred image to define a threshold image;

and using the threshold image to calculate an optical retardation versus depth into the CS substrate to obtain the second stress characteristics.

18. The method of claim 14, wherein the performing the LSP measurement comprises:

the forming the LSP image on the digital detector defines a raw digital LSP image;

performing a Gaussian-blurring of the raw digital LSP image to form a Gaussian-blurred LSP image;

performing a binarizing method on the Gaussian-blurred LSP image to define an image contour; and using the image contour to calculate an optical retardation versus depth into the CS substrate to obtain the second stress characteristics.

19. The method of claim 14, wherein the performing the LSP measurement further comprises:

employing a power-spike function to obtain a fitted curve to the OR data points; and employing the shifted OR data points to obtain a depth of compression DOC measurement for the CS substrate.

20. The method of claim 14, wherein the performing the LSP measurement further comprises:

shifting the OR data points so that the first and second bend points are symmetric about a mid-plane of the CS substrate, thereby defining shifted OR data points; and employing the shifted OR data points to obtain a depth of compression DOC measurement for the CS substrate.

\* \* \* \* \*